United States Patent
Rogg et al.

[19]

[11] Patent Number: 6,003,395
[45] Date of Patent: Dec. 21, 1999

[54] ACTUATING APPARATUS FOR AUTOMATED CONSTITUENTS OF POWER TRAINS IN MOTOR VEHICLES

[75] Inventors: Andreas Rogg, Bühl; Andreas Deimel, Bühl-Weitenung, both of Germany

[73] Assignee: Luk Getriebe-Systeme GmbH, Buhl/Baden, Germany

[21] Appl. No.: 08/907,120

[22] Filed: Aug. 6, 1997

[30] Foreign Application Priority Data

Aug. 6, 1996 [DE] Germany .......................... 196 31 727
Sep. 5, 1996 [DE] Germany .......................... 196 36 005

[51] Int. Cl.⁶ .............................. F16H 61/32; F16H 61/34
[52] U.S. Cl. ........................ 74/335; 74/473.12; 74/89.14; 324/207.2
[58] Field of Search ................................ 74/335, 473.12, 74/473.26, 473.25, 473.29, 425, 89.14, 365; 324/207.2, 207.25

[56] References Cited

U.S. PATENT DOCUMENTS

| | | | |
|---|---|---|---|
| 925,270 | 6/1909 | Beemer | 74/473.12 X |
| 3,742,243 | 6/1973 | Gamble | 307/106 |
| 4,449,416 | 5/1984 | Huitema | 74/365 X |
| 4,567,969 | 2/1986 | Makita | 74/473.12 X |
| 4,745,822 | 5/1988 | Trachman et al. | 74/335 |
| 4,748,865 | 6/1988 | Umezawa et al. | 74/425 X |
| 4,805,472 | 2/1989 | Aoki et al. | 74/335 |
| 4,938,088 | 7/1990 | Langley et al. | 74/335 X |
| 5,068,583 | 11/1991 | Gresham et al. | 74/473.12 X |
| 5,150,637 | 9/1992 | Ninomiya et al. | 74/335 |
| 5,219,391 | 6/1993 | Edelen et al. | 74/335 |
| 5,357,822 | 10/1994 | Lanting et al. | 74/335 X |
| 5,377,796 | 1/1995 | Friedmann et al. | |
| 5,450,934 | 9/1995 | Maucher. | |

*Primary Examiner*—Charles A Marmor
*Assistant Examiner*—Ankur Parekh
*Attorney, Agent, or Firm*—Darby & Darby

[57] ABSTRACT

A power train for use in a motor vehicle has a prime mover (such as a combustion engine), an automated gearbox which transmits torque to the wheels of the vehicle, a friction clutch between the prime mover and the gearbox, a computerized control unit which receives signals from several sensors, and one or more actuators which operate the clutch and/or the gearbox in response to signals from the control unit. The actuator for selecting the gear ratio of the gearbox and for shifting the gearbox into and from selected gears employs two transmissions each of which has a worm gearing receiving torque from a discrete electric motor of the actuator and a spur gearing which transmits motion from the respective worm gearing to a mobile component of the gearbox. The connection between the worm and spur gearings in at least one of the transmissions can comprise a damper cooperating with one or more sensors serving to transmit signals to the control unit.

25 Claims, 30 Drawing Sheets

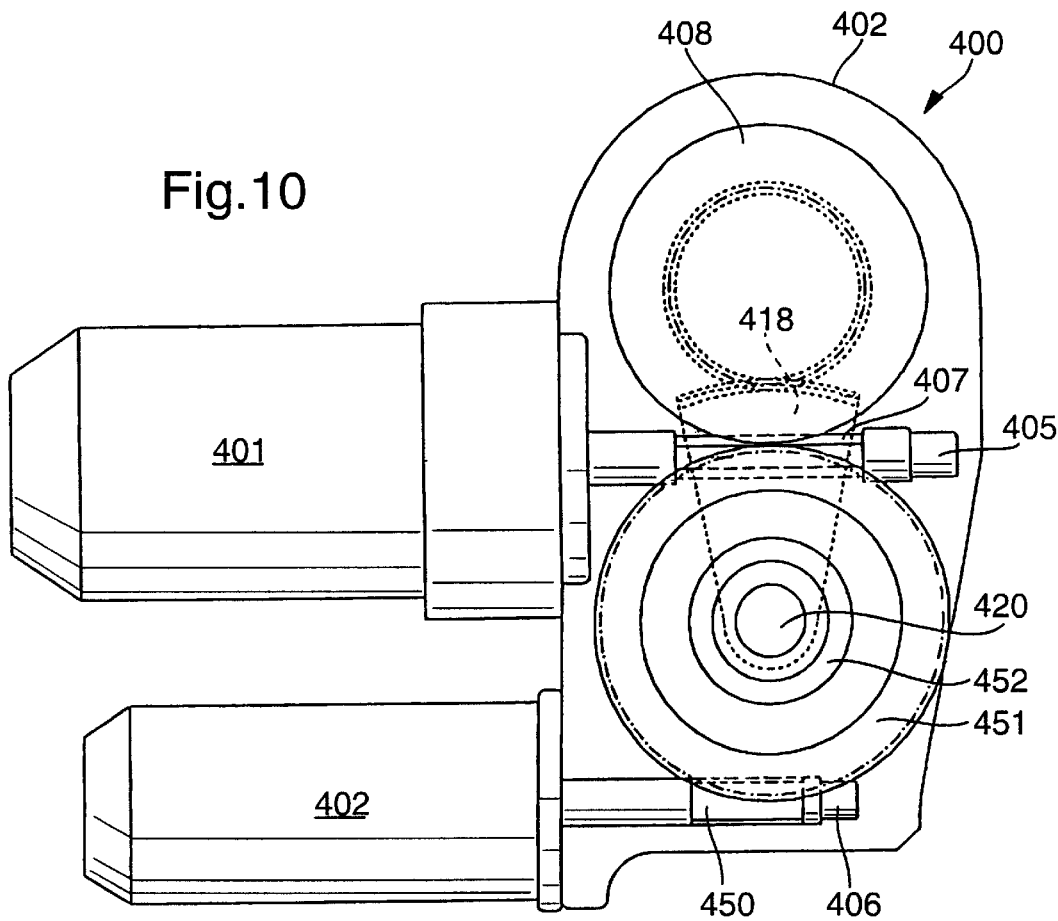
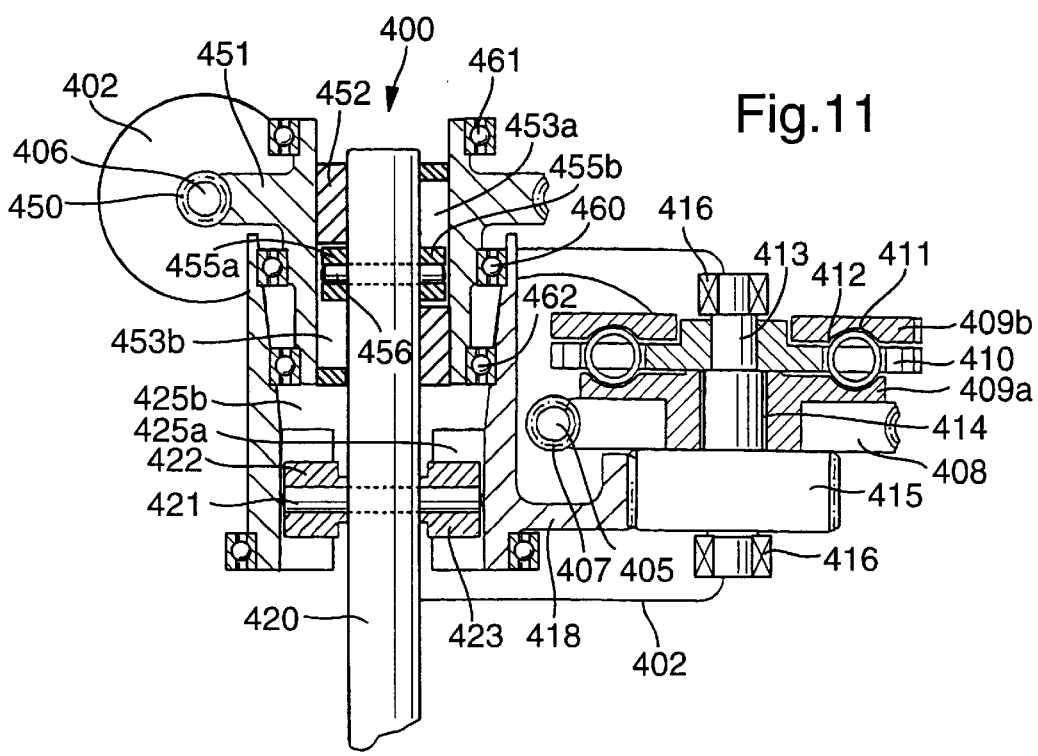

Fig. 14

| | Aktor Kuppeln | Aktor Schalten | Aktor Wählen | Steuergerät |
|---|---|---|---|---|
| K,S,W | Karosserie | Karosserie | Karosserie | Karosserie |
| K,S,W | Karosserie | Getriebe | Getriebe | Karosserie |
| K,S,W | Karosserie | Getriebe | Getriebe | Getriebe |
| K,S,W | Getriebe | Getriebe | Getriebe | Karosserie |
| K,S,W | Getriebe | Getriebe | Getriebe | Getriebe |
| | | | | |
| K+S,W | Karosserie | | Karosserie | Karosserie |
| K+S,W | Getriebe | | Getriebe | Karosserie |
| K+S,W | Getriebe | | Getriebe | Getriebe |
| | | | | |
| K,S+W | Karosserie | Karosserie | | Karosserie |
| K,S+W | Karosserie | Getriebe | | Karosserie |
| K,S+W | Karosserie | Getriebe | | Getriebe |
| K,S+W | Getriebe | Getriebe | | Karosserie |
| K,S+W | Getriebe | Getriebe | | Getriebe |
| | | | | |
| K+S+W | Karosserie | | | Karosserie |
| K+S+W | Getriebe | | | Karosserie |
| K+S+W | Getriebe | | | Getriebe |
| | | | | |
| K+W,S | Karosserie | Karosserie | Karosserie | Karosserie |
| K+W,S | Getriebe | Getriebe | Getriebe | Karosserie |
| K+W,S | Getriebe | Getriebe | Getriebe | Getriebe |

ACTUATING APPARATUS FOR AUTOMATED CONSTITUENTS OF POWER TRAINS IN MOTOR VEHICLES

BACKGROUND OF THE INVENTION

The invention relates to motor vehicles in general, and more particularly to improvements in power trains for use in motor vehicles. Still more particularly, the invention relates to improvements in arrangements for actuating or operating automated torque transmitting systems (such as friction clutches or hydrokinetic torque converters with lockup or bypass clutches) and/or automated transmissions (hereinafter called gearboxes) in the power trains of motor vehicles.

It is known to operate or actuate an automated gearbox or an automated clutch by a control unit which receives signals from one or more sensors, electronic circuits and/or other monitoring means and transmits signals to one or more actuators which directly actuate or operate a gearbox to select a particular gear ratio and/or to shift into a selected gear ratio; the same actuator additional actuator(s) can be utilized as a means for automatically selecting the torque to be transmitted by an automated clutch or another automated torque transmitting system between a prime mover (such as an internal combustion engine or a hybrid prime mover in a motor vehicle) and the input element of a gearbox in the power train of a motor vehicle. The connection between one or more actuators and the actuated part(s) of a gearbox and/or a clutch can include one or more driving units. For example, the means for actuating or operating an automated gearbox can comprise a control unit (such as a computerized electronic circuit), a first actuator which operates a gear ratio selecting component of the gearbox by way of a first driving unit, and a second actuator which operates or actuates, by way of a second driving unit, a component which shifts the gearbox into a selected ratio. One and the same component of the automated gearbox can be used to first select a given gear ratio and to thereupon shift the gearbox into the thus selected gear ratio.

An actuator of the above outlined character can be a hydraulically operated actuator. A drawback of such clutch or gearbox actuating means is that the hydraulically operated actuator or actuators occupy much space and comprise a large number of parts. This contributes to the cost and bulk of the clutch and/or gearbox, to the cost and bulk of the actuating means for the clutch and/or gearbox, and to the cost and bulk of the entire power train. As a rule, hydraulically operated actuators comprise accumulators for pressurized fluids, numerous valves, numerous conduits, several cylinder and piston assemblies and/or other components or constituents.

Another drawback of heretofore known power trains which comprise automated torque transmitting systems and/or automated gearboxes is that the sensors which they employ to monitor the speed, acceleration, distances covered and/or other parameters which are to be considered for automatic shifting of a gearbox and/or for automatic selection of torque to be transmitted by an automated clutch are too bulky and/or unreliable and/or insufficiently sensitive for utilization in such power trains.

OBJECTS OF THE INVENTION

An object of the invention is to provide the power train of a motor vehicle with novel and improved (such as compact, simple and inexpensive) actuating means for one or more automated parts of the power train.

Another object of the invention is to provide a power train with novel and improved means for actuating (such as selecting a particular gear ratio and shifting into the selected gear ratio) an automated gearbox and/or an automated torque transmitting system, e.g., a friction clutch or a hydrokinetic torque converter between a combustion engine or another prime mover and an automated or manually actuatable gearbox.

A further object of the invention is to provide a power train which is designed to simplify the tasks of the operator of a motor vehicle and which contributes to the comfort and safety of the occupant(s) of the motor vehicle.

An additional object of the invention is to provide a novel and improved automated gearbox which can be utilized in the above outlined power train.

Still another object of the invention is to provide a novel and improved combination of an automated gearbox and/or an automated torque transmitting system and the actuating means therefor.

A further object of the invention is to provide a novel and improved (particularly compact, simple, reliable and inexpensive) power train which can be utilized with advantage in existing makes of motor vehicles.

Another object of the invention is to provide novel and improved signal generating means for use in the above outlined power train.

An additional object of the invention is to provide novel and improved transmissions for use between one or more actuators and the mobile component(s) of an automated gearbox and/or an automated torque transmitting system in the power train of a motor vehicle, such as a passenger car or a truck.

Still another object of the invention is to provide a motor vehicle which embodies the above outlined power train.

A further object of the invention is to provide a novel and improved method of operating or actuating an automated torque transmitting system and/or an automatic or automated gearbox in the power train of a motor vehicle.

Another object of the invention is to provide novel and improved velocity monitoring and indicating sensor means for use in the above outlined actuating or operating means for automated constituents of power trains in motor vehicles.

An additional object of the invention is to provide novel and improved actuators for use in the above outlined actuating means for automated clutches and/or gearboxes in the power trains of motor vehicles.

Still another object of the invention is to provide a novel and improved method of operating or actuating an automated gearbox and/or an automated torque transmitting system in the power train of a motor vehicle.

SUMMARY OF THE INVENTION

One feature of the present invention resides in the provision of a power train which can be utilized with advantage in a motor vehicle and comprises a prime mover (such as a combustion engine or a hybrid prime mover), an automatically operable gearbox having a plurality of gear ratios (such as neutral, reverse and two or more forward gear ratios), means (e.g., a friction clutch of a hydrokinetic torque converter with a bypass or lockup clutch) for transmitting torque between the prime mover and the gearbox, and means for operating the gearbox. The operating means comprises a signal receiving and signal transmitting control unit, monitoring means including at least one sensor arranged to transmit signals to the control unit, and actuating means including at least one actuator which is responsive to signals from the control unit to select gear ratios and to shift the gearbox into selected gear ratios. The at least one actuator includes first and second driving units, a first transmission arranged to transmit motion from the first driving unit to a gear ratio selecting first component of the gearbox, and a second transmission interposed between the second driving unit and a second component forming part of and arranged to shift the gearbox into a selected ratio, e.g., the ratio selected by the first component of the automated transmission.

The monitoring means can further comprise at least one circuit (e.g., an electronic circuit for the prime mover) which also serves to transmit signals to the control means.

At least one of the transmissions can constitute a single-stage or a multi-stage transmission. For example, at least one of the transmissions can include one or more worm gearings, spur gearings, bevel gearings and hypoid gearings.

The at least one actuator can further include a housing or casing and at least a portion of at least one of the two driving units can be confined in such housing. The housing can further accommodate at least a portion of that transmission which is driven by the at least one driving unit. In addition to, or in lieu of at least a portion of at least one of the driving units and at least a portion of the respective transmission, the housing of the actuator can accommodate at least a portion of the monitoring means.

At least one of the driving units can include an electric motor, such as an a-c motor, a d-c motor, a travelling-wave motor, a switched reluctance motor or a stepping motor.

The first and second driving units can include shafts which are at least substantially parallel with or which are inclined relative to each other, e.g., at an angle of 90 degrees.

The first and second driving units can respectively include first and second members (such as rotary output shafts of electric motors) which are rotatable about first and second axes, and each of the transmissions can include a worm gearing having a worm wheel. The two worm wheels and the axes of the aforementioned first and second members can be located in a common plane. In many power trains, such positioning of the just enumerated parts can entail substantial savings in space or a most economical utilization of space which is available for the actuating means of the improved power train.

Alternatively, the plane of one of the worm wheels and of the corresponding rotary member can be at least substantially parallel to the plane of the other worm wheel and the respective rotary member.

Still further, one of the two planes can be inclined at a predetermined angle (e.g., a right angle) relative to the other plane.

In lieu of an electric motor, at least one of the driving units can comprise an electromagnet, e.g., a stepping electromagnet.

Another feature of the invention resides in the provision of a power train which can be utilized with advantage in a motor vehicle and comprises a prime mover, an automatically operable gearbox having a plurality of gear ratios, means for transmitting torque between the prime mover and the gearbox, and means for operating the gearbox including a signal receiving and signal transmitting control unit, monitoring means including at least one sensor arranged to transmit signals to the control unit, and actuating means including at least one actuator which is responsive to signals from the control unit to select gear ratios and to shift the gearbox into selected gear ratios. The at least one actuator includes first and second driving units, a first transmission including a first worm gearing and arranged to transmit rotary motion from the first driving unit to a gear ratio selecting first rotary shaft of the gearbox, and a second transmission including a second worm gearing and being interposed between the second driving unit and a second rotary shaft forming part of and serving to shift the gearbox into a desired gear ratio, e.g., the gear ratio selected by the first rotary shaft.

As already mentioned hereinbefore, the monitoring means can further comprise at least one circuit (e.g., an electronic circuit for the prime mover and/or for the torque transmitting means) which serves to transmit signals to the control unit in addition to those transmitted by one or more sensors.

At least one of the transmissions can further comprise at least one additional gearing in series with the respective worm gearing. The at least one additional gearing can include a gear train comprising a pivotable gear segment and a gear mating with the gear segment and constituting a spur gear, a bevel gear or a hypoid gear. The at least one transmission can further comprise a form-locking connection between the gear segment and one of the shafts; for example, the gear segment can be of one piece with one of the shafts.

A further feature of the invention resides in the provision of a power train which can be put to use in a motor vehicle and comprises a prime mover, an automatically operable gearbox having a plurality of gear ratios, means for transmitting torque between the prime mover and the gearbox, and means for operating the gearbox including a signal receiving and signal transmitting control unit, monitoring means including at least one sensor arranged to transmit signals to the control unit, and actuating means including at least one actuator which is responsive to signals from the control unit to select gear ratios and to shift the gearbox into selected gear ratios. The at least one actuator includes first and second driving units, a first transmission including a first worm gearing and arranged to transmit axial motion from the first driving unit to a gear ratio selecting axially movable first shaft of the gearbox, and a second transmission including a second worm gearing and interposed between the second driving unit and a rotary second shaft forming part of and arranged to shift the gearbox into the gear ratio selected by the axially movable first shaft.

Alternatively, the at least one actuator can include first and second driving units, a first transmission including a first worm gearing and arranged to transmit motion from the first driving unit to a gear ratio selecting rotary first shaft of the gearbox, and a second transmission including a second worm gearing and interposed between the second driving unit and an axially movable second shaft forming part of and serving to shift the gearbox into a desired gear ratio, e.g., the gear ratio selected by the rotary first shaft.

Still further, the at least one actuator can include first and second driving units, a first transmission including a first worm gearing and serving to transmit axial motion from the first driving unit to a gear ratio selecting axially movable first shaft of the gearbox, and a second transmission including a second worm gearing and being interposed between the second driving unit and a second axially movable shaft forming part of and serving to shift the gearbox into a desired gear ratio, such as the gear ratio selected by the axially movable first shaft.

Still another feature of the invention resides in the provision of a power train which can be utilized in a motor vehicle and comprises a prime mover, a gearbox device which is operable to furnish a plurality of gear ratios, a torque transmitting device which is operable to transmit a variable torque between the prime mover and the gearbox device, and means for operating at least one of the two devices including a signal receiving and signal transmitting control unit, monitoring means for transmitting signals to the control unit, and actuating means including at least one actuator responsive to signals from the control unit to operate at least one component of the at least one device, a driving unit, and a transmission between the driving unit and the at least one component. The transmission comprises two substantially disc-shaped rotary elements which are movable relative to each other, torque transmitting energy storing means disposed between the disc-shaped elements, substantially tooth-shaped projections provided on at least one of the elements, and at least one velocity sensor arranged to monitor the movements of the projections.

Each of the at least two disc-shaped elements can be provided with peripheral projections, and the at least one sensor can form part of the aforementioned monitoring means; such sensor can be arranged to ascertain the extent of rotary movements of the disc-shaped elements relative to each other.

An additional feature of the instant invention resides in the provision of a power train which can be put to use in a motor vehicle and comprises a signal receiving and signal transmitting control unit as well as an actuator which is responsive to signals from the control unit and includes at least one driving unit and a transmission between the at least one driving unit and at least one mobile component of the power train (e.g., a rotary and/or axially movable shaft in an automated gearbox). The transmission comprises at least two substantially disc-shaped elements which are disposed in a power flow from the at least one driving unit to the at least one component and which are rotatable with and relative to each other. The disc-shaped elements have peripheral zones (e.g., radially outermost marginal zones) provided with magnetized or magnetizable portions providing a plurality of magnetic poles spaced apart from each other in the circumferential direction of the at least two disc-shaped elements and establishing a magnetic field, and the transmission further comprises resilient torque transmitting means (such as a set of prestressed coil springs) arranged to oppose rotation of the at least two disc-shaped elements relative to each other. The power train further comprises at least one sensor serving to monitor the magnetic field and to generate signals which denote at least one of a plurality of variable parameters including the rotational speed of at least one of the at least two disc-shaped elements and the extent of rotation of the at least two elements relative to each other.

The at least one sensor can be used to transmit signals to the control unit.

The magnetic poles include south and north poles which alternate with each other in the peripheral zone of each of the at least two disc-shaped elements, as seen in the circumferential direction of the respective elements. These elements have predetermined starting angular positions relative to each other in which the south and north poles of one of the elements assume predetermined positions relative to the south and north poles of the other element to establish a magnetic field having magnetic force lines extending in one of two directions including in, and substantially at right angles to, the planes of the respective elements. The magnetic force lines extend also in the other of the two directions in response to rotation of the elements relative to each other from their starting angular positions against the opposition of the resilient torque transmitting means, and this can be detected and signalled by the at least one sensor. The arrangement can be such that the magnetic field has a component which disappears or is weaker in the starting angular positions of the elements relative to each other and develops in response to rotation of the elements away from their starting angular positions; the at least one sensor can be arranged to generate signals denoting the extent of rotation of the elements relative to each other away from their starting angular positions by monitoring the aforementioned component of the magnetic field.

Still further, it is possible to design the just discussed power train in such a way that one of the at least two disc-shaped elements provides a plurality of alternating south and north poles while the peripheral zone of the other element includes an annulus of neighboring projections (e.g., in the form of lugs, teeth or the like) having different polarities. The poles of the one element are adjacent oppositely polarized projections of the other element in the predetermined starting angular positions of the elements relative to each other, and the at least one sensor can be arranged to generate signals denoting variations of the magnetic field in response to rotation of the elements away from their predetermined starting angular positions relative to each other. The positions of the projections can be selected in such a way that the annulus of these projections always includes a portion which is disposed between the at least one sensor and the peripheral zone of the one element in each angular position of the at least two elements relative to each other.

The arrangement can be such that the projections of the other element and the poles of the one element are located in a common plane. Furthermore, the annulus of projections can surround the poles of the one element, and the projections can extend substantially at right angles to the plane of the one element.

The at least one sensor can be connected to an input of the control unit to transmit signals which denote the extent of rotation of the at least two disc-shaped elements relative to each other as a function of the amount of energy stored by the resilient torque transmitting means in opposing the rotation of the elements relative to each other.

The novel features which are considered as characteristic of the invention are set forth in particular in the appended claims. The improved power train itself, however, both as to its construction, its mode of operation and the mode of assembling and installing the same, together with numerous additional important and advantageous features thereof, will be best understood upon perusal of the following detailed description of certain presently preferred specific embodiments with reference to the acompanying drawings.

BRIEF DESCRIPTION OF THE DRAWINGS

FIG. 10 is an elevational view of another actuator;

FIG. 11 is an enlarged fragmentary partly sectional view of the actuator of FIG. 10;

FIG. 14 is a table showing various combinations of actuators, control units therefor and locations of such actuators and control units in motor vehicles;

FIG. 17b illustrates a modification of the damper-sensor combination of FIG. 17a;

DESCRIPTION OF PREFERRED EMBODIMENTS

Figure 1:
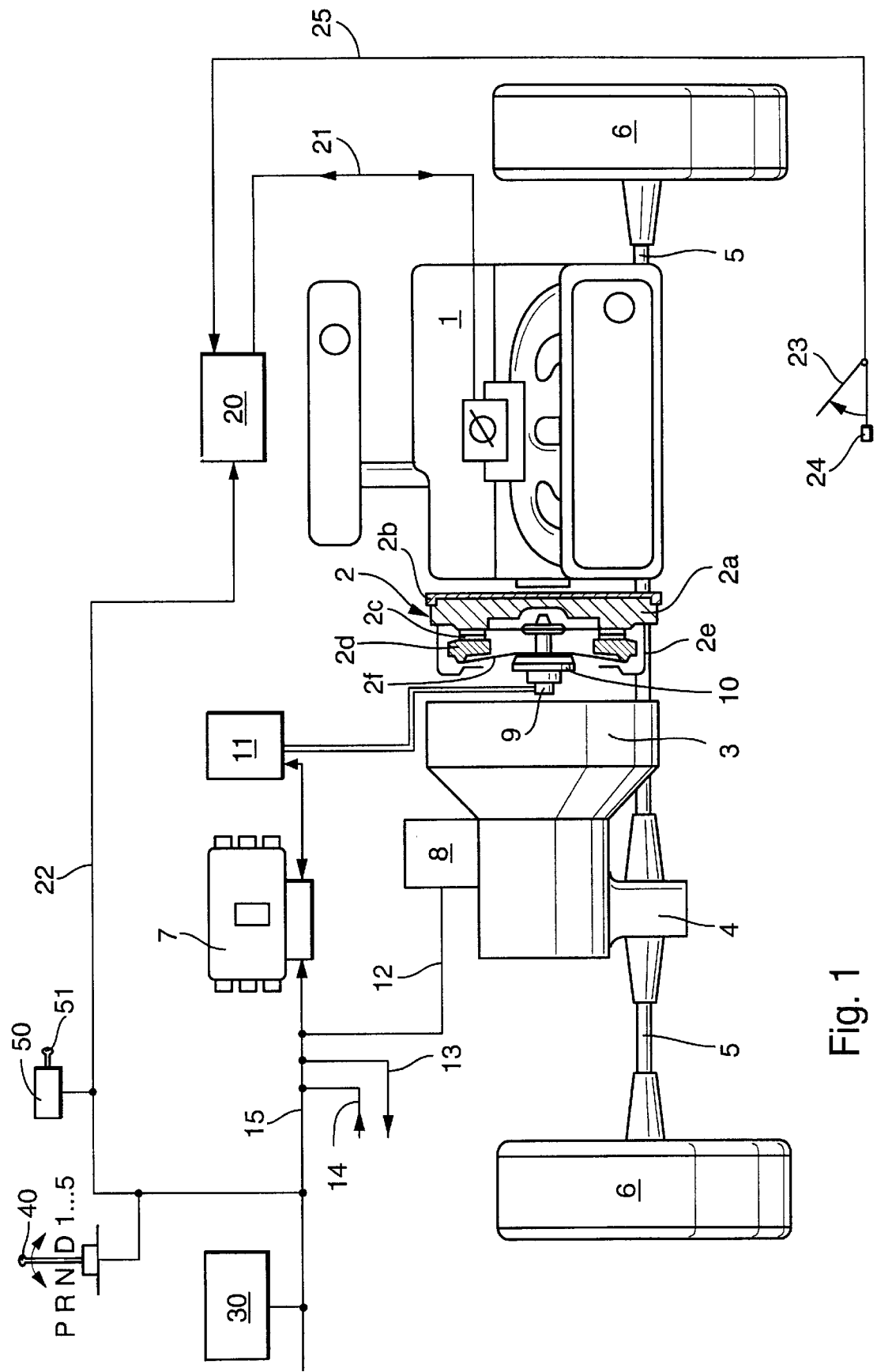
FIG. 1 is a schematic view of a motor vehicle comprising a power train which embodies one form of the invention.

FIG. 1 is a schematic plan view of a motor vehicle which comprises a power train including a prime mover 1 (such as an internal combustion engine), an automated transmission 3 (hereinafter called gearbox to differentiate from other transmissions), and a torque transmitting system 2 which is designed to transmit torque from an output element (such as a camshaft or a crankshaft) of the prime mover 1 to a shaft or another suitable input element of the gearbox 3. The output element of the gearbox 3 normally drives a differential 4 which, in turn, drives the axles 5 of the driven wheels 6 when the motor vehicle is in use and when the transmission of torque takes place from the prime mover 1 to the wheels 6.

At least one of the axles 5 and/or at least one of the driven wheels 6 can be utilized to cause one or more suitable sensors (not shown in FIG. 1) to generate signals denoting the RPM of the monitored parts, i.e., the speed of the motor vehicle. The just mentioned sensor or sensors can be utilized jointly with or in lieu of one or more sensors (not specifically shown) serving to ascertain the speed of the motor vehicle in cooperation with one or more electronic units, such as a conventional antiblock system (ABS).

The means for operating the automated gearbox 3 comprises an electronic control unit 7 having one or more signal receiving inputs at least one of which can receive signals from the aforementioned sensor or sensors so that the unit 7 can ascertain and display and/or otherwise process information denoting the speed of the motor vehicle. Still further, the signal(s) transmitted to the control unit 7 can be processed to furnish information denoting the RPM of one or more components (e.g., the input shaft and/or the output shaft) of the gearbox 3.

Instead of constituting an internal combustion engine, the prime mover 1 of the power train in the motor vehicle of FIG. 1 can constitute a hybrid drive employing, for example, an electric motor, a flywheel, a freewheel and a combustion engine.

The illustrated torque transmitting system 2 is a friction clutch. However, it is equally possible to employ a torque transmitting system which includes or constitutes a magnetic particle or powder clutch, a multiple-disc clutch, a hydrokinetic torque converter with a so-called bypass or lockup clutch, or any other suitable torque transmitting system. It is also possible to employ a clutch which is provided with means for automatically compensating for wear at least upon the friction linings of a clutch disc or clutch plate which serves to transmit torque to the rotary input element of a gearbox. Reference may be had, for example, to commonly owned U.S. Pat. No. 5,450,934 (granted Sep. 19, 1995 to Paul Maucher for "FRICTION CLUTCH") which discloses a friction clutch wherein the axial position of the pressure plate is automatically adjusted in response to wear at least upon the friction linings of the clutch disc. Commonly owned U.S. Pat. No. 5,377,796 (granted Jan. 3, 1995 to Oswald Friedmann and Johann Jäckel for "APPARATUS FOR TRANSMITTING FORCE BETWEEN ROTARY DRIVING AND DRIVEN UNITS") discloses a hydrokinetic torque converter which includes a bypass or lockup clutch and which can be utilized in lieu of the friction clutch 2 shown in FIG. 1 of the present application. The disclosures of all U.S. patents and of all allowed or about to be allowed U.S. patent applications mentioned in the present application are incorporated herein by reference.

The means for operating the automated gearbox 3 comprises the aforementioned control unit 7 and actuating means including at least one actuator 8 directly associated with the gearbox 3 in any one of several ways to be fully described hereinafter. The actuator 8 receives signals from the control unit 7 via conductor means 12, and such signals determine the selection of a particular gear ratio of the gearbox 3 as well as the shifting into and from such selected gear ratio.

FIG. 1 further shows a second actuator 11 which can receive signals from and can transmit signals to the control unit 7 and serves to select the torque which the torque transmitting system 2 transmits or should transmit from the prime mover 1 to the input element of the gearbox 3 (it is assumed here that the system 2 includes an automated (rather than manually operable) friction clutch which can be operated in response to signals from the corresponding output or outputs of the control unit 7). Thus, the control unit 7 is a so-called integrated control unit which can transmit signals to the actuator 8 to operate the automated gearbox 3 as well as signals to the actuator 11 to operate the automated friction clutch 2.

It is further possible to design the control unit 7 in such a way that it embodies a suitable electronic circuit for the prime mover 1. However, FIG. 1 shows a discrete motor circuit 20 which is connected with (to receive signals from and to transmit signals to) the control unit 7 by way of conductor means 15, 22.

Still further, it is possible to provide a discrete control unit for the actuator 11, i.e., the improved power train can employ a first control unit 7 for the actuator 8 which actuates the gearbox 3, a second control unit (not shown) for the actuator 11 which actuates the friction clutch 2, and a third control unit (20) which actuates the prime mover 1. Reference may be had, for example, to commonly owned pending U.S. patent application Ser. No. 08/788,011 which is a division of Ser. No. 08/393,316 and corresponds to German patent application Serial No. 1 950 4847.

The connection(s) between two or more control units (such as 7 and 20) can include conductor means and/or other data and/or signal transmitting means. Each such control unit can receive signals from monitoring means including one or more sensors, electronic circuits or the like. The monitoring means can transmit signals denoting the parameter(s) of or at the actual operating point.

Still further, it is possible to connect the input or inputs of one or more control units (such as 7 and/or 20) with data lines or with a data bus.

The illustrated control unit 7 comprises a computer (not specifically shown) which receives, processes, memorizes, addresses, displays and/or transmits the signals and/or other information supplied by one or more sensors and/or electronic circuits of the aforediscussed monitoring means connected with the inputs of the control unit 7. As shown in FIG. 1, and as will be described hereinafter, the output or outputs of the control unit 7 can transmit signals to the actuators 8, 11, to the electronic circuit (control unit) 20 for the prime mover 1, and to one or more additional signal-operated or signal processing devices of the motor vehicle.

The friction clutch 2 which is shown in FIG. 1 is mounted on a flywheel 2a driven by the crankshaft or camshaft of the prime mover 1. The flywheel 2a can constitute a one-piece flywheel or a composite flywheel with a primary flywheel, a secondary flywheel and one or more dampers between them. Reference may be had, for example, to FIG. 35 of the aforementioned commonly owned U.S. Pat. No. 5,450,934 to Paul Maucher as well as to numerous other U.S. patents of the assignee of the present application.

The flywheel 2a carries a starter gear 2b and transmits torque to a clutch disc 2c when the friction clutch 2 is at least partially engaged so that the clutch disc 2c can transmit torque to the rotary input element of the gearbox 3. When the friction clutch 2 is engaged, the friction linings of the clutch disc 2c are clamped between the flywheel 2a and an axially movable pressure plate 2d which is biased by a diaphragm spring 2f reacting against a clutch housing or cover 2e. If the friction clutch 2 is of the self-adjusting type, it further comprises means for automatically shifting the pressure plate 2d (e.g., with the diaphragm spring 2f) toward the flywheel 2a to an extent which is necessary to compensate at least for the wear upon the friction linings of the clutch disc 2c. Such self-adjusting clutch normally comprises one or more sensors which monitor the extent of wear upon the friction linings of the clutch disc 2c and initiate or permit a requisite axial adjustment of the pressure plate 2c and diaphragm spring 2f (or another suitable clutch spring) relative to the housing 2e, namely toward the flywheel 2a.

The means 9 for engaging and disengaging the friction clutch 2 comprises a bearing 10 which can effect axial displacements; of radially inwardly extending tongues or prongs forming part of the diaphragm spring 2f to thus determine the bias of the radially outer portion of the spring 2f upon the pressure plate 2d. The actuator 11 serves as a means for adjusting the friction clutch 2 by way of the engaging/disengaging means 9. Such adjustment can be effected by way of an electrohydraulic, pneumatic, mechanical, magnetic or electromotorical connection between the actuator 11 and the means 9. The bearing 10 may but need not be coaxial with the rotary parts of the friction clutch 2 and the input element of the gearbox 3. The friction clutch 2 can be a so-called push-type or pull-type friction clutch. The exact nature of the operative connection between the actuator 11 and the friction clutch 2 of FIG. 1 forms no part of the present invention.

As will be described in detail hereinafter, the actuator 8 can be provided with one or more output elements which transmits or transmit motion to one or more mobile (such as rotary and/or axially movable) components (e.g., shafts) in or on or at the case of the gearbox 3. For example, a first component (such as an axially and/or angularly movable shaft) can serve to select a desired gear ratio (as determined by the signal or signals from the control unit 7 or as initiated by the operator of the motor vehicle), and a second component (such as an axially and/or angularly movable shaft) can serve to shift the gearbox 3 into the selected gear. The exact nature and the number of components will depend upon the design of the gearbox 3.

Certain types of gearboxes are provided with a so-called central shaft which is designed to select a desired gear ratio by carrying out an axial movement or an angular movement and which further serves to shift into a selected gear by carrying out an angular movement or an axial movement. The actuator for such a transmission includes a first output element which can cause the central shaft to perform angular movements, and a second output element which can cause the central shaft to carry out other types of movements (such as axial movements). Thus, a selection of a gear ratio can involve an axial movement and the shifting into a selected gear can involve an angular movement of the central shaft, or vice versa.

Other types of gearboxes can employ pairs of shafts, one for the selection of desired gear ratios and the other for shifting into selected gears. In such gearboxes, both shafts can carry out identical (angular or axial) movements, or each of these shafts carries out a movement other than that performed by the other shaft.

A further type of gearboxes employs sets of so-called shifting rods, one for each gear ratio. The arrangement is such that a selected rod (pertaining to a desired gear ratio) is caused to move axially in order to shift the gearbox into the selected gear.

The aforementioned shafts and rods can constitute internal components of the respective types of gearboxes, or they can serve to transmit motion to internal components, i.e., to components which are at least partially confined in or extend into the cases of the corresponding gearboxes. Thus, the actuator 8 can be designed to transmit motion (directly or indirectly) to components located outside of, extending in part into, or fully confined in the case of the gearbox 3, and such components are designed to select the desired gear ratios, to shift into the selected gears, or to shift from the previously selected gears to neutral or preparatory to selection of and shifting into a different gear. The actuator 8 can carry out such operations regardless of whether the actuatable component or components of the gearbox includes or include a single (central) shaft, several discrete shafts, or several discrete shifting rods.

The signal transmitting conductor 12 connects the control unit 7 with the actuator 8, and such conductor can transmit signals from the unit 7 to the actuator 8 as well as in the opposite direction. The signals can include operating signals, signals from one or more sensors (e.g., sensor(s) forming part of or connected with the actuator 8 and designed to furnish information pertaining to various conditions of the gearbox 3), and/or other types of information. The control unit 7 can address the signal storing memory or memories of the actuator 8 at regular intervals or when necessary, and vice versa.

Further conductors (such as those shown at 13 and 14) serve to connect the control unit 7 with one or more parts of a monitoring arrangement, such as sensors, electronic circuits and/or others. The connection(s) with the parts of a monitoring arrangement can be continuous or they can be temporary and can be established at regular or other intervals, e.g., when necessary. The engine electronics 20 can constitute one part or element of such monitoring arrangement. Other part or parts of the monitoring arrangement can include or constitute an electronic antiblocking system (ABS), an electronic antislip system and/or others. The sensor(s) of the just discussed monitoring arrangement can include one or more sensors for the generation of signals denoting various variables or parameters of the motor vehicle, such as one or more sensors serving to monitor the RPM of the prime mover 1, one or more sensors serving to monitor the RPM of the wheels 6, one or more sensors serving to monitor the angular position of the flap of a throttle valve 1a in the prime mover 1, one or more sensors serving to monitor the position of the gas pedal, and/or others.

The conductor 15 connects the control unit 7 with a data bus, such as a CAN bus, which can supply system data pertaining to the motor vehicle or electronic circuits other than those already mentioned hereinbefore. As a rule, various electronic circuits are interconnected by computerized units.

An automated gearbox can be designed in such a way that it can be shifted into a selected gear or gear ratio in response to a command from the operator of the motor vehicle; such shifting can be initiated by depressing a knob or the like, by changing the position or condition of a switch, or by changing the position of a pivotable and/or otherwise movable selector 40 (e.g., a lever) which can select the neutral ratio (N), parking (P), reverse (R), direct (D) or one or more forward gear ratios (e.g., 1 . . . 5). It is also possible to equip the motor vehicle with means for generating signals denoting that the gearbox should be shifted into a higher or into a lower gear, and/or for generating signals denoting the next gear ratio to be selected by the manual or automated gear ratio selecting means. Still further, the motor vehicle can be provided with means (e.g., an electronic shift lever) for indicating the effective (last selected and shifted into) gear ratio of the gearbox.

In certain other types of motor vehicles, an automated gearbox can be programmed in such a way that the gear ratios are selected in dependency upon operational parameters, i.e., the selection of gear ratios can be fully automated. Furthermore, automatic shifting into selected gears can take place, for example, on the basis of characteristic values, characteristic curves or characteristic fields (diagrams) and on the basis of sensor signals. Thus, when the intensity or another characteristic of the signal from a sensor reaches or exceeds a threshold value, the gearbox can be automatically shifted into a different gear without necessitating any action by the operator of the motor vehicle.

For example, the neutral position N shown in the upper left-hand corner of FIG. 1 can denote a condition in which the motion- or force-transmitting connection between the input and output elements of the gearbox 3 is interrupted. The position P of the selector 40 can denote a condition in which the vehicle is to be parked, e.g., as a result of the application of one or more brakes and/or as a result of shifting the gearbox 3 into a gear to ensure that the motor vehicle will remain at a standstill even on an upwardly or downwardly sloping surface in a garage or on a road. It is also possible to automatically shift the selector 40 to the position P, for example, in response to withdrawal of the ignition key 51 from the engine starting means 50. Of course, such automatic shifting to the position P should not take place if the ignition key 51 is withdrawn from the keyhole in the starting means 50 while the motor vehicle is advancing at an elevated speed and/or under certain other circumstances when a shifting to P could entail damage to the motor vehicle and/or danger to the occupant(s).

Still further, the illustrated selector 40 can be moved to a position M preparatory to manual shifting into a desired gear ratio, such as direct (D), neutral (N), first forward gear (1), and so forth. The illustrated pivotable lever-shaped selector 40 can be replaced by a switch or by any other suitable manually operable gear ratio selecting and shifting means.

The motor vehicle of FIG. 1 is further equipped with an electronic gas pedal or load lever 23 cooperating with a sensor 24 which transmits signals to the electronic circuit 20 via conductor means 25. Signals from the sensor 24 to the circuit 20 can serve to regulate the rate of fuel supply to the prime mover 1, the timing of ignition, the injection times and/or the position of the throttle valve 1a.

The aforementioned conductor 22 connects the electronic circuit 20 for the prime mover 1 with the control unit 7. The conduits 15 and 22 further serve to connect the control unit 7 with an optional electronic circuit 30 for the friction clutch 2. A conductor 21 serves to transmit signals from the electronic circuit 20 to the throttle valve 1a in order to select the positions or settings of the throttle valve. In the motor vehicle of FIG. 1, a direct mechanical connection to the gas pedal 23 is no longer necessary or practical.

The purpose of the device 50 and key 51 is to enable the operator of the motor vehicle to start the prime mover 1 by way of a suitable starter unit (motor) and to activate the electronic circuit 20 for the prime mover.

Figure 2:
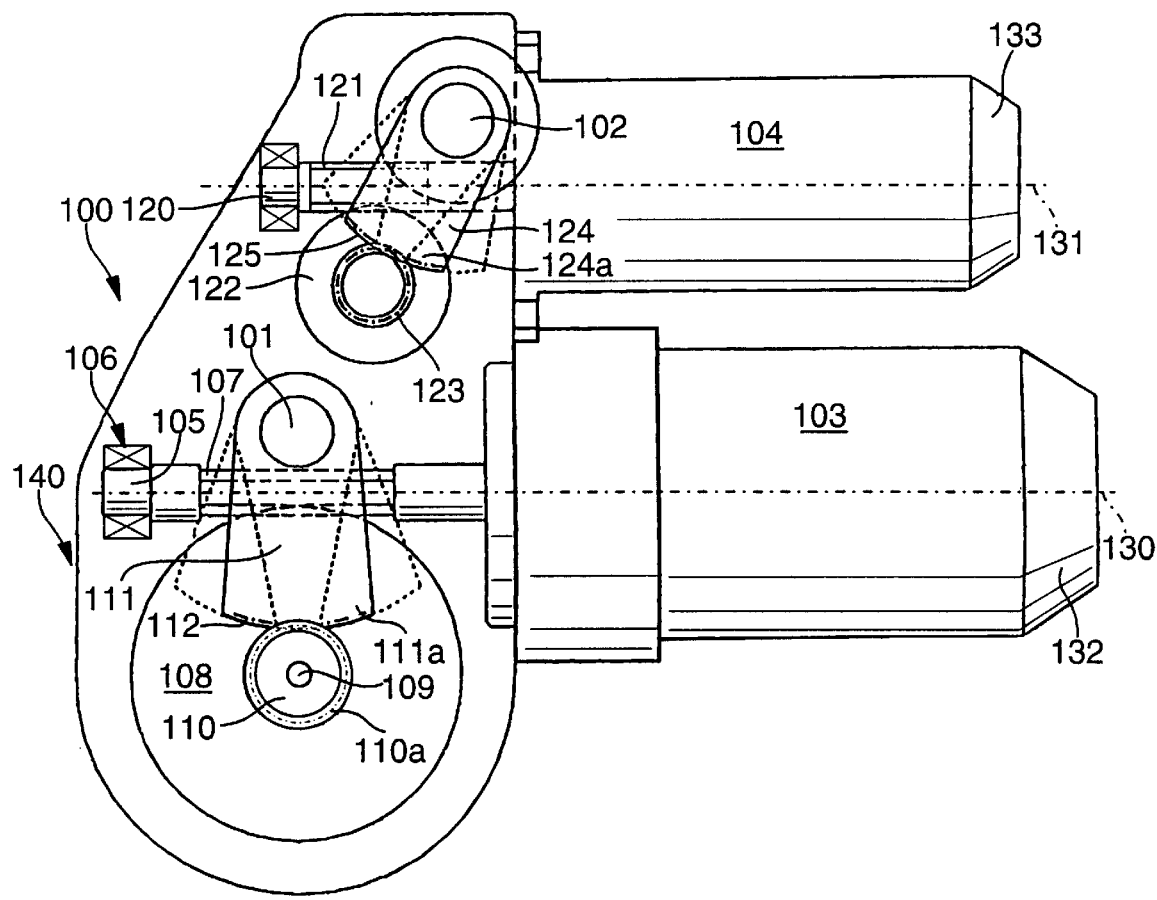
FIG. 2 is an elevational view of an actuator which can be utilized in the improved power train.

FIG. 2 shows the relevant details of an actuator 100 which can be utilized in the motor vehicle of FIG. 1 to replace or to constitute the schematically represented actuator 8, i.e., which can be connected with and whose operation can be regulated by the control unit 7 of FIG. 1 for the purpose of selecting the gear ratio of a gearbox (shown only partially in FIG. 2) and for shifting the gearbox into the selected gear. The gearbox which is operated by the actuator 100 comprises two parallel components 101, 102 one (102) for the selection of gear ratios and the other (101) for shifting into selected gears. The arrangement is such that the components 102, 101 (each of which is a shaft) must be rotated through predetermined angles in order to respectively select a desired gear ratio and to shift into the selected gear or gear ratio.

The actuator 100 comprises a first driving unit 103 (e.g., an electric motor) having an output shaft 105, and a second driving unit 104 (e.g., an electric motor) having an output shaft 120. A first multi-stage transmission serves to transmit motion from the output shaft 105 of the driving unit 103 to the shaft 101 of the gearbox, and a second multistage transmission serves to transmit motion between the output shaft 120 of the driving unit 104 and the shaft 102 of the gearbox.

The first stage of the first transmission comprises a worm gearing including a worm 107 on (e.g., forming part of) the output shaft 105 (which is rotatable in a suitable bearing 106) and a worm wheel 108 which mates with the worm 107 and is rotatable about the axis of a shaft 109. The second stage of the first transmission comprises a spur gearing including a spur gear 110 coaxial with and affixed to (e.g., of one piece with) the worm wheel 108 for rotation about the axis of the shaft 109. The teeth 110a of the spur gear 110 mesh with the teeth 112 of a gear segment 111a forming part of a lever 111 which is non-rotatably secured to the shaft 101 of the gearbox. The axis 130 of the output shaft 105 is located in the plane of the worm wheel 108.

The first stage of the second transmission comprises a worm gearing having a worm 121 coaxial with and driven by the output shaft 120 of the driving unit 104, and a worm wheel 122 which mates with the worm 121 and is rotatable about the axis of a shaft parallel to the shaft 109. The second stage of the second transmission is a spur gearing including a spur gear 123 coaxial with and driven by the worm wheel 122, and a gear segment 124a having teeth 125 meshing with the teeth of the spur gear 123. The gear segment 124a forms part of a lever 124 which is non-rotatably affixed to the shaft 102 of the gearbox. The axis 131 of the output shaft 120 is located in the plane of the worm wheel 122, and the latter is coplanar with the worm wheel 108 or is located in a plane which is parallel to that of the worm wheel 108 and the axis 130, or in a plane which is inclined relative to the plane of the worm wheel 108.

The pole boxes or casings or stators of the driving units 103, 104 are respectively shown at 132 and 133. Signals for the starting and stoppage of the driving units 103, 104 are furnished by a control unit (not shown in FIG. 2) corresponding to the control unit 7 of FIG. 1.

The electric motors of the driving units 103, 104 can constitute d-c motors, a-c motors, travelling-wave motors, switched reluctance motors or stepping motors.

The spur gears 110, 123 can be replaced with bevel gears, hypoid gears or other suitable gears, and the teeth of the respective gear segments 111a, 124a are then selected to mate with those of the bevel, hypoid or other gears.

When the control unit (such as 7) starts the driving unit 103 to rotate the output shaft 105 and the worm 107, the latter rotates the worm wheel 108 and the spur gear 110 to change the angular position of the shaft 101 (and to thus shift the gearbox into the previously selected gear) by way of the gear segment 111a and lever 111 until the driving unit 103 comes to a halt. Analogously, the angular position of the shaft 102 is changed by starting the driving unit 104 to rotate the output shaft 120 and the worm 121; the latter rotates the worm wheel 122 and the gear 123 to thus change the angular position of the shaft 102 (and to thus select the gear ratio of the gearbox) by way of the gear segment 124a and lever 124.

It has been found that the space requirements of the actuator 100 of FIG. 2 are highly satisfactory for use in combination with certain types of gearboxes wherein the shafts (102 and 101) for the selection of gear ratios and for shifting into selected gears are parallel to each other. The axes 130, 131 of the output shafts 105, 120 (and of the stators 132, 133) are also parallel to each other. However, it is equally possible (and often advisable) to position the stators 132, 133 in such a way that the axes 130, 131 make a right angle or an oblique angle (e.g., between 30° and 150°).

The housing or casing 140 of the actuator 100 can be designed and dimensioned in such a way that it can confine at least a portion of the control unit (such as the control unit 7 of FIG. 1) and/or at least a portion of the power electronics. However, it is equally within the purview of the instant invention to provide a separate enclosure (housing or casing) for the control unit and/or for the power electronics. The housing 140 of the actuator 100 can be affixed (such as bolted, screwed or otherwise separably secured) to a flange or directly to the case of the gearbox including the shafts 101, 102. Such gearbox can constitute a conventional gearbox with two parallel shafts one of which is to be rotated in order to select a desired gear ratio and the other of which is to be rotated in order to shift the gearbox into or from a selected gear. The arrangement can be such that the pulling force is interrupted during shifting from and into selected gears. The actuator 100 can constitute an add-on attachment the housing 140 of which is secured to the case of the just described gearbox in lieu of manual gear ratio selecting and shifting means.

The illustrated transmissions (each of which includes a worm gearing in series with a spur gearing) are or can be installed in the housing 140 which also carries the stators 132, 133 of the driving units 103, 104. These stators can be affixed to the exterior of the housing 140 and the output shafts 105, 120 then extend into the housing to transmit torque to the worms 107, 121 in the housing. The latter can be provided with one or two openings through which the shafts 101, 102 of the gearbox extend into the housing.

Still further, it is possible to assemble the actuator 100 with a gearbox in such a way that the gear segment 111a can turn a first output element (of the first transmission) which extends into the case of the gearbox to transmit torque to the gear shifting shaft 101, and that the gear segment 124a can turn a second output element (of the second transmission) which extends into the case of the gearbox to transmit torque to the gear ratio selecting shaft 102. The connections between such output elements and the respective shafts 101, 102 can be form-locking connections or connections which can establish reliable frictional engagements between the output elements and the shafts 101, 102.

Figure 2A:
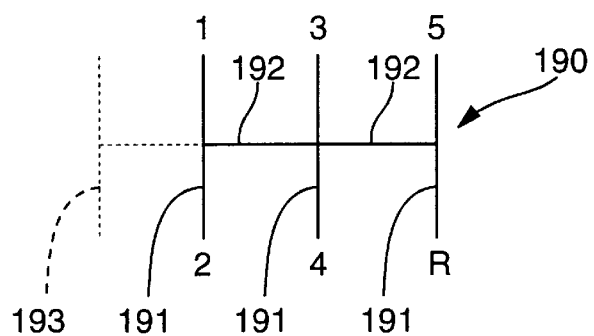
FIG. 2a is a schematic view of a gear shifting gate in an automated gearbox which can be utilized in the improved power train.

FIG. 2a shows schematically a gear shifting gate 190 in a gearbox which can be actuated by the actuator 8 or 100. This gate defines gear shifting paths 191 and a gear ratio selecting path 192. In order to select a different gear ratio, a mobile component of the gearbox is moved along the path 192 into register with a selected path 191 and is thereupon moved along the selected path 191 to put the gearbox into reverse (R) or into one of the forward gears. The gearbox embodying the gate 190 of FIG. 2a is assumed to have standard five forward gears (1 to 5). If desired, a separate shifting path 193 (indicated by dotted lines because it actually constitutes an optional modification of the structure shown by solid lines) can be provided to shift the gearbox in reverse.

It is clear that FIG. 2a shows but one of several schemes of a gearbox which can be operated or actuated by one or more actuators in accordance with the present invention. For example, the gate 190 of FIG. 2a can be replaced with a gate providing four or six forward gears. Moreover, the layout of the paths 191, 192 or 191–193 can be modified depending on the selected design of the automated gearbox which is to be actuated by the actuator 8 or 100.

Figure 3:
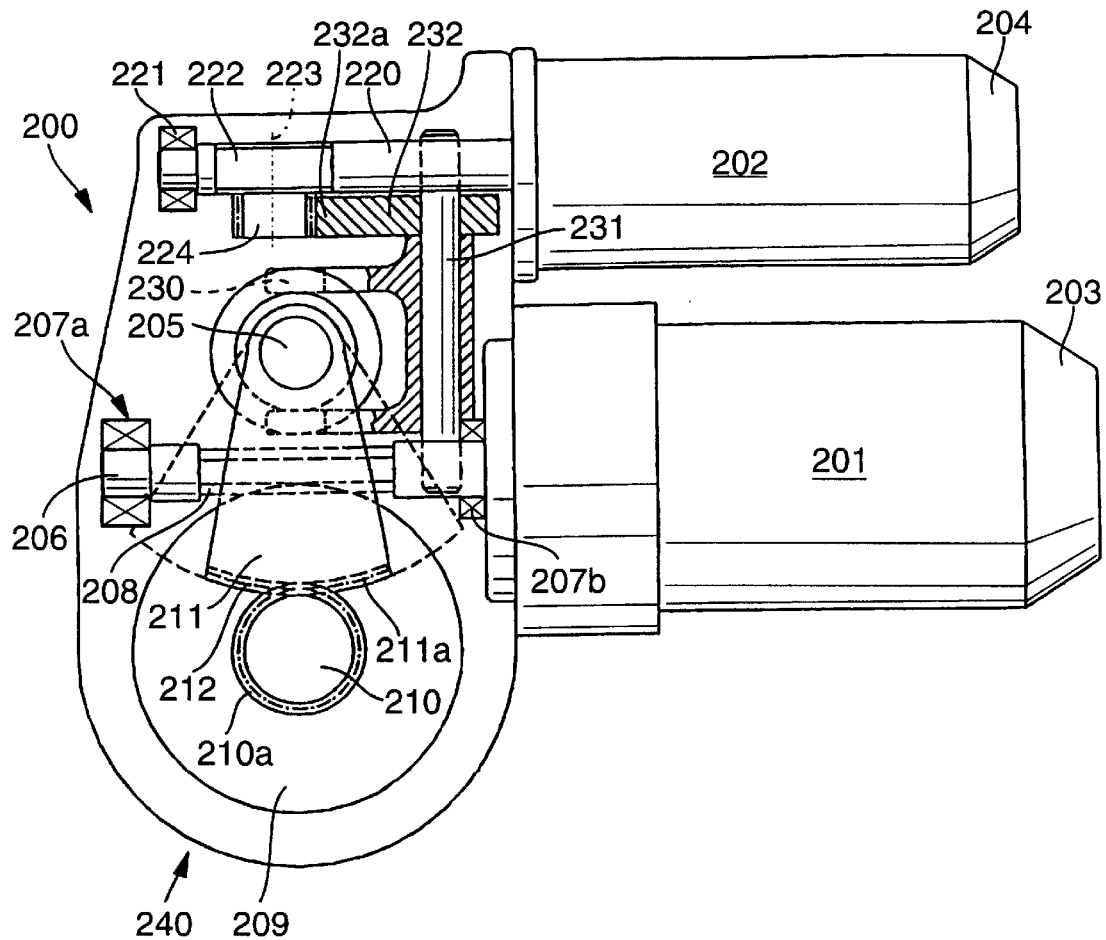
FIG. 3 is a partly elevational and partly sectional view of a modified actuator.

FIG. 3 shows an actuator 200 which serves to impart gear ratio selecting and gear shifting movements to a central shaft 205 of a gearbox. The central shaft 205 must be moved axially to select a desired gear ratio, and this shaft must perform an angular movement in order to shift into or from a particular gear.

The actuator 200 comprises a first driving unit 201, such as an electric motor, having a rotary output shaft 206 which is journalled in suitable bearings 207a and 207b. The shaft 206 carries or is of one piece with a worm 208 forming part of a first stage of a multi-stage transmission between the driving unit 201 and the central shaft 205. The worm 208 mates with a worm wheel 209 rotatable about an axis (shown at 260 in FIG. 5a) which is parallel with the axis of the central shaft 205. The worm wheel 209 is coaxial with and serves to transmit torque to a spur gear 210 forming part of the second stage of the transmission between the driving unit 201 and the central shaft 205. The teeth 210a of the spur gear 210 mesh with the teeth 212 of a gear segment 211a forming part of a lever 211 which serves to change the angular position of the central shaft 205. The spur gear 210 can be of one piece with the worm wheel 209. The connection between the lever 211 and the central shaft 205 permits the central shaft to move axially relative to but compels the central shaft to share all angular movements of the lever 211; for example, such connection can comprise axially parallel external teeth on the central shaft 205 and complementary internal teeth in that portion of the lever 211 which surrounds the central shaft.

Figure 4:
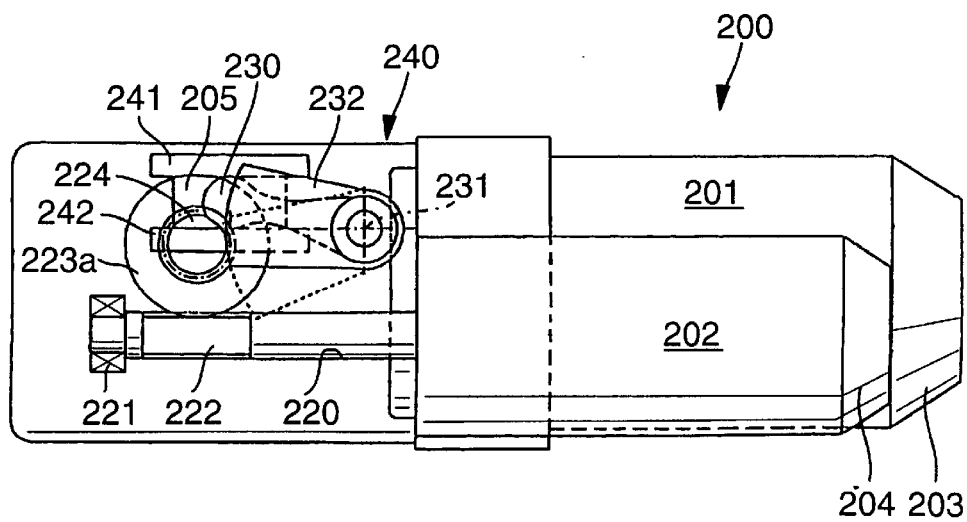
FIG. 4 is another elevational view of the actuator which is shown in FIG. 3.

A second driving unit 202 (e.g., an electric motor) of the actuator 200 has an output shaft 220 journalled in one or more bearings 221 and carrying a worm 222 forming part of a first stage of a second multi-stage transmission and meshing with a worm wheel 223a (see FIG. 4). The worm wheel 223a is coaxial with and serves to transmit torque to a spur gear 224 forming part of the second stage of the second transmission which latter further includes a lever 232 having a gear segment 232a meshing with the spur gear 224. The spur gear 224 can be of one piece with the worm wheel 223a.

The form-locking connection for moving the central shaft 205 axially in response to pivoting of the lever 232 comprises a fork 230 having arms disposed between two axially spaced-apart circular collars 241, 242 on the shaft 205. The fork 230 shares the pivotal movements of the lever 232 and is mounted therewith on a shaft 231 which is normal to the shafts 205, 220 and to the common axis 260 of the worm wheel 209 and spur gear 210.

The driving units 201, 202 have parallel stators 203, 204 which are bolted or otherwise secured to the housing 240 of the actuator 200. For example, the housing 240 can be provided with one or two external flanges and the stators 203, 204 can be secured to such flange(s) by suitable threaded fasteners. The housing 240 is further provided with openings for the output shafts 206, 220. The worm gearings and the spur gearings of the two stages of each of the two transmissions are installed in the housing 240.

Figure 5A:
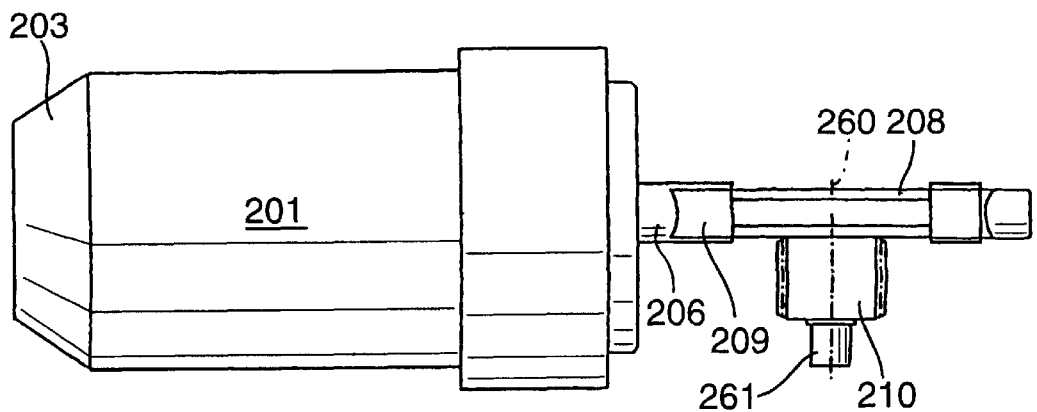
FIG. 5a is a further elevational view of the actuator of FIGS. 3 and 4.

FIG. 5a shows that the worm wheel 209 and the spur gear 210 are mounted on a common shaft having the aforementioned axis 260 and including a stub 261 which is mounted in the housing 240 (FIG. 4) of the actuator 200. The axis 260 is normal to the common axis of the output shaft 206 of the driving unit 201 and the worm 209.

Figure 5B:
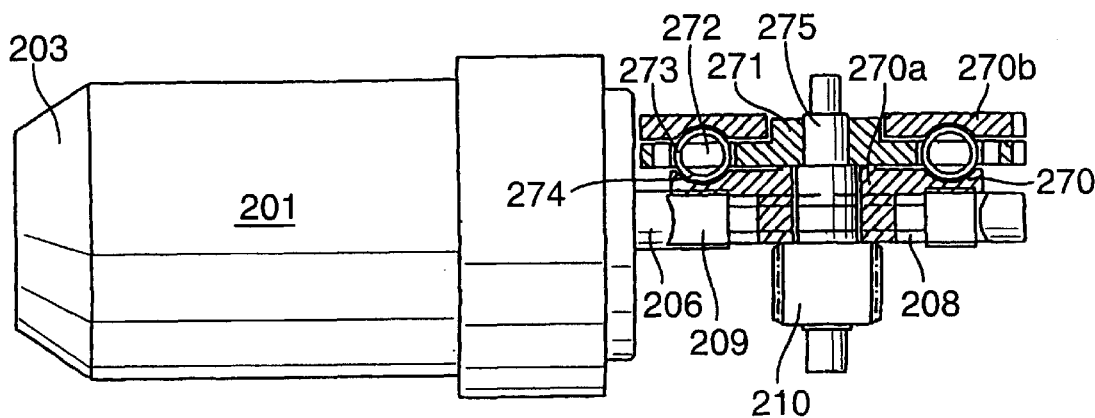
FIG. 5b is a partly elevational and partly sectional view of a further actuator constituting a modification of the actuator shown in FIGS. 3, 4 and 5a and including a damper between a driving unit of the actuator and a component of the gearbox.

FIG. 5b shows a modified torque transmitting connection between the worm wheel 209 and the spur gear 210, i.e., between the first and second stages of the transmission between the driving unit 201 and the central shaft 205 (not shown in FIG. 5b) of the gearing which is operated by the actuator including the driving unit 201.

The worm wheel 209 is rigid and coaxial with a substantially circular element 270 including coaxial axially spaced-apart disc-shaped sections or portions 270a, 270b flanking a disc-shaped element 271 which is of one piece with or is rigidly connected to the shaft 275 of the spur gear 210. The element 271 has windows 272 for portions of prestressed energy storing elements 273 which also extend into pockets or recesses 274 (see FIGS. 6a and 6b) provided in the adjacent surfaces of the sections 270a, 270b of the element 270. The illustrated energy storing elements 273 are coil springs which are caused to store additional energy when the elements 270, 271 (i.e., the worm wheel 209 and the spur gear 210) are caused to turn relative to each other from predetermined starting angular positions in which the elements 273 store minimal amounts of energy.

The elements 270, 271, 273 together constitute a damper which opposes angular displacements of the worm wheel 209 and the spur gear 210 relative to each other. The worm wheel 209 and the spur gear 210 can turn relative to each other only when the resistance of the spur gear 210 to rotation with the worm wheel 209 exceeds the prestressing of the coil springs 273.

Figure 5C:
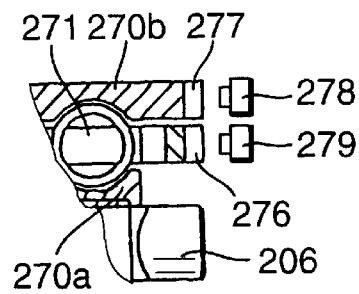
FIG. 5c shows a detail in the actuator including the structure of FIG. 5b.

FIG. 5c shows that the section 270b of the element 270 and the element 271 are respectively provided with annuli of peripheral teeth 277, 276 adjacent to but spaced apart from two stationary sensors 278, 279 which can generate signals denoting the rotational speeds of the elements 270, 271 and/or the extent of angular displacement of the elements 270, 271 (i.e., of the worm wheel 209 and the spur gear 210) relative to each other and/or the extent or acceleration or deceleration of the elements 270, 271. The teeth of the two gears 278, 279 and the adjacent sensors 278, 279 can constitute two Hall generators. Alternatively, it is possible to employ two inductive sensors or any other sensors which can generate signals denoting the extent of angular displacement of the elements 270, 271 with or relative to each other and/or the speeds of angular movements of the worm wheel 209 (element 270) and spur gear 210 (element 271) and/or the rate(s) of acceleration or deceleration of the element 270 and/or 271.

It is also possible to employ optical sensors. For example, a first optical sensor can utilize a radiation source (such as a source of electromagnetic radiation) arranged to emit a beam which is interrupted by the teeth of the gear 277, and such interruptions are monitored by a suitable receiver arranged to generate signals denoting the frequency and/or the duration of interruptions and thus the speed of angular movement and/or the rate of acceleration or deceleration of the element 270. An analogous optical sensor can be utilized to monitor the speed and/or the extent of angular movement and/or the rate of acceleration or deceleration of the element 271. The signals which are transmitted by the sensors 278, 279 or by their equivalents are processed in the control unit (such as 7) which operates the actuator including the structure shown in FIGS. 5b and 5c.

Figure 6A:
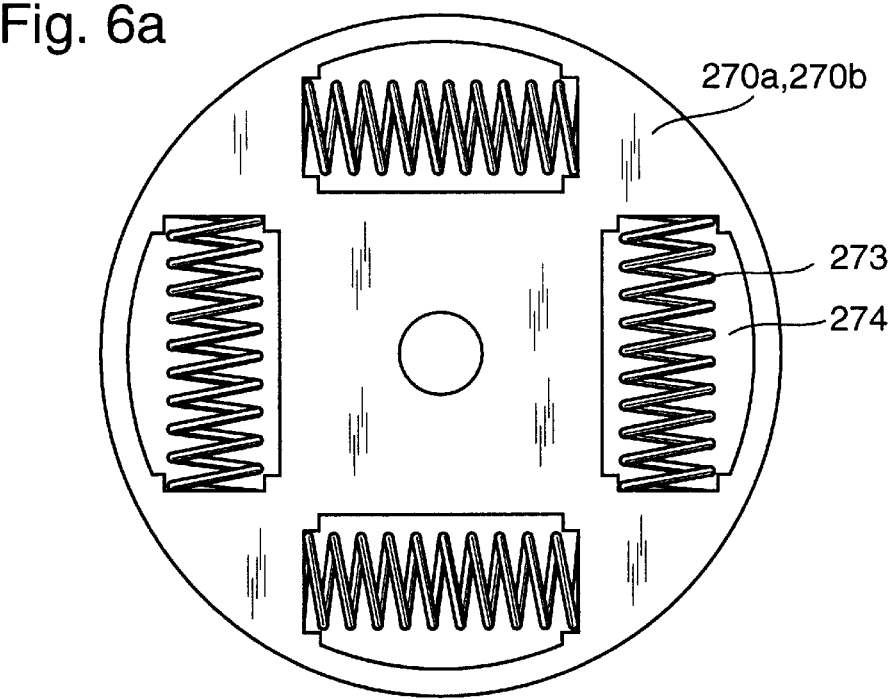
FIGS. 6a and 6b illustrate certain details of a modified damper.
Figure 6B:
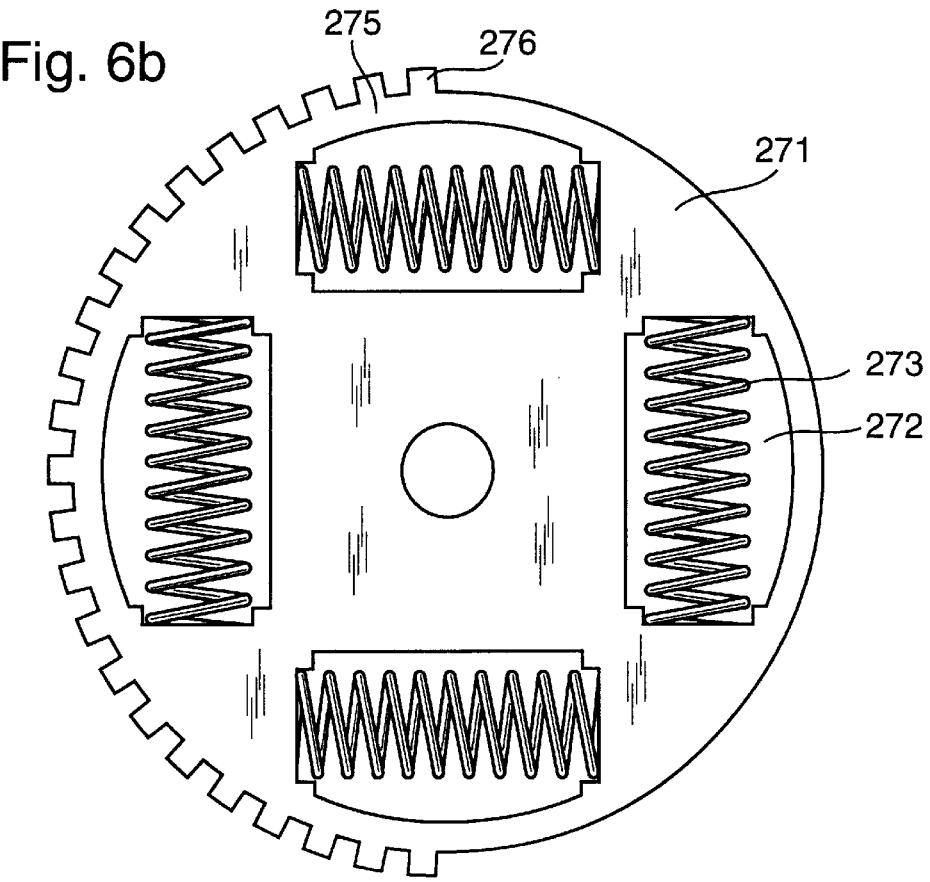

FIGS. 6a and 6b show that the energy storing means between the disc-shaped elements 270 (270a, 270b) and 271 can comprise four equidistant coil springs 273 which are mounted in the windows 272 of the element 271 and in the pockets or recesses 274 of the sections 270a, 270b. The gear 276 forms part of the radially outer (peripheral) portion 275a of the element 271. The gear 277 has been omitted in FIGS. 6a and 6b for the sake of clarity.

The illustrated straight coil springs 273 can be replaced with arcuate coil springs, e.g., with precurved coil springs having centers of curvature on the common axis of the elements 270, 271; the illustrated straight windows 273 and straight pockets 274 are then replaced with arcuate windows and arcuate pockets. Still further, each of the four individual one-piece coil springs 273 (or at least some of these one-piece coil springs) can be replaced with sets of two or more coil springs which are fitted into each other. Reference may be had to FIG. 2 of U.S. Pat. No. 5,377,796 which shows sets of arcuate coil springs wherein the coil springs of each set are fitted into each other.

It is further clear that other types of resilient means (such as blocks of elastomeric synthetic plastic material) can be utilized with or in lieu of the coil springs 273.

The improved power train can further embody certain features of the actuating arrangement which is described and shown in the commonly owned copending U.S. patent application Ser. No. 08/815,348 of Wolfgang Reik et al. (corresponding to the commonly owned copending German patent application Ser. No. 196 27 980), and in the commonly owned copending U.S. patent application Ser. No. 08/836,847 filed by Burkhart Kremmling et al. for "MOTOR VEHICLE WITH APPARATUS FOR THE ACTUATION OF THE TORQUE TRANSMITTING SYSTEM AND OF THE TRANSMISSION" (corresponding to the commonly owned copending German patent application Ser. No. 195 33 640). Tie disclosures of the above-identified pending United States patent applications are to be considered as being incorporated herein by reference upon allowance of one or more claims therein or upon granting of one or more United States Letters Patent thereon.

Figure 7:
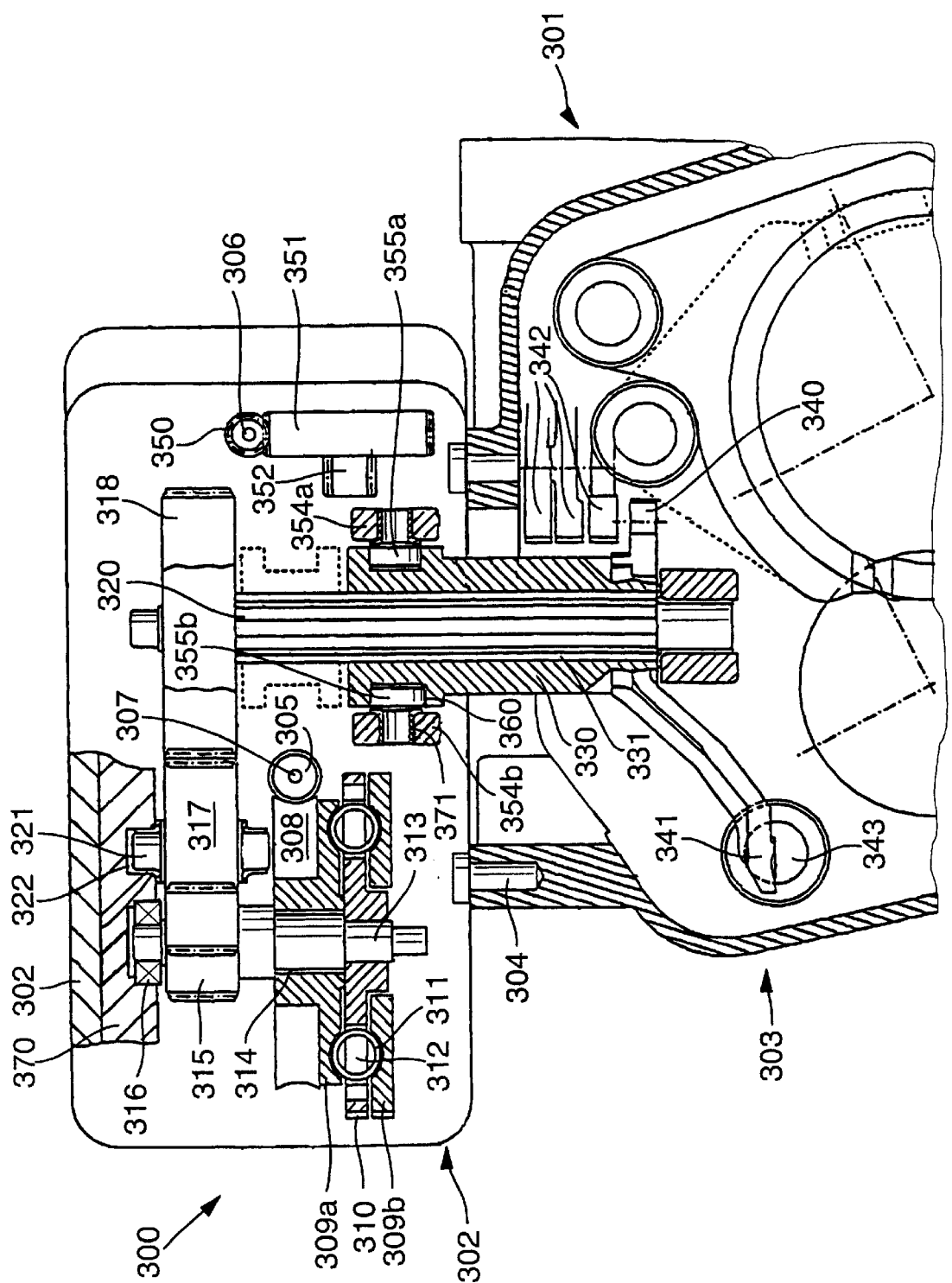
FIG. 7 is a fragmentary partly elevational and partly sectional view of a portion of a power train including a further actuator and an automated gearbox which can be operated by the actuator.
Figure 8:
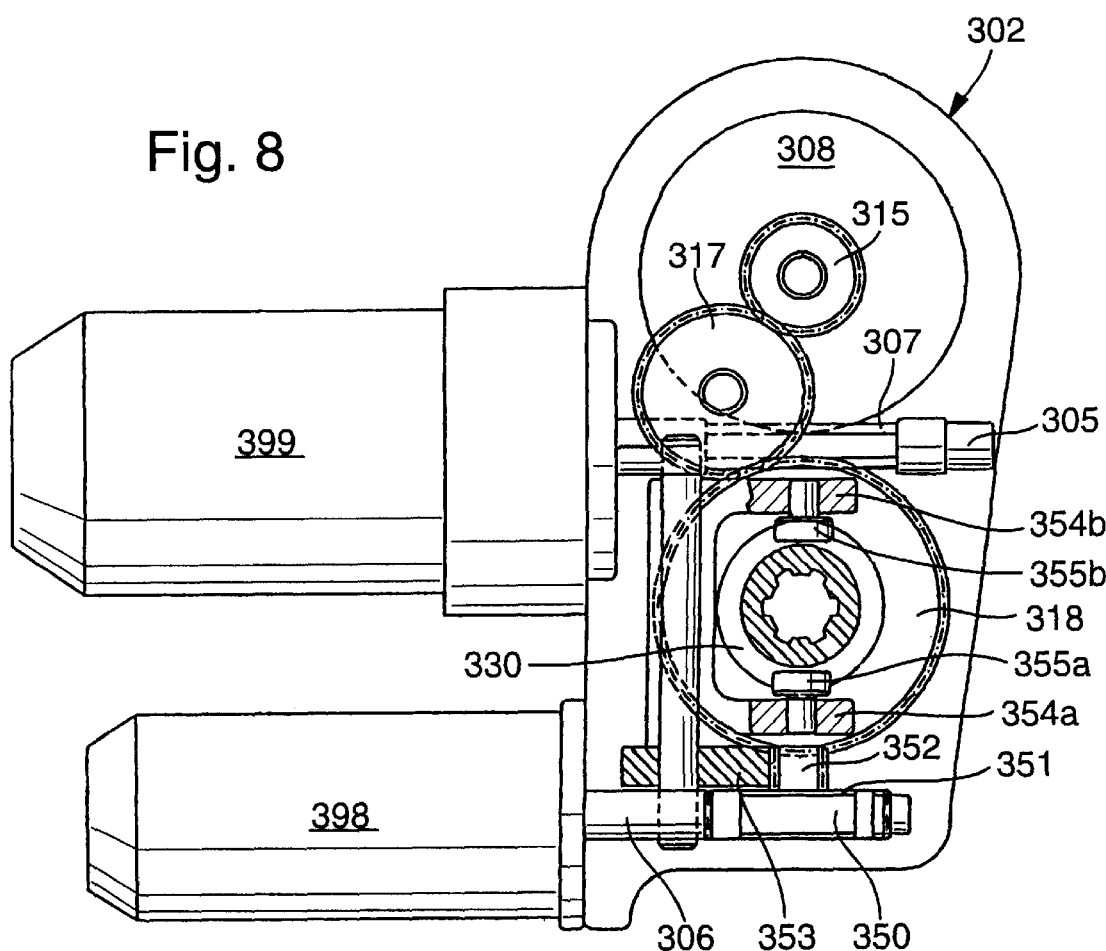
FIG. 8 is a smaller-scale fragmentary partly elevational and partly sectional view of the actuator-gearbox combination of FIG. 7.
Figure 9:
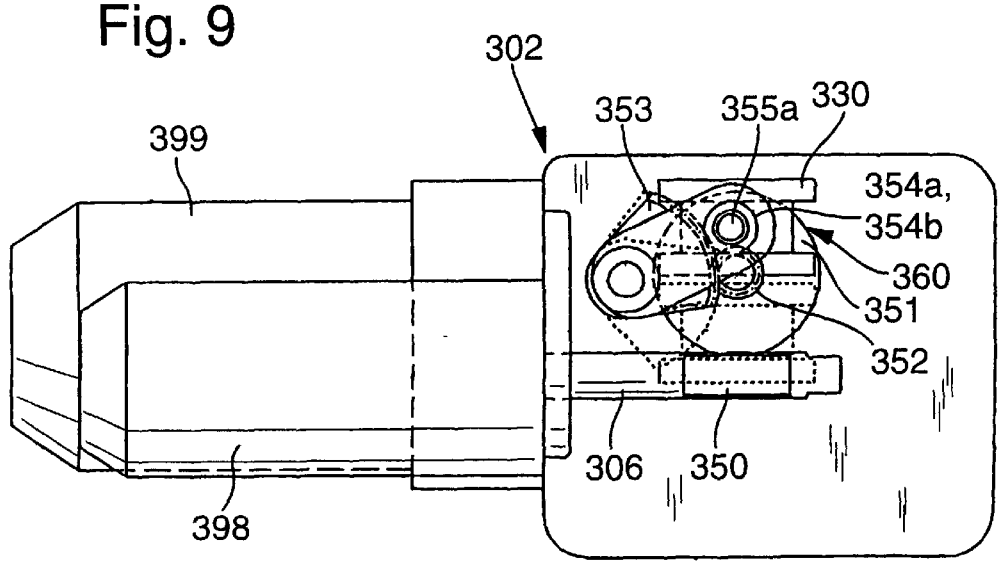
FIG. 9 is another view of the structure which is shown in FIG. 8.

FIGS. 7, 8 and 9 illustrate certain features of a further actuator 300 having a housing 302 affixed to the case 303 of a gearbox 301 which cannot be shifted into different gears when under load. The purpose of the actuator 300 is to automate the selection of different gear ratios of the gearbox 301 and the shifting into different gears. FIG. 7 shows threaded fastener means 304 which separably secure the housing 302 to the case 303; however, it is also possible to provide the housing 302 and/or the case 303 with one or more flanges which are separably connected with the housing 302 or with the casing 303. For example, the actuator 300 can be designed as an add-on assembly which is secured to the case 303 of a manually shiftable gearbox in lieu of the customary dome or bell for a manually operable gear ratio selecting and gear shifting device.

The actuator 300 comprises two driving units 398, 399 (e.g., electric motors) which are drivingly connected with gear ratio selecting and gear shifting means of the gearbox 301 by discrete transmissions installed in the housing 302. If desired, the actuator 300 can be provided with a third driving unit (such as a third electric motor) which is designed to vary the torque adapted to be transmitted by a suitable torque transmitting system, such as the friction clutch 2 in the power train of the motor vehicle shown in FIG. 1. However, and this applies for all of the actuators which are disclosed in the present application, the actuator can comprise one or more driving units which are not operated by electric current, e.g., one or more fluid-operated (hydraulic or pneumatic) or other suitable driving units.

The driving units 398, 399 which are shown in FIGS. 8 and 9 are electric motors which are carried by the housing 302 of the actuator 300 and respectively comprise output shafts 306, 305 which are parallel to each other. In FIG. 7, the output shafts 305 and 306 extend at right angles to the plane of the drawing. The first stage of the transmission which is driven by the unit 399 comprises a worm 307 coaxial with and affixed to (e.g., of one piece with) the output shaft 305. The worm 307 meshes with and can rotate a worm wheel 308 which carries a damper analogous to that already described with reference to FIGS. 5b, 5c, 6a and 6b.

The damper between the worm wheel 308 and a shaft 311 for a spur gear 315 of the second stage of the transmission including the worm gearing 307, 308 includes a substantially circular disc-shaped element including two coaxial axially spaced apart sections 309a, 309b which are non-rotatably affixed to each other and are disposed at opposite sides of a second circular disc-shaped element 310. The section 309a is or can be made of one piece with the worm wheel 308. The means for non-rotatably securing the sections 309a, 309b to each other can comprise distancing elements in the form of rivets, bolts or the like. The element 310 has windows 312 for central portions of preferably prestressed energy storing elements 311 here shown as coil springs which further extend into recesses or pockets in the adjacent surfaces of the sections 309a, 309b so that they can oppose rotation of the elements 309a, 309b and 310 relative to each other.

The element 310 is of one piece with or is non-rotatably affixed to the shaft 313 which is rotatable in a bearing sleeve 314 within the worm wheel 308 and carries the spur gear 315. The upper end portion of the shaft 313 (as viewed in FIG. 7) is mounted in at least one suitable antifriction bearing 316 at the inner side of the adjacent portion of the housing 302.

The initial stressing of the coil springs 311 determines the timing of the start of rotation of the worm wheel 308 relative to the spur gear 315. For example, if the gear 315 (or an element which normally rotates in response to rotation of the gear 315) strikes against a stop which prevents further rotation of the gear 315 with the worm wheel 308, the damper including the parts 309a, 309b, 310 and 311 becomes operative and permits the worm wheel 308 and the sections 309a, 309b to turn relative to the shaft 313 and gear 315 in response to further rotation of the output shaft 305 and worm 307.

The spur gear 315 meshes with an intermediate spur gear 317 rotatable in the housing 302 and meshing with a further spur gear 318 on the central shaft 320 of the gearbox 301. The intermediate gear 317 is mounted on a shaft 321 which is rotatably mounted in the housing 302 by way of a suitable bearing 322, such as a plain (friction) bearing or an antifriction bearing with one or more annuli of balls or other suitable rolling elements between an inner race and an outer race. The central shaft 320 of the gearbox 301 has axially parallel external teeth meshing with the teeth of a complementary internal gear in the spur gear 318, i.e., the shaft 320 is compelled to share all angular movements of the spur gear 318.

The transmission between the output shaft 305 of the driving unit 399 and the central shaft 320 of the gearbox 301 includes the worm gearing 307, 308, the spur gearing 315, 317, 318 and the damper 309a, 309b, 310, 311 between the two gearings. The intermediate gear 317 of the spur gearing is optional, i.e., it is employed if the distance between the axes of the shafts 313, 320 is too large to employ a simple two-gear spur gearing. Furthermore, and as shown in FIG. 8, the intermediate spur gear 317 can be put to use to actually reduce the distance between the axes of the control shaft 320 and the shaft 313 for the spur gear 315. The exact construction of the spur gearing between the worm gearing 307, 308 and the central shaft 320 can also depend upon the extent of angular movement to be carried out by the shaft 320 in response to rotation of the output shaft 305.

The illustrated spur gear 318 can be replaced with a gear segment having a set of teeth meshing with the teeth of the gear 317 or 315 and extending along an arc which is necessary to ensure that the central shaft 320 will be turned through an angle which is required to ensure a proper selection of the gear ratio of the gearbox 301 or proper shifting into or from a selected gear. In the embodiment of FIGS. 7 to 9, a turning of the central shaft 320 about its axis results in shifting of the gearbox 301 into or from a selected gear.

The central shaft 320 need not be moved axially in order to select a desired gear ratio for the gearbox 301. Axial shifting of a sleeve 330 which non-rotatably surrounds the central shaft 320 is initiated by the control unit (not shown in FIGS. 7, 8 and 9) by way of the driving unit 398 and its output shaft 306. The latter carries a worm 350 mating with a worm wheel 351 which is rigid with a gear 352. The gear 352 meshes with a gear segment 353 which is pivotable about a shaft extending at right angles to the central shaft 320. The central shaft 320 is surrounded by and can change the angular positions of the axially movable sleeve 330 which is provided with two lateral arms 340, 341. The lateral arm 340 can be moved into alignment with selected ones of gear shifting elements 342 in the case 303 of the gearbox 301, and the lateral arm 341 can be moved into and from a position of registry with a gear shifting element 343 in the case 303. The form-locking connection between the central shaft 320 and the sleeve 330 can be established by axially extending peripheral teeth or ribs 331 provided on the central shaft 320 and mating with internal teeth of the sleeve 330. It is clear that a torque transmitting connection between the central shaft 320 and the sleeve 330 can be established equally satisfactorily in a number of other suitable ways, for example, by providing the shaft 320 with a single axially parallel external key or tongue extending into a complementary recess or groove of the sleeve 330, or vice versa.

The aforementioned spur gear 352 (which is coaxial with and rotatable by the worm wheel 351) meshes with a gear segment 353. The latter carries two levers 354a, 354b for rollers 355a, 355b extending into an external groove 360 of the sleeve 330. Thus, when the spur gear 352 pivots the gear segment 353, the levers 354a, 354b cause their rollers 355a, 355b to move the sleeve 330 axially of the central shaft 320 of the gearbox 301. One of the levers 354a, 354b can be omitted without affecting the operation of the second transmission including the worm gearing 350, 351 and the spur gearing 352, 353.

The stubs of the rollers 355a, 355b are mounted in bearings 371 (such as friction or antifriction bearings) provided in the respective levers 354a, 354b of the gear segment 353.

The driving units 398, 399 can be provided or associated with incremental sensors which monitor the extent and/or the duration of angular displacement of the respective output shafts 306 and 305. It is also possible to employ suitable devices which monitor the current consumption of electric motors of the driving units 398, 399 and transmit appropriate signals to the control unit for the sensor 300 so that the central shaft 320 is arrested upon completion, of a desired angular movement and the sleeve 330 is arrested upon completion of a desired axial movement relative to the shaft 320.

The power output stage of the control electronics can be integrated into the housing 302 of the actuator 300. However, it is also possible to incorporate the power output stage of the control electronics into the control circuit for the actuator 300. The latter can be connected with an energy source (such as the battery of a motor vehicle) by a cable having a plug insertable into a socket (not shown) on or in the housing 302 of the actuator 300.

FIG. 7 further shows a carrier 370 which is installed in the housing 302 and supports certain constituents, such as the bearings 316, 322 for the shafts 313, 321, respectively. The carrier 370 can be made, at least in part, of a suitable synthetic plastic material.

The axes of the output shafts 305, 306 are parallel to each other; however, the actuator 300 can employ two or more driving units with output shafts having axes which are normal to each other or make oblique angles.

The actuator 400 of FIGS. 10 and 11 comprises two driving units 401, 402 (e.g., electric motors) and serves to effect automatic gear ratio selection and automatic gear shifting of a gearbox which cannot be shifted when under load.

The housing 402a of the actuator 400 can be secured to the case of a gearbox in any suitable way, for example, by threaded fasteners (304) as shown in FIG. 7. The actuator 400 can constitute an add-on assembly which can be affixed to a normally manually operable gearbox. The driving unit 401 can serve to shift into a selected gear, and the driving unit 402 can be employed to select a desired gear ratio.

A third driving unit (e.g., a further electric motor, not shown) can be provided to operate (engage and disengage) a friction clutch or another torque transmitting system between the gearbox and a prime mover, such as the engine of a motor vehicle. As already mentioned before, the improved actuator can comprise electrically, hydraulically, pneumatically or otherwise operated driving units.

The driving units 401, 402 respectively comprise rotary output shafts 405, 406 which are (but need not be) parallel to each other. The output shaft 405 carries a worm 407 in mesh with a worm wheel 408. The latter can transmit torque to a shaft 413 for a coaxial spur gear 415 by way of a damper including a composite first disc-shaped element including two spaced-apart sections 409a, 409b rotatable with the worm wheel 408, a second disc-shaped element 410 disposed between the spaced-apart sections 409a, 409b and affixed to the shaft 413, and one or more preferably prestressed energy storing elements (e.g., a set of coil springs) 411 between the two disc-shaped elements. The energy storing elements 411 are received in the windows 412 of the element 410 and also extend into recesses or pockets provided in the adjacent sides of the sections 409a, 409b.

The shaft 413 (this shaft is rigid with the element 410 and with the gear 415) is rotatably mounted in a sleeve 414 within the section 409a, and its end portions are journalled in suitable bearings 416 carried by the housing 402a of the actuator 400. The sections 409a, 409b of the composite first element of the damper further including the element 410 and the energy storing elements 411 are non-rotatably secured to each other by rivets, bolts and/or other suitable distancing elements.

The damper between the worm wheel 408 and the spur gear 415 becomes effective (i.e., it permits the worm wheel 408 to rotate relative to the shaft 413 and spur gear 415) when the shaft 413, the gear 415 or a part driven by the gear 415 encounters a stop which prevents further angular movement of the gear 415 with the worm wheel 408.

The gear 415 meshes with a gear segment 418 which can change the angular position of the central shaft 420 of the gearbox operated by the actuator 400. It will be noted that the transmission between the driving unit 401 and the central shaft 420 is analogous to the transmission between the driving unit 399 of the actuator 300 and the central shaft 320 of the gearbox 301 except that the intermediate spur gear 317 is omitted and the spur gear 318 is replaced with the gear segment 418.

The central shaft 420 is provided with a diametrically extending pin 421 for a pair of rotary rollers 422 and 423. These rollers extend into and are respectively movable along tracks 425b, 425a provided in the gear segment 418. The tracks 425a, 425b are substantially parallel to the axis of the central shaft 420. Such mounting of the gear segment 418 permits those axial movements of the central shaft 420 relative to the housing 402a of the actuator 400 which are necessary to select the desired gear ratio of the gearbox. At the same time, the central shaft 420 is compelled to share the angular movements of the gear segment 418.

Shifting of the gearbox including the central shaft 420 into and from selected gears is initiated by the driving unit 401, i.e., by the output shaft 405 which carries the worm 407 mating with the worm wheel 408. The worm 407 can constitute an extension of the output shaft 405. The worm wheel 408 is mounted on and can turn, at times, relative to the shaft 413 due to the provision of the aforementioned torque transmitting connection or damper between the parts 408 and 413, i.e., by the damper comprising the first disc-shaped element 409a, 409b, the second disc-shaped element 410 between the sections of the first disc-shaped element, and the preferably prestressed energy storing elements 411 between the two disc-shaped elements. The section 409a is rigid with the worm wheel 408, the section 409b is rigid with the section 409a, and the element 410 is rigid with the shaft 413.

The shaft 413 can be of one piece with the spur gear 415 which meshes with the gear segment 418.

Figure 12:
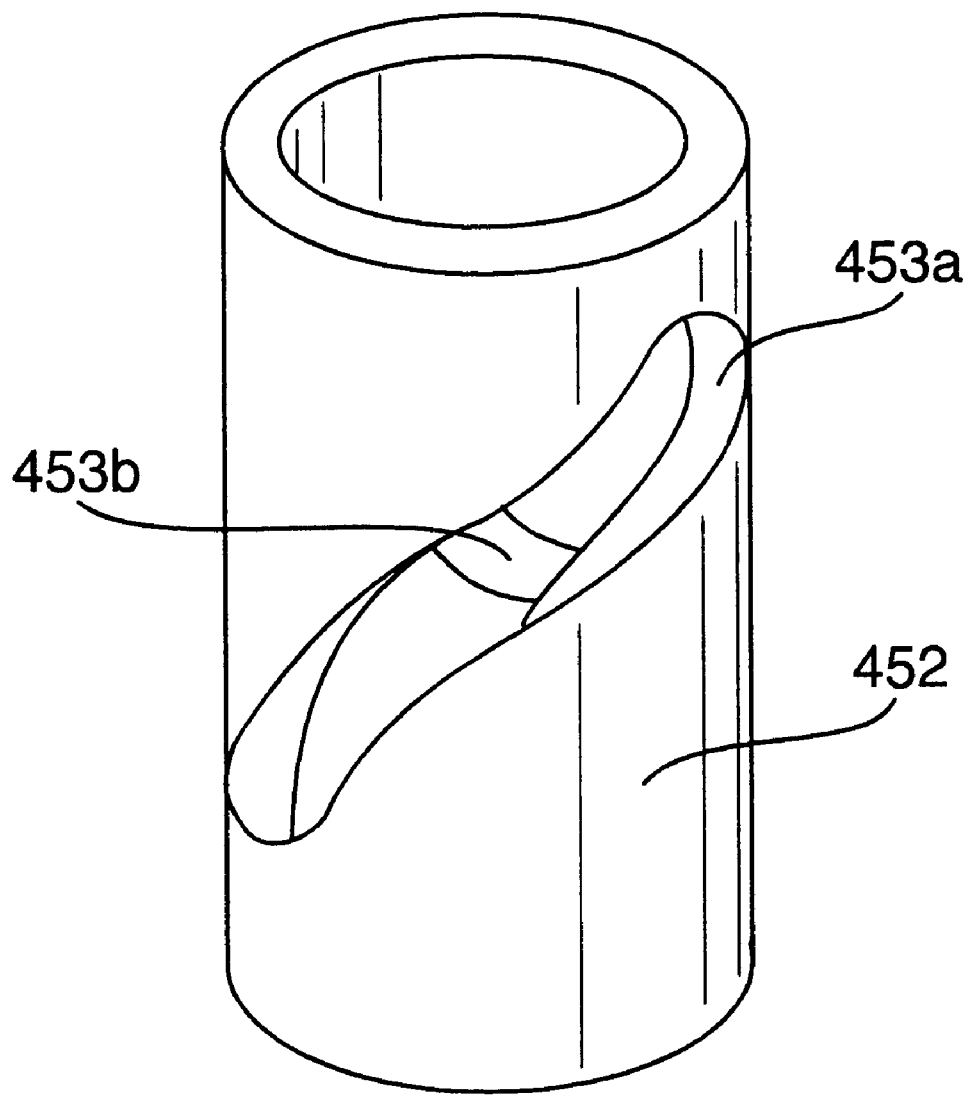
FIG. 12 is an enlarged perspective view of a motion transmitting sleeve in the actuator of FIGS. 10 and 11.

The gear ratios of the gearbox including the central shaft 420 are selected by the driving unit 402 by way of a worm 450 on the output shaft 406. The worm 450 mates with a worm wheel 451 having a hub which serves to rotate a sleeve 452 (see also FIG. 12) which is provided with two helical grooves 453a, 453b for the roller followers 455a, 455b of the central shaft 420. When the driving unit 401 is idle but the driving unit 402 is on in response to an appropriate signal from the control unit for the actuator 400, the rollers 422, 423 hold the central shaft 420 against rotation but the shaft 420 is caused to move axially due to turning of the sleeve 452 with the worm wheel 451, i.e., the shaft 420 is caused to select a desired gear ratio.

The roller followers 455a, 455b are rotatably mounted at the ends of a pin or shaft 456 which extends diametrically through the central shaft 420.

The worm wheel 451 is rotatable in a bearing 461 which is installed in the housing 402a. Additional bearings 460, 462 are provided between the worm wheel 451 and the gear segment 418.

A damper (e.g., a damper analogous to that including the elements 409a–409b, 410, 411) can be installed in the transmission between the driving unit 402 and the central shaft 420.

The driving units 401, 402 can cooperate with incremental sensors (not specifically shown) which transmit signals denoting the extent of the respective (angular and axial) movements of the central shaft 420. Alternatively, or in addition to such incremental sensors, the actuator 400 can be provided with means for monitoring the energy consumption by the driving units 401, 402 and for transmitting corresponding signals to the control unit for the actuator 400.

The power output stage of the control electronics can be integrated into the housing 402a of the actuator 400. Alternatively, such power output stage can be embodied in the control unit for the actuator 400. If the power output stage is installed in the housing 402a, the actuator 400 can be furnished with a cable or cord connectable to an outlet and carrying a plug for insertion into a socket (not shown) of the housing 402a.

The driving units 401, 402, the worms 407, 450, the worm wheels 408, 451 and (if desired) the bearings for the two worm gearings can be assembled into a module which is connectable to the housing 402a or can be otherwise integrated into the actuator 400.

The axes of the output shafts 405, 406 are but need not be parallel to each other. Furthermore, the worm wheels 408, 451 are but need not be disposed in two parallel planes; for example, the two worm wheels can be coplanar or can be installed in two mutually inclined planes.

Figure 13:
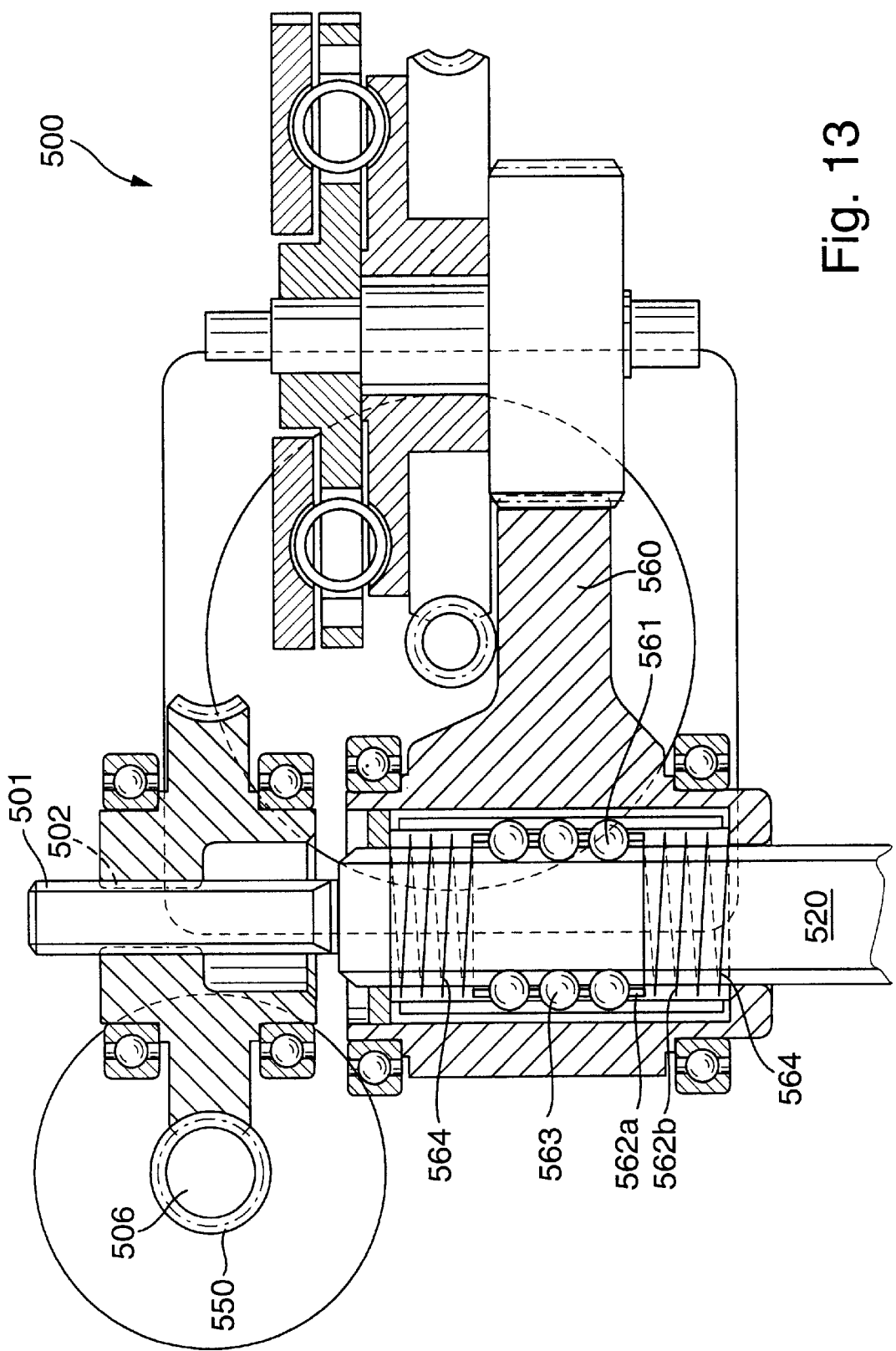
FIG. 13 is a partly elevational and partly sectional view of still another actuator.

FIG. 13 shows an actuator 500 which constitutes a modification of the actuator 400. The difference between the actuators 400 and 500 is in the manner of selecting the gear ratios of the gearbox. The output shaft 506 of one of the driving units of the actuator 500 carries a worm 550 meshing with a worm wheel having an internal gear 502 meshing with a helical gearing 501 on a smaller-diameter extension of the central shaft 520 of the gearbox. The shaft 520 must be moved axially to select a gear ratio and must be rotated (by a gear segment 560) to shift into or from a selected gear. A linear guide 561 is provided to transmit torque from the gear segment 560 to the central shaft 520 while permitting the latter to move axially in response to rotation of the output shaft 506 and worm 550. The guide 561 includes axially parallel tracks 562a, 562b (e.g., in the form of grooves) for rolling elements 563 (e.g., spherical rolling elements). The elements 563 transmit torque from the gear segment 560 to the central shaft 520 and roll along the respective tracks 562a, 562b when the central shaft 520 is caused to move axially by the worm gearing including the worm 506 and the second gearing including the internal gear 502 and the helical external gear 501.

In order to prevent undesirable movements of the rolling elements 563 along the respective tracks 562a, 562b when the actuator 500 of FIG. 13 is installed in such a way that the axis of the central shaft 520 is vertical or nearly vertical, the rolling elements 563 are preferably confined in a suitable cage and are centered in that portion (hub) of the gear segment 560 which surrounds the central shaft 520. This is achieved by employing two prestressed resilient elements 564 (such as coil springs) which react against suitable annular internal retainers or stops (shown but not referenced in FIG. 13) of the gear segment 560 and maintain the cage with the rolling elements 563 within the confines of the hub of the gear segment.

The structure of FIG. 13 ensures that the central shaft 520 is adequately guided and supported within the hub of the gear segment 560 in each of its angular and axial positions. The arrangement is preferably such that the prestressed resilient elements 564 normally maintain the cage for the rolling elements 563 at least substantially midway between the axial ends of the hub of the gear segment 560, i.e., between the axial ends of that portion of the gear segment which surrounds the central shaft 520. When the shifting of the gearbox into a selected gear is completed, the clearance between the rolling elements 563 and the surfaces bounding the tracks 562a, 562b preferably suffices to permit axial movements of the central shaft 520 relative to the gear segment 560.

The table of FIG. 14 illustrates various combinations of operations to be carried out by one or more actuators for actuation of an automated gearbox for the purpose of selecting desired gear ratios and for shifting into and from selected gears, and for actuation of a torque transmitting system for automated selection of the torque to be transmitted by such system (e.g., between a prime mover and the gearbox).

The table of FIG. 14 illustrates power trains with three actuators, namely a first actuator (K) for actuation of a torque transmitting system (hereinafter referred to as clutch), a second actuator (S) for shifting a gearbox into or from a selected gear, and a third actuator (W) for the selection of a desired gear ratio.

The table of FIG. 14 further shows power trains with two actuators including a first actuator (K+S) for clutch actuation and shifting of a gearbox into or from a selected gear, and a second actuator (W) for the selection of a gear ratio. Still further, the table of FIG. 14 shows a power train including a first actuator (K+W) for clutch actuation and gear ratio selection, and a second actuator (S) for shifting.

The table of FIG. 14 also shows an actuator (K+S+W) which can operate the clutch, which can select a desired gear ratio of a gearbox, and which can shift the gearbox into or from a selected gear.

As shown in the table of FIG. 14, it is possible to combine a control unit with one, two or three actuators in a common case or housing. Alternatively, the control unit (such as 7) can be installed in a separate housing or casing independently of the housing or housings for one or more actuators. The housing(s) for the actuator actuators and/or the casing for a separate control unit can be mounted in the chassis or frame of the motor vehicle and/or directly in or on the case of the gearbox.

Referring again to FIG. 5c, there is shown that a detection of angular movements of two rotary parts (such as the composite disc-shaped element 270a, 270b and the one-piece disc-shaped element 271) relative to each other against the opposition of energy storing means (273) can involve the utilization of two discrete sensors 278 and 279. The energy storing means 273 can comprise one or more coil springs (FIGS. 6a, 6b) or any other suitable resilient elements such as flat coil of flat spiral springs, torsion springs, looped springs and/or resilient inserts of elastomeric synthetic plastic material. Irrespective of its or their exact nature, the energy storing element or elements can be installed in prestressed or in unstressed condition. Moreover, it is possible to employ resilient elements which are dimensioned, configured, assembled and installed in such a way that the damper means employing such resilient elements exhibits a single-stage or a multistage spring characteristic. The signals which are furnished by the sensors 278, 279 in response to angular displacement of the elements 270a–270b and 271 relative to each other can be processed by the control unit to indicate the extent of compression of the energy storing means 273. The resulting signals denote (e.g., they can be proportional or equal to or otherwise representative of) the magnitude of the torque which is being transmitted by the damper, i.e., of the torque which must be supplied by the output shaft (206) of the respective driving unit (201).

However, it is also possible to monitor the extent of angular displacement of the elements 270a–270b and 271 relative to each other by resorting to a single sensor. Such single sensor can further serve as a means for indicating the angular displacement of the two disc-shaped elements when they are caused to perform identical angular movements (i.e., to turn at the same speed). Such single sensor can ascertain the aforementioned variables on the basis of magnetic characteristics or other characteristics which can be monitored, preferably in such a way that a direct bodily contact between the single sensor and the monitored elements is or can be avoided.

Figure 15A:
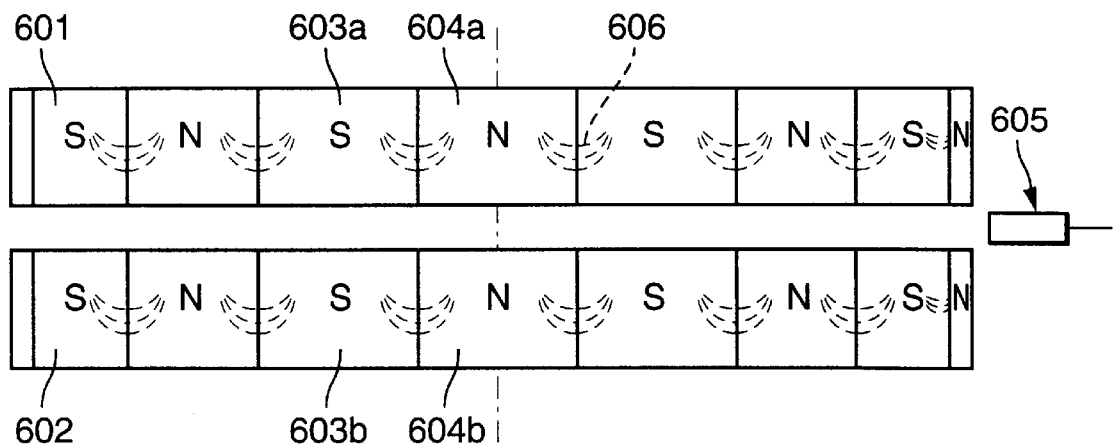
FIG. 15a is a schematic elevational view of a damper-sensor combination which can be utilized in the improved power train.
Figure 15B:
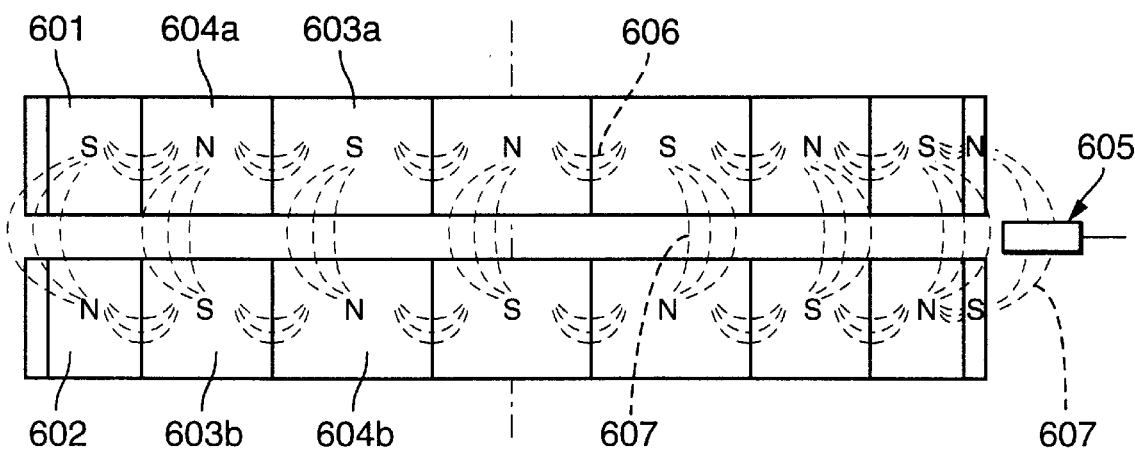
FIG. 15b shots the structure of FIG. 15a but with the elements of the damper in different angular positions relative to each other.

A first embodiment of a monitoring arrangement which operates with a single sensor 605 is shown in FIGS. 15a and 15b. The monitored means includes two coaxial disc-shaped elements 601, 602 which can respectively replace the composite element 270a–270b and the one-piece element 271 of FIG. 5c. Each of the elements 601, 602 includes a magnetized or magnetizable radially outer (marginal or peripheral) portion or zone. The element 601 is assumed to transmit torque to the element 602 against the opposition of at least one energy storing element (not shown in FIGS. 15a and 15b). The energy storing element (e.g., a set of coil springs to be described with reference to FIGS. 17c–17d and 18a–18b) opposes rotation of the element 602 with the element 601, i.e., the setting of the element 602 in rotary motion in response to rotation of the element 601 involves at least some stressing of the energy storing element.

The marginal zones of the elements 601, 602 are magnetized in such a way that they exhibit annuli of alternating south poles (S) and north poles (N). It is also possible to provide the marginal zones of the elements 601, 602 with annuli of discrete ring-shaped magnets; such discrete magnets can be affixed to or recessed into or embedded in the respective marginal zones. For example, the ring-shaped magnets can be made of a suitable magnetic material, such as a plastomagnetic material. More specifically, certain presently preferred materials include ferrite or rare earth cobalt, such as samarium cobalt. If the elements 601, 602 carry magnets of plastomagnetic material, the magnetic substances are embedded in a synthetic plastic matrix or another suitable matrix. It is also possible to utilize plastomagnetic materials wherein magnetic ions are received or disposed in chains of molecules.

The number of magnetic south poles and north poles at the peripheral zones of the elements 601, 602 will depend on the desired resolution. It is preferred to provide at least four magnetic poles at the peripheral zone of each of the two elements 601, 602; as a rule, the number of such poles will be at least eight, for example, sixteen or thirtytwo. The neighboring magnetic poles are preferably, but need not always be, equidistant from each other.

When not stressed, the elements 601, 602 are caused to assume the positions shown in FIG. 15a in which the magnetized portions (S) 603a, 603b and (N) 604a, 604b of equal polarity are aligned with each other. The resulting magnetic field then exhibits magnetic force lines or field lines 606 which are located in the planes of the respective elements 601, 602.

If a magnetosensitive sensor 605 (such as a Hall generator or a unipolar Hall sensor) is placed next to the peripheral surfaces of the elements 601, 602 and is oriented in such a way that it reacts only to a magnetic field with force lines 607 (FIG. 15b) extending at right angles to the planes of the elements 601, 602, it can detect the magnetic force lines and generate Hall voltage only in response to the development of force lines 607. Thus, if the magnetic poles S, N at the peripheral zones of the elements 601, 602 are positioned in a manner as shown in FIG. 15a, the sensor 605 does not furnish any signals because the magnetic force lines 606 are located in the planes of the two elements. However, if the elements 601, 602 are turned relative to each other against the opposition of the energy storing means between them, the sensor 605 can detect the magnetic force lines 607 and generates appropriate signals which are transmitted to the corresponding control unit (such as the control unit 7 shown in FIG. 1). The intensity or another characteristic of the signal from the sensor 605 is indicative of the extent of angular displacement of the elements 601, 602 relative to each other, i.e., the signal by the sensor 605 is indicative of the magnitude of the torque being transmitted by the energy storing means between the elements 601, 602.

If the extent of angular displacement of one of the elements 601, 602 relative to the other of these elements is so pronounced that the mutual positions of the south and north poles at the marginal zones of the elements 601, 602 again match those shown in FIG. 15a, the magnetic force lines 607 become weaker or disappear. The resulting weakening of the signal from the sensor 605 is detected and memorized by the control unit which receives signals from the sensor 605 and is taken into consideration in ascertaining the extent of angular displacement of the elements 601, 602 relative to each other. As the extent of angular displacement of one of the elements 601, 602 relative to the other element increases, the stressing (deformation) of the energy storing means between these elements also increases and the magnitude of the force opposing further rotation of the elements 601, 602 relative to each other also increases. The load upon the respective driving unit (such as an electric motor) increases and the RPM of its output shaft decreases. This constitutes another mode of (as well as another reason for) ascertaining, by the control unit, whether or not the extent of angular displacement of the elements 601, 602 relative to each other is on the increase or on the decrease and/or whether or not the stressing of the energy storing means between the elements 601, 602 has reached or exceeded a threshold value.

It is also within the purview of the invention to provide the peripheral zone of the element 601 and/or 602 with non-uniformly (irregularly) distributed and/or nonequally magnetized poles. This can ensure that a certain angular displacement of the elements 601, 602 relative to each other causes equally magnetized but unequal poles to come into alignment with each other. The signal from the sensor 605 then departs from zero in view of the continued presence of a magnetic field with force lines (607) extending transversely of the planes of the elements 601, 602. Thus, there takes place a modulation of the amplitude of the normal component (607) of the magnetic field and the absolute value of the signal from the sensor 605 drops to zero only when the elements 601, 602 are caused to assume predetermined starting angular positions relative to each other.

The sensor 605 can constitute an analog or a dual unipolar Hall sensor. If the sensor 605 is a dual unipolar sensor, an XOR linking or interconnection of the two signals can result in a desired sensor characteristic of the output signals.

Figure 16A:
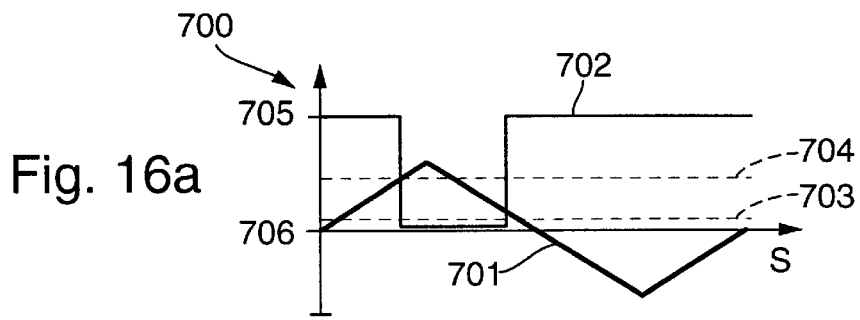
FIG. 16a is a diagram showing the nature of signals generated by the sensor which is utilized with the damper of FIGS. 15a and 15b.

The diagram 700 of FIG. 16a is presented to facilitate the understanding of the function and the application of a sensor 605 which is a unipolar Hall sensor. The curve 701 represents the magnetic field strength which prevails at the locus of the sensor 605, and this curve is plotted as a function of the distance s (namely the extent of angular displacement of the elements 601, 602 relative to each other). The diagram 700 further shows a sensor signal 702 and signal threshold values 703, 704. If the strength of the magnetic field (curve 701) is below the threshold value 704, the signal which is transmitted by the sensor 605 assumes the value 705. When the magnetic field strength (curve 701) equals the threshold value 703, the value of the sensor signal is that shown at 706. The value 706 of the sensor signal remains unchanged until the magnetic field strength (curve 701) drops below the threshold value 703. At the corresponding distance s, the signal from the sensor 605 is reset to the value 704.

Figure 16B:
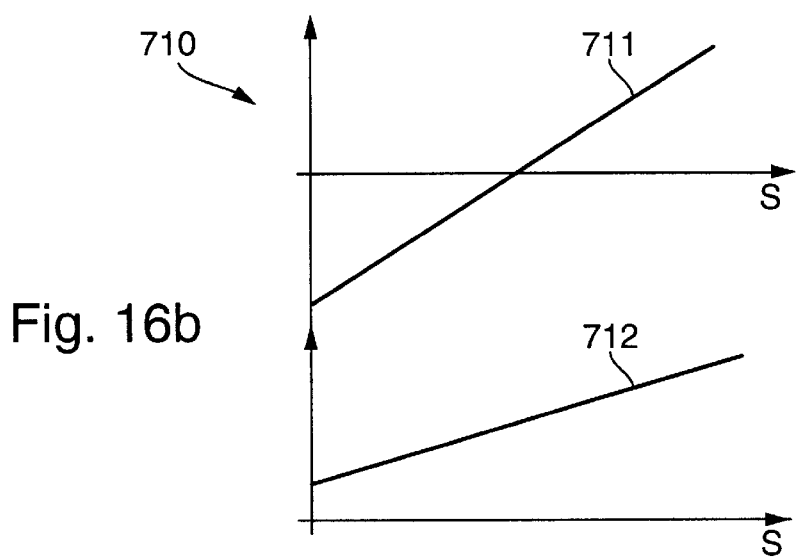
FIG. 16b is a diagram showing signals which are generated by a modified sensor.

The diagram 710 of FIG. 16b shows a curve 711 which is indicative of the magnetic flux density as a function of the distance s, i.e., of the extent of angular displacement of the elements 601, 602 relative to each other. The flux density (curve 711) varies basically linearly and in an analog manner. The curve 712 denotes the signals from an analog sensor 605, and this curve is shown in the lower part of the diagram 710 of FIG. 16b. The density of the magnetic flux (curve 711) increases proportionally with the distance s. The sensor signal (curve 712) is basically linear and varies substantially continuously as a function of increasing distance s indicated in the upper half of the diagram 710.

Figure 16C:
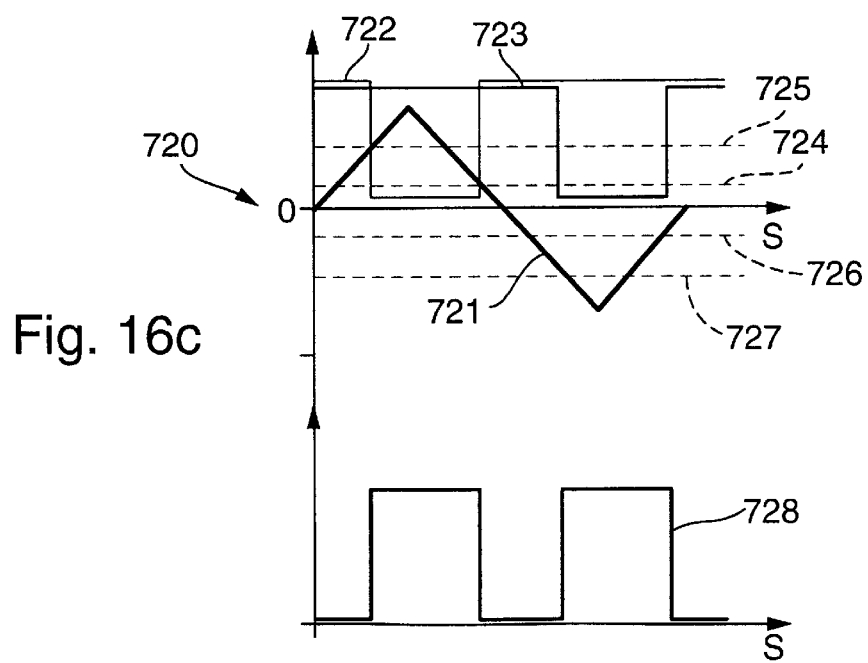
FIG. 16c is a diagram showing signals which are generated by a further sensor.

FIG. 16c shows a diagram 720 to represent the mode of operation of a sensor 605 which constitutes a dual unipolar Hall sensor. The curve 721 denotes the magnetic field strength at the locus of the sensor 605, and such strength varies as a function of the distance s. As already mentioned above, the distance s denotes the extent of angular displacement of the elements 601, 602 relative to each other against the opposition of the energy storing means. The diagram 720 further shows two sensor signals 722, 723 and signal threshold values 724, 725 and 726, 727. If the magnetic field strength (curve 721) is below the threshold value 724, the sensor signal 722 assumes a maximum value. When the strength of the magnetic field (curve 721) reaches the threshold value 725, the sensor signal assumes a minimum value. Such minimum value of the sensor signal remains unchanged until the magnetic field strength (curve 721) drops below the value 724. At such distance s (i.e., in response to such an extent of angular movement of the elements 601, 602 relative to each other), the sensor signal is reset to its maximum value.

If the magnetic field strength (curve 721) rises above the threshold value 727, the sensor signal 723 assumes a maximum value. If the magnetic field strength (curve 721) reaches the threshold value 727, the sensor signal is changed to a minimum value. Such sensor signal value remains unchanged until the strength of the magnetic field (curve 721) drops below the threshold value 726; at the corresponding distance s, the sensor signal is again caused to assume a maximum value.

The resultant sensor signal 728 can be ascertained on the basis of signals 722 and 723 by resorting to an XOR linkage (interconnection).

Figure 17A:
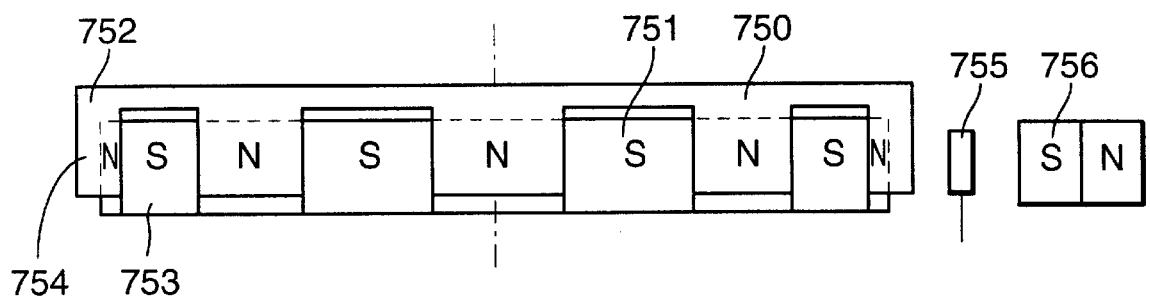
FIG. 17a illustrates a damper-sensor combination constituting another modification of the damper-sensor combination shown in FIGS. 15a and 15b.
Figure 17B:
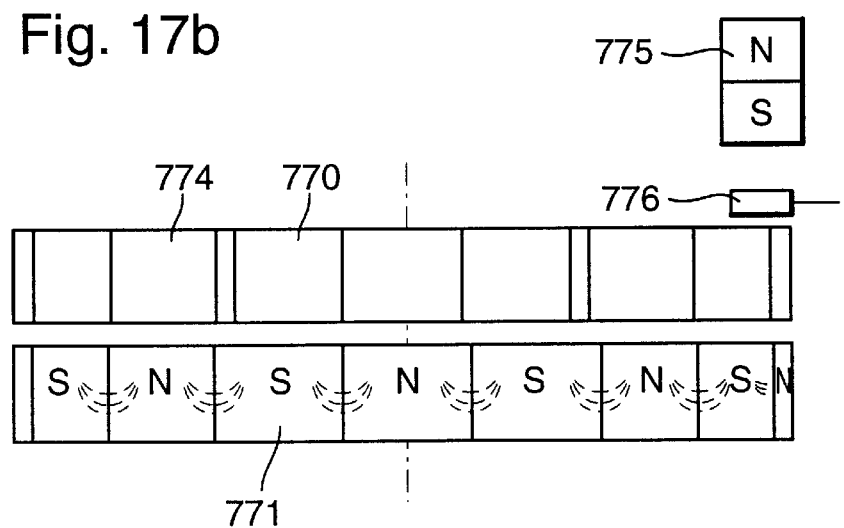

FIGS. 17a and 17b illustrate modifications of the afore-discussed damper and monitoring means shown in FIGS. 15 and 15b. In the embodiment of FIG. 17a, a first disc-shaped rotary element 750 serves to transmit torque to a second rotary disc-shaped element 751 by way of resilient energy storing elements (not shown) corresponding to the set of coil springs 780 shown in FIGS. 17c and 17d and forming part of the arrangement of FIG. 17b wherein a first disc-shaped element 770 serves to transmit torque to a coaxial second disc-shaped element 771.

The element 750 of FIG. 17a comprises an annulus of axially parallel peripheral or marginal projections 754 in the form of tongues, teeth, lugs or the like. The annulus of projections 754 surrounds the peripheral surface of the element 751, and a portion of such annulus is always located between the element 751 and a stationary sensor 755. The projections 754 can extend axially (i.e., downwardly, as viewed in FIG. 17a) beyond the element 751. The marginal zone 752 (including the projections 754) of the element 750 and the marginal zone 753 of the element 751 are made of a magnetizable material, e.g., a ferromagnetic material. The magnetizing of the marginal zones 752, 753 is such that, in each of these zones, magnetic south poles (S) alternate with magnetic north poles (N) in a circumferential direction of the respective disc-shaped element 750, 751. The projections 754 are magnetized in such a way that they provide north poles (N) or south poles (S).

When the elements 750, 751 are not stressed (i.e., when they are free to assume predetermined starting angular positions relative to each other), the south and north poles of the marginal zone 752 overlie (i.e., they are radially outwardly adjacent) the equally polarized portions of the marginal zone 753. Thus, when viewed from the outside, only the south poles (S) of the elements 750, 751 are recognized as individually effective magnetic poles.

The sensor 755 of FIG. 17a is located between the adjacent portion of the marginal zone 751 (projections 754) of the element 750 and an optional stationary auxiliary or additional magnet 756. This sensor 755 transmits no signals to the control unit when the elements 750, 751 are free or caused to assume their predetermined starting angular positions relative to each other. This is due to the fact that the sensor 755 is then located between the (outwardly) uniformly magnetized marginal zones 752, 753 and the stationary auxiliary magnet 756. The orientation of the magnetic field is then such that it is rather weak in the region adjacent the sensor 755. The purpose of the auxiliary magnet 756 is to increase the strength of the magnetic field at the locus of the sensor 755.

The sensor 755 transmits no signals when the projections 754 overlie the north poles at the marginal zone 753, not unlike a shutter or diaphragm. When the angular positions of the elements 750, 751 relative to each other are changed, the north poles of the marginal zone 753 become at least partially exposed relative to the south poles with the attendant development of magnetic force lines which intersect the location of the sensor 755 whereby the latter transmits a non-disappearing signal denoting that the actual angular positions of the elements 750, 751 relative to each other depart from the starting angular positions.

Figure 17C:
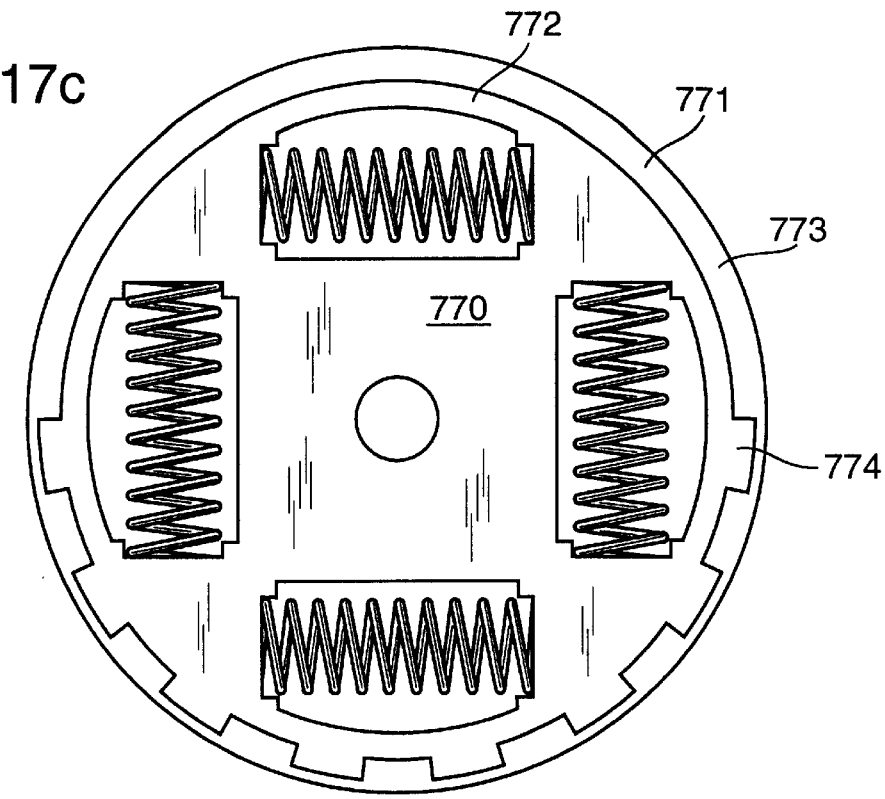
FIG. 17c illustrates certain details of the damper which is shown in FIG. 17b.
Figure 17D:
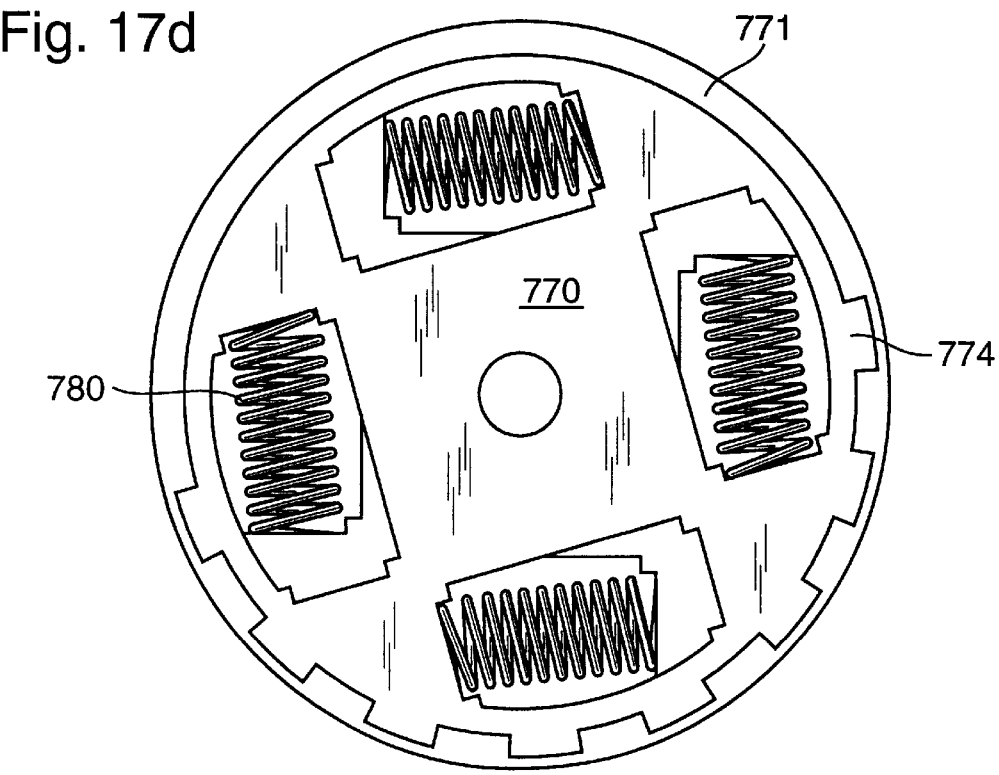
FIG. 17d shows the structure of FIG. 17c but with two disc-shaped elements of the damper in different angular positions relative to each other.

The situation is analogous when the disc-shaped elements (770, 771) are positioned and configured in a manner as shown in FIGS. 17b, 17c and 17d. The elements 770, 771 can turn relative to each other by overcoming the resistance of the resilient elements 780. The marginal zone 772 of the element 770 is provided with an annulus of equidistant tooth-shaped projections 774 which extend radially outwardly and register with the radially outer marginal zone 773 of the disc-shaped element 771.

The marginal zones 772, 773 are made of a magnetizable material, such as a ferromagnetic material. The magnetizing of these marginal zones is such that north poles (N) alternate with south poles (S), as seen in the circumferential direction of the respective elements 770, 771. The projections 774 provide north poles or south poles.

When the elements 770, 771 are free to assume their starting angular positions relative to each other, the south or north poles of the marginal zone 772 respectively overlie the south or north poles of the marginal zone 773. Thus, here again, when looked at from the outside, the south and north poles of the elements 770, 771 are recognizable as uniformly or individually acting poles.

The sensor 776 is adjacent to a portion of the annulus of projections 774 at that side of the element 770 which faces away from the element 771 between the adjacent projection (s) 774 and an optional auxiliary or additional (permanent) magnet 775. No signal is being transmitted from the sensor 776 to the control unit (not shown in FIGS. 17b to 17d) when the elements 770, 771 assume their starting angular positions relative to one another. The reason is that the magnetizing of the elements 770, 771 at the side facing the sensor 776 (as well as radially outwardly and downwardly, as seen in FIG. 17b) is uniform. The function of the optional auxiliary magnet 775 is the same as that of the magnet 756 shown in FIG. 17a.

The sensor 776 transmits no signals when the south poles established by the projections 774 overlie (not unlike a shutter) the north poles of the marginal zone 773. If the elements 770, 771 are caused to change their angular positions relative to each other, the north poles of the marginal zone 773 become at least partially exposed between the north poles (projections 774) of the marginal zone 772 and the developing magnetic force lines traverse the locus of the sensor 776; the latter then transmits a nondisappearing signal which, at the very least, denotes that the elements 770, 771 no longer assume their starting angular positions relative to each other.

Figure 18A:
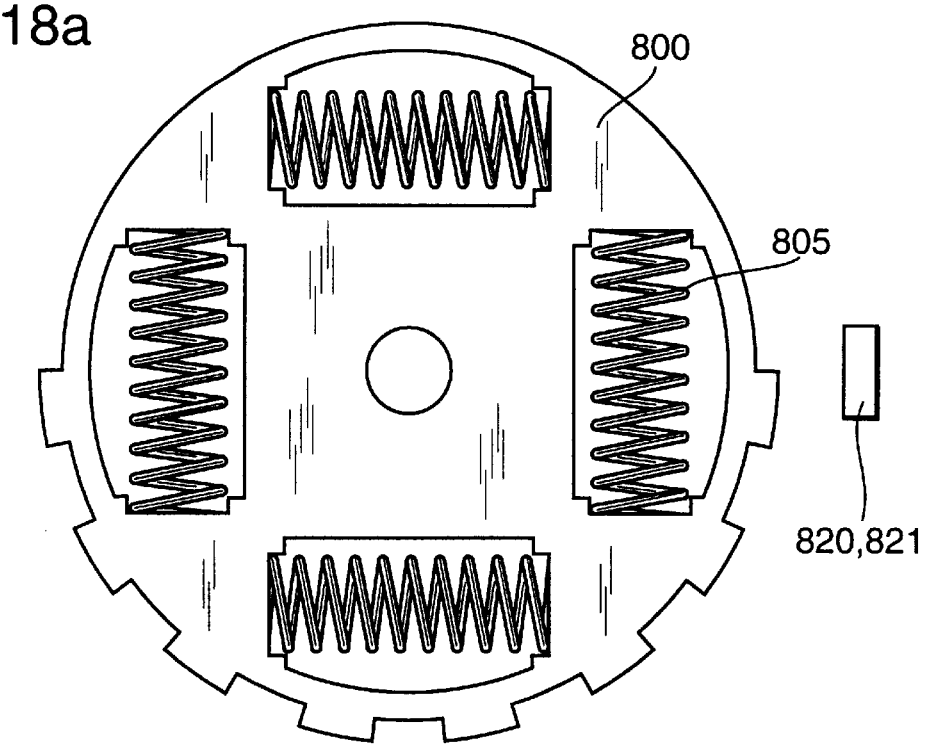
FIG. 18a shows a damper-sensor combination constituting a modification of the damper-sensor combination which is shown in FIGS. 17b to 17d.
Figure 18B:
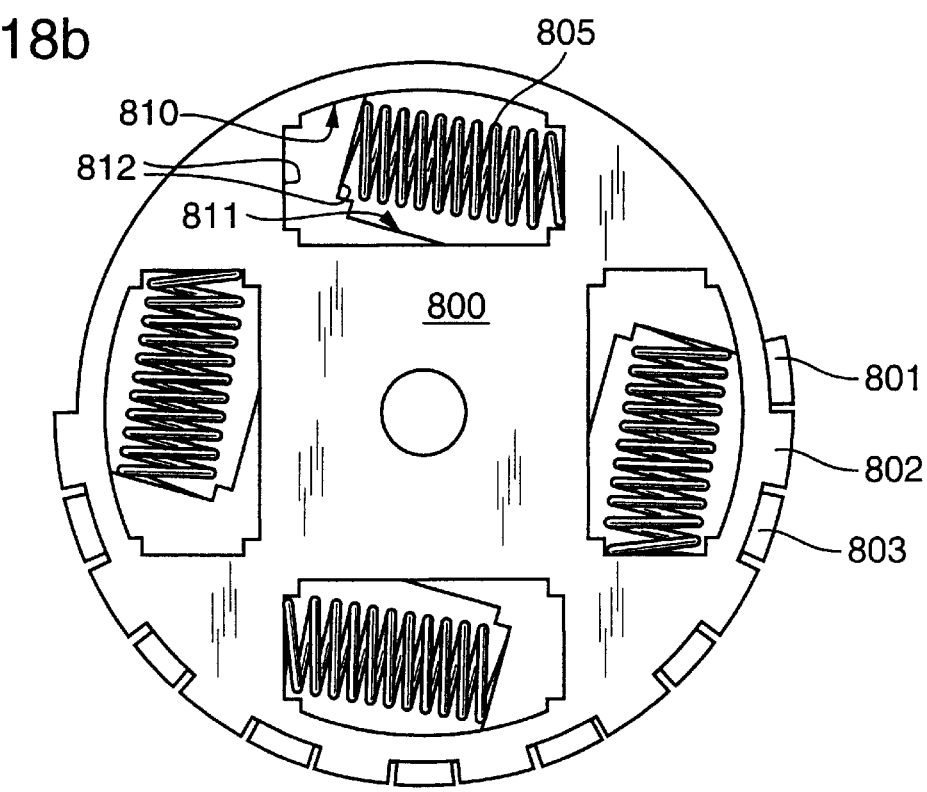
FIG. 18b shows the structure of FIG. 18a but with two disc-shaped elements of the damper in different angular positions relative to each other.
Figure 18C:
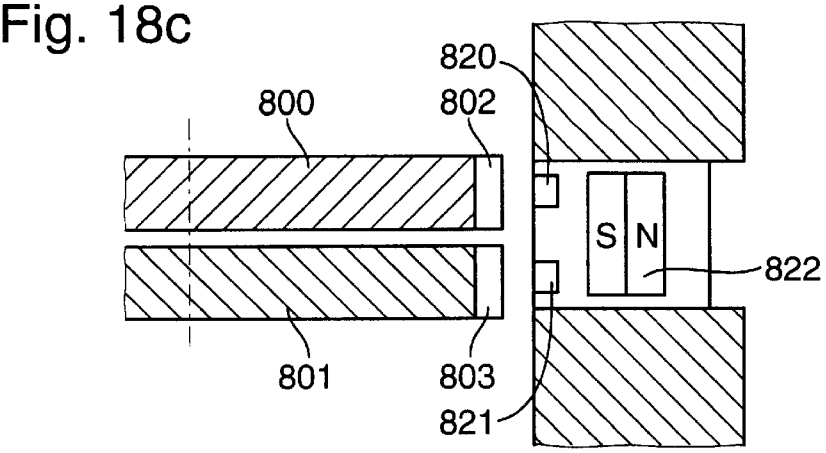
FIG. 18c is an enlarged fragmentary sectional view of the damper-sensor combination which is shown in FIGS. 18a and 18b.

FIGS. 18a, 18b and 18c illustrate a further embodiment of a damper-sensor combination. The sensor (820, 821) is a differential sensor and is radially outwardly adjacent annuli of tooth-shaped projections 802, 803 respectively forming part of the radially outermost or marginal zones of two coaxial disc-shaped elements 800 and 801. Resilient energy storing elements 805 (shown as straight equidistant coil springs) oppose angular movements of the elements 800, 801 relative to each other from predetermined starting angular positions in which the projections 802 overlie the projections 803 (or vice versa) as can be seen in FIG. 18a. Each resilient element 805 extends into the adjacent windows 810, 811 of the respective elements 800, 801 so that it is deformed by one or more adjacent edge faces 812 in the respective windows 810, 811 when the elements 800, 801 are caused to turn relative to each other from the starting angular positions of FIG. 18a to different angular positions, e.g., those shown in FIG. 18b. The resilient elements 805 are (or can be) installed in a prestressed condition, i.e., they can offer at least some resistance to any and all angular movements of the elements 800, 801 from their starting angular positions relative to each other.

The differential sensor 820, 821 includes two components (see FIG. 18c) which are respectively adjacent the annuli of projections 802 and 803. The marginal zones including the projections 802, 803 can be made of a magnetizable (such as ferromagnetic) material. An optional stationary permanent magnet 822 is located behind the sensor 820, 821 (refer again to FIG. 18c). This magnet cooperates with the marginal zones of the elements 800, 801 to cause the sensor 820, 821 to transmit to the control unit signals denoting that the elements 800, 801 have left their starting angular positions relative to each other and/or the extent of such angular displacement of the elements 800, 801 from their starting positions and/or relative to each other. All in all, the sensor 820, 821 can be designed and mounted to furnish signals denoting the positions, the RPM and/or the acceleration of the elements 800, 801 with and relative to each other.

Figure 19A:
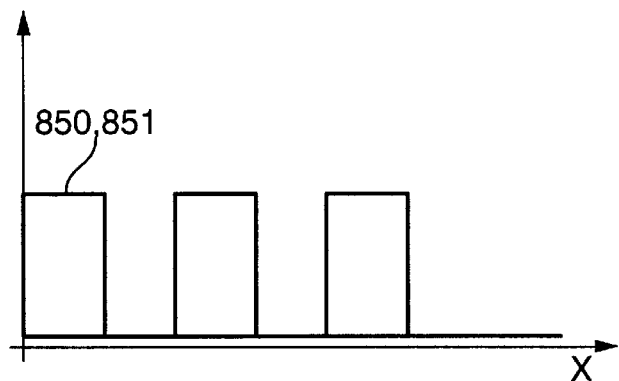
FIG. 19a is a diagram showing signals which can be generated by the sensor adapted to be utilized in the combination of FIGS. 18a to 18c.
Figure 19B:
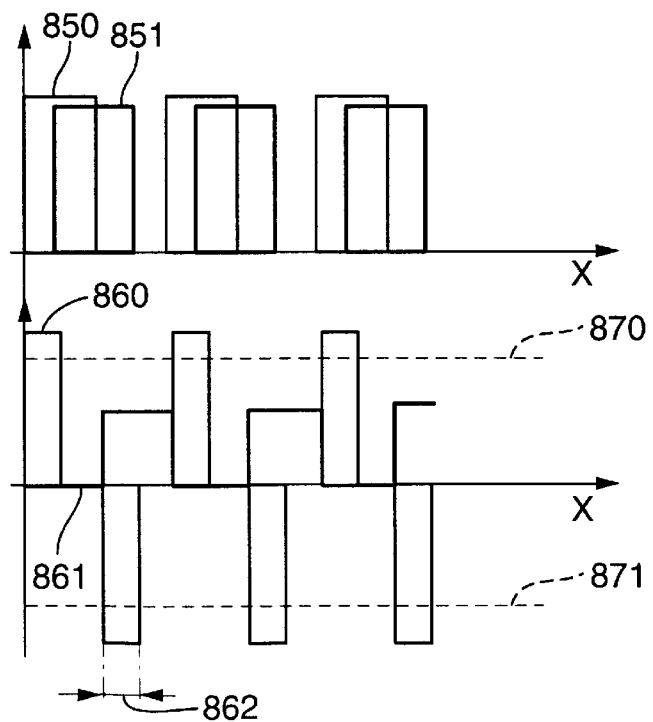
FIG. 19b is a diagram showing the manner in which the signals from the sensor of FIGS. 18a to 18c vary in response to angular movements of the disc-shaped elements of the damper with and relative to each other.

The curves 850, 851 in the diagram of FIG. 19a respectively denote signals which are (or which can be) transmitted by the constituents of the composite sensor 820, 821 in the embodiment of FIGS. 18a to 18c. The signals are at least substantially identical when the elements 800, 801 dwell in their starting angular positions relative to each other. However, and as shown in FIG. 19b, the intensities and/or other characteristics of such signals change when the elements 800, 801 are caused to leave their starting angular positions relative to one another. The curve 860 denotes the difference between the signals from the constituents of the sensor 820, 821. The pulse width 862 is indicative of the extent of angular displacement of the elements 800, 801 relative to each other. When the intensity of the signal denoted by the curve 860 of FIG. 19b exceeds a first threshold value 870, the intensity or another relevant characteristic of the signal 861 from the sensor is set to match a first predetermined value, e.g., zero. If the intensity of the signal denoted by the curve 860 drops below a second threshold value 871, the signal 861 can be caused to assume a second predetermined value, such as a maximum value. The just described arrangement renders it possible to monitor the angular displacements of the driving element 800 even if the driven element 801 is blocked by a stop or the like.

An advantage of the aforedescribed combinations of dampers and sensors is that they can (directly or indirectly) ascertain the force which a driving unit applies in order to enable a component of the gearbox to select a particular gear ratio or to shift into or from a particular gear. Furthermore, such combinations of dampers and sensors can be resorted to in order to ascertain the magnitude of the force which is required to change or select the torque being or to be transmitted by an automated torque transmitting system, such as the friction clutch 2 shown in FIG. 1.

For example, signals which are transmitted by the sensors of the aforedescribed combinations of dampers and monitoring means to a control unit can be processed into signals which the control unit transmits to one or more driving units in order to ensure that the magnitude of the force being transmitted from a driving unit to an automated gearbox and/or to an automated torque transmitting system will not exceed a maximum permissible value, e.g., a value which would entail damage to and/or actual destruction of certain parts.

Figure 20:
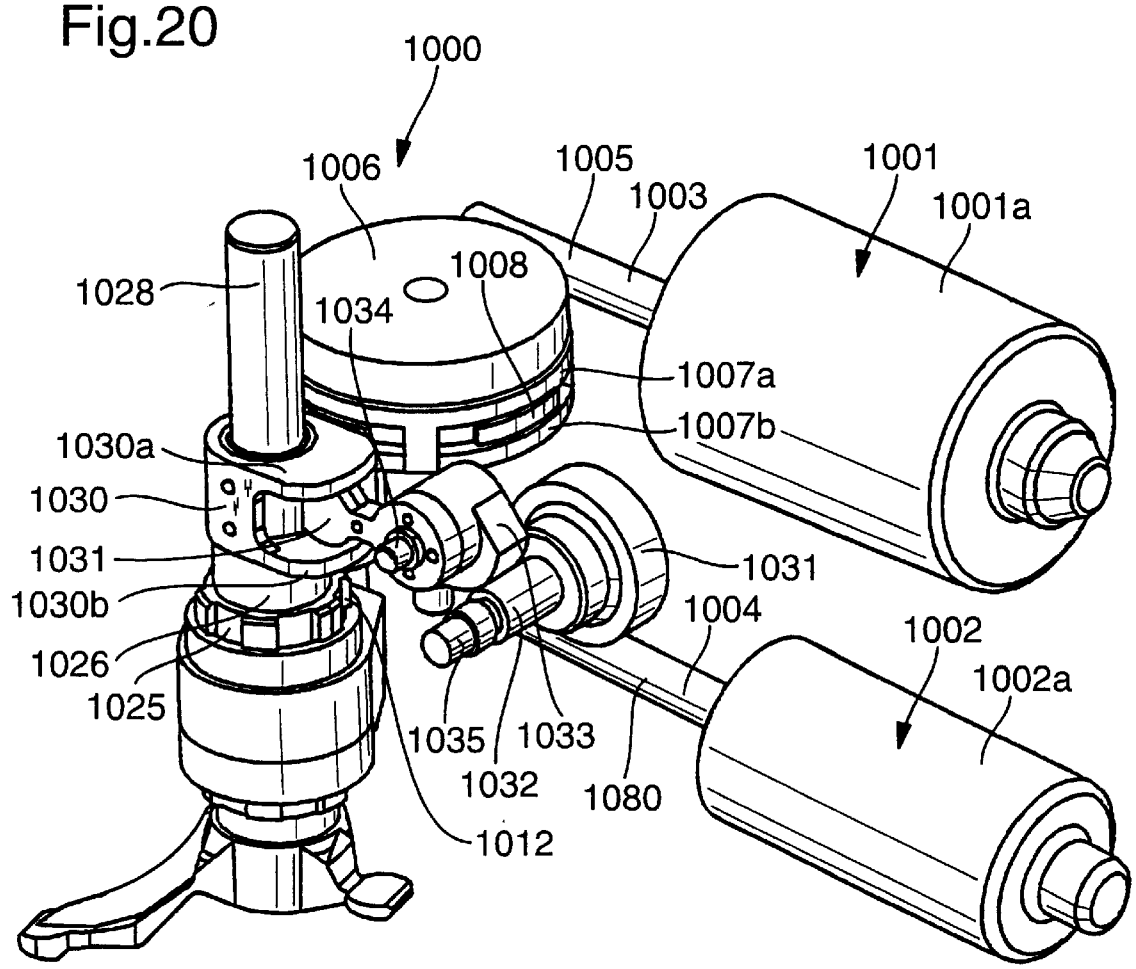
FIG. 20 is a perspective view of still another actuator.
Figure 21:
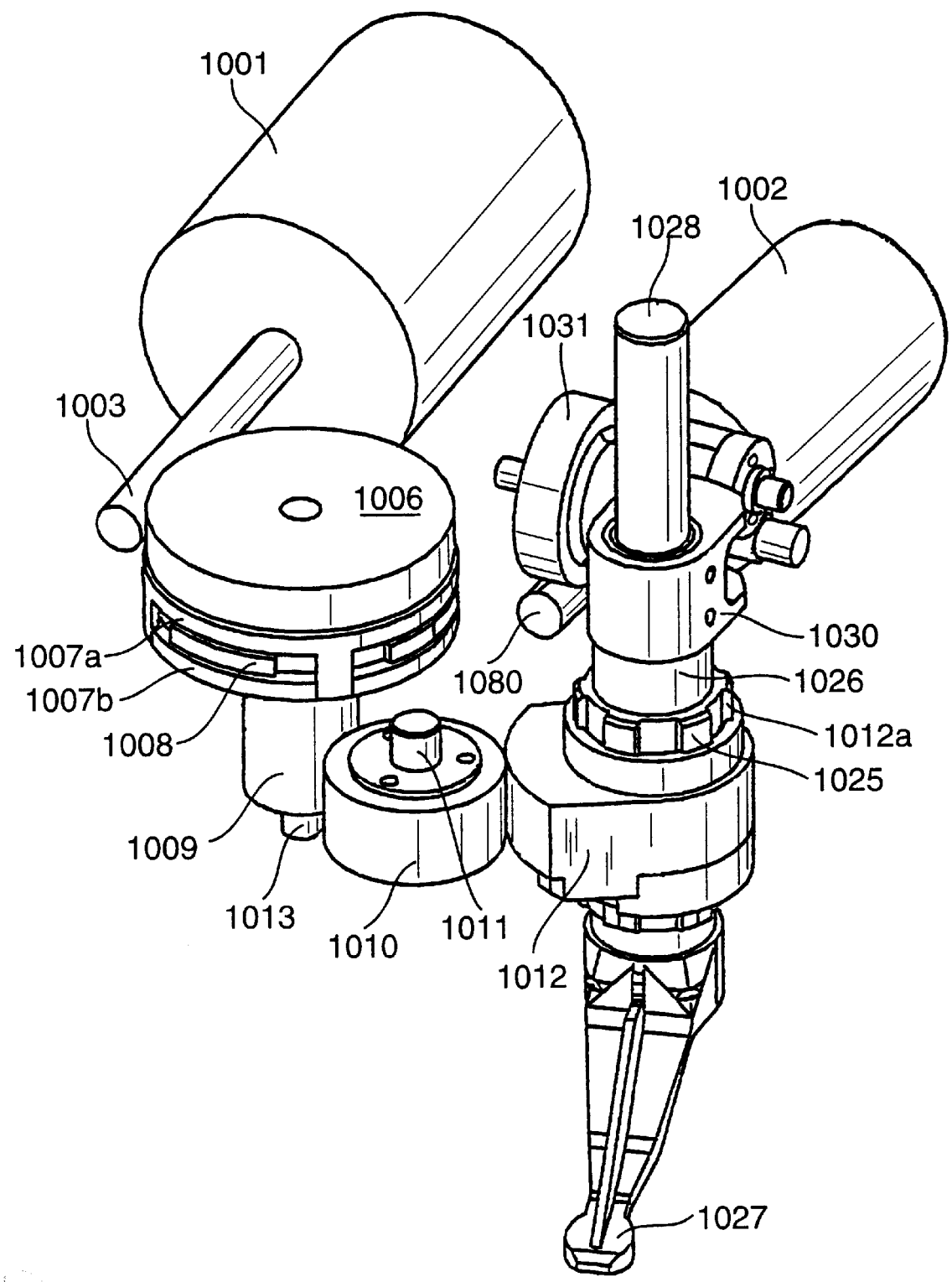
FIG. 21 is another perspective view of the actuator of FIG. 20.
Figure 22:
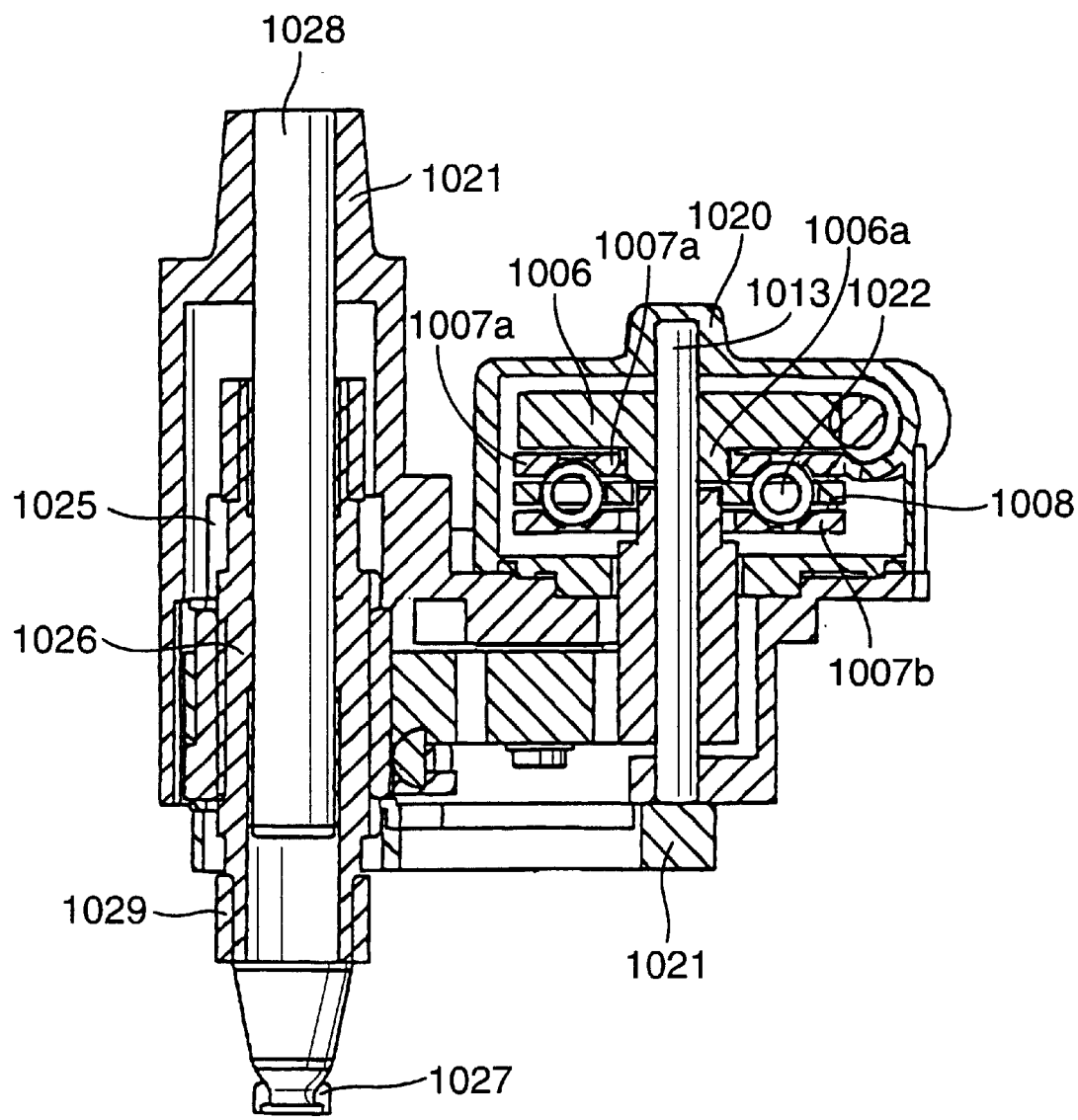
FIG. 22 is a sectional view of certain details in the actuator of FIGS. 20 and 21.

FIGS. 20 to 22 illustrate a further actuator 1000 which can be utilized to select the gear ratio of and to shift an automated gearbox (not fully shown) into and from a selected gear. The actuator 1000 comprises first and second driving units 1001, 1002 each of which can constitute an electric motor. The driving unit 1001 serves to operate a first transmission which can shift the gearbox into and from a selected gear, and the driving unit 1002 serves to operate a second transmission which can select the gear ratio of the gearbox. The driving units 1001, 1002 respectively comprise substantially cylindrical casings or stators 1001a, 1002a which are (but need not be) at least substantially cylindrical. For example, the stator 1001a and/or 1002a can have one or more flattened external surfaces or facets so that it exhibits a polygonal or substantially polygonal cross-sectional outline.

The output shafts 1003, 1004 of the driving units 1001, 1002 respectively carry (or are of one piece with) worms 1005, 1080 forming part of first stages (worm gearings) of the respective transmissions. The second stages of the two transmissions employ spur gearings one of which can change the angular position and the other of which can change the axial position of a central shaft 1026 of the gearbox.

The worm 1005 on the output shaft 1003 of the driving unit 1001 mates with a worm wheel 1006 which can transmit torque to a spur gear 1009 by way of a damper including a twin-section first disc-shaped element 1007a–1007b receiving torque from an externally toothed extension 1006a of the worm wheel 1006, a second disc-shaped element 1008 between the sections of the first disc-shaped element, and a set of prestressed (if necessary) energy storing resilient elements (such as coil springs) 1022 operating between the elements 1007a–1007b and 1008. The element 1008 of the damper is non-rotatably secured to or is made of one piece with the spur gear 1009. A shaft 1013 for the spur gear 1009 and worm wheel 1006 is journalled in a bearing 1020 provided in the housing 1021 of the actuator 1000. The sections 1007a, 1007b of the first element of the damper are non-rotatably secured to each other and to the worm wheel 1006. The section 1007a can be of one piece with the worm wheel 1006, and this section 1007a can carry bolts, rivets or other suitable fasteners which secure it to the other section 1007b.

The spur gear 1009 meshes with a second (intermediate) spur gear 1010 having a shaft 1011 which is rotatably mounted in the housing 1021 of the actuator 1000, and the spur gear 1011 meshes with a gear segment 1012 which is coaxial with the central shaft 1026 of the gearbox.

The form-locking connection between the toothed extension 1006a of the worm wheel 1006 and one (such as 1007a) of the sections 1007a, 1007b can comprise a so-called serration-, groove- or channel-toothing or an involute toothing, and the aforementioned fasteners which secure the sections 1007a, 1007b to each other can comprise bolts having heads which engage the section 1007a and shanks which engage the section 1007b, or vice versa. The energy storing elements 1022 are installed in windows provided therefor in the disc-shaped element 1008, and they also extend into pockets or recesses provided therefor in the adjacent sides of the sections 1007a, 1007b. The resilient connection between the disc-shaped elements 1007a–1007b and 1008 preferably comprises at least two coil springs or other types of resilient elements. As already mentioned above, the resilient elements 1022 may but need not always be installed in prestressed condition. The end portion(s) of the shaft 1013 can be a press-fit in the bearing or bearings 1020 of the housing 1021, and such shaft can rotatably support the parts 1006, 1007a, 1008, 1007b and 1009.

The worm wheel 1006 can be made of a suitable thermoplastic material, and the energy storing elements 1022 can be made of a material (such as metal, rubber or a synthetic plastic substance) having a thermal expansion coefficient lower than that of the material of the worm wheel 1006. This permits for the establishment of a certain preferred joint play, especially when the worm wheel 1006 is provided with the aforementioned externally toothed or splined extension 1006a fitting into an internal gear forming part of an element (such as 1007a–1007b) of the damper between the worm wheel 1006 and the spur gear 1009. The desirable joint play is even more likely to develop if the temperature at which the joint play is to develop is below the temperature normally prevailing when the actuator 1000 is in use. The elements 1007a–1007b and 1008 of the damper can be made of a metallic and/or synthetic plastic material.

In accordance with a modification of the heretofore described design of the actuator 1000, it is or it might be desirable if the channel-, serration- or groove-toothing between the input element (such as the section 1007a) of the damper and the spur gear 1009 is designed in such a way that there develops a relatively small joint clearance or play. For example, this can be accomplished by making the spur gear 1009 of a material having a relatively high thermal expansion coefficient and the internally threaded hub surrounding the shaft 1009 is made of a material having a lower thermal expansion coefficient.

The illustrated gears 1009, 1110 are spur gears and they serve to transmit torque from the worm wheel 1006 to the gear segment 1012. Alternatively, it is possible to provide an intermediate gear between the gears 1009, 1010 and/or between the gear 1010 and the gear segment 1012. The latter has internal teeth 1012a meshing with external teeth 1025 of the central shaft 1026 of the gearbox. In order to shift the gearbox into a different gear, the gear segment 1012 is caused to turn the central shaft 1026 by way of the mating toothed portions 1012a, 1025 so that the shaft 1026 changes the angular position of its substantially radially extending gear shifting component or arm 1027. In addition, the meshing toothed portions 1012a, 1025 permit the central shaft 1026 to move axially of the internally toothed portion 1012a of the gear segment 1012 and to thus carry out a gear ratio selecting operation without any interruption of the torque transmitting connection between the parts 1012 and 1026, i.e., the angular position of the gear shifting arm 1027 remains unchanged while the central shaft 1026 is in the process of selecting a desired gear ratio. The arm 1027 shares the axial movements of the central shaft 1026.

The teeth (such as the aforementioned serration-, groove- or channel-toothing) which transmit torque between the gear segment 1012 and the central shaft 1026 can serve the additional purpose of centering the shaft 1026. The latter is guided by a shaft or rod 1028 which is fixedly mounted in the housing 1021 of the actuator 1000. A support 1029 is provided in (or forms part of) the housing 1021 and serves to hold the gear segment 1012 against axial movements with the central shaft 1026 of the gearbox. Thus, though the gear segment 1012 can turn with the central shaft 1026 (or, more accurately stated, though the shaft 1026 can be turned by the gear segment 1012), this gear segment does not share the axial movements of the central shaft. If the shaft 1026 is caused to change its axial position by moving longitudinally of the guide shaft 1028, its external teeth 1025 simply slide along the internal teeth 1012a of the gear segment 1012.

The driving unit 1002 of the actuator 1000 initiates axial movements of the central shaft 1026, i.e., the selection of desired gear ratios for the gearbox. The output shaft 1004 of the driving unit 1002 drives the worm 1080 which mates with a worm wheel 1031. The latter can turn a spur gear 1032 which meshes with a gear segment 1033 mounted on or of one piece with a stud or shaft 1034 which is journalled in the housing 1021 of the actuator 1000.

The gear segment 1033 is non-rotatably (form-lockingly) connected with a finger 1031a, e.g., by means of one or more rivets, screws and/or other suitable fasteners. Alternatively, the finger 1031a can be of one piece with the gear segment 1033. The free end portion of the finger 1031a extends into the space between the prongs 1030a', 1030b of a fork 1030 which is non-rotatably secured to the central shaft 1026 and cannot move axially of this shaft. Thus, when the worm 1080 is turned by the output shaft 1004 of the driving unit 1002, the worm wheel 1031 turns the gear 1032 which pivots the gear segment 1033 whereby the finger 1031a moves the fork 1030 and the central shaft 1026 axially of the guide member 1028 and relative to the gear segment 1012 to select a particular gear ratio. The dimensions of the fork 1030 are such that its prongs 1030a' and 1030b remain in engagement with the finger 1031a in each such angular position of the central shaft 1026 which is necessary to shift the gearbox into or from a selected gear.

The worm wheel 1031 and the gear 1032 are mounted on a shaft 1035 which is journalled in the housing 1021 of the actuator 1000. The finger 1031*a* can (but need not) be of one piece with the gear segment 1033, and the fork 1030 can (but need not) be of one piece with the central shaft 1026. Also, the fork 1030 can be a one-piece part or its substantially plate-like prongs 1030*a*', 1030*b* can be separately produced parts which are permanently or separably secured to a collar or sleeve surrounding and being affixed to the central shaft 1026 in such a way that it compels the shaft 1026 to move along the guide member 1028 when the driving unit 1002 receives a signal to pivot the gear segment 1033 by way of the output shaft 1004 and the transmission including the worm gearing 1080, 1031 and the spur gearing comprising the gear 1032.

The housing 1021 is preferably provided with suitable abutments or stops (not specifically shown) which serve to limit the extent of axial and/or angular movability of the central shaft 1026. Alternatively, such stops (or at least some of these stops) can be provided in the case of the gearbox including the central shaft 1026. The purpose of the abutments or stops is to prevent excessive axial and/or angular displacements of the central shaft 1026 and to thus contribute to greater reliability of operation of the gearbox and to compactness of the assembly including the gearbox and the actuator 1000.

The housing 1021 can be secured to the case of the gearbox by means of screws, bolts, locating pins or in any other suitable way, e.g., in a manner already described with reference to FIG. 7. If the securing means includes screws, bolts or other threaded fasteners, the shanks of such fasteners can extend through holes in the housing 1021 and into tapped bores in the case of the gearbox, and the heads of the fasteners urge the housing 1021 against the case of the gearbox (or vice versa). It is also possible to employ threaded or other fasteners (e.g., bolts and nuts) to secure the stators 1001*a*, 1002*a* of the driving units 1001, 1002 to the housing 1021 of the actuator 1000 as well as (or) to the case of the gearbox.

It has been found that the compactness of the assembly including the actuator 1000 and the gearbox including the central shaft 1026 can be enhanced if the axes of the output shafts 1003, 1004 of the driving units 1001, 1002 are at least substantially parallel to each other and/or if the axis of the worm wheel 1006 is at least substantially parallel 25 to the axis of the central shaft 1026. Additional savings in space can be achieved, at least in certain types of power trains, if the axes of the shafts 1003, 1004 are normal to the axes of the worm wheel 1006 and central shaft 1026. Still further, the axes of the worm wheel 1031 and gear segment 1033 can be normal to the axes of the output shafts 1003, 1004 and the central shaft 1026. Such orientation of the just mentioned axes can also contribute to compactness of the power train.

Referring to FIGS. 23 through 26, there is shown a portion of a further power train 1100 with an automated gearbox including an angularly and axially movable central shaft 1111. The actuator in the power train 1100 comprises a first driving unit 1101 which can change the angular position of the central shaft 1111 to thus shift the gearbox into or from a selected year, and a second driving unit 1102 which can move the central shaft 1111 axially to thus select a desired gear ratio.

The output shaft of the driving unit 1101 carries or is of one piece with a worm 1103 which mates with a worm wheel 1104. The latter can transmit torque to a spur gear 1109 by way of a damper including a first disc-shaped element having coaxial sections 1105, 1106 non-rotatably connected to the worm wheel 1104, a second disc-shaped element 1107 disposed between the sections 1105, 1106 and fixedly secured to or of one piece with a shaft 1108 of the gear 1109, and one or more preferably prestressed energy storing elements (e.g., at least two coil springs) installed between the two elements in a manner already explained in connection with several previously described embodiments. The gear 1109 can but need not be of one piece with the shaft 1108.

The gear 1109 meshes with a gear segment 1110 which is mounted on and can change the angular position of the central shaft 1111 in response to starting of the driving unit 1101 (e.g., an electric motor) to thus shift the gearbox into or from a selected gear. The central shaft 1111 carries one or more gear shifting fingers (two such fingers 1112*a*, 1112*b* are shown in each of FIGS. 23, 24 and 26), and such fingers can enter sockets 1113 provided therefor in gear shifting elements (such as forks, rods or bars) 1130 of the gearbox. For example, the arrangement can be such that the finger 1112*a* serves to shift into forward gears whereas the finger 1112*b* serves to shift the gearbox into reverse gear.

The driving unit 1102 can also constitute an electric motor and its output shaft carries or is of one piece with a worm 1120 mating with a worm sheel 1121 on a shaft 1122 which carries a spur gear 1123 having a shifting finger 1124 extending into a recess or socket 1125 of the central shaft 1111. The dimensions of the finger 1124 and of the socket 1125 are such that the axial motion transmitting connection between the worm wheel 1121 and the central shaft 1111 remains operative in each required angular position of the gear segment 1110, i.e., in all necessary gear shifting positions of the fingers 1112*a*, 1112*b* of the gear segment 1110. The gear segment 1110 and its fingers 1112*a*, 1112*b* share the axial movements of the central shaft 1111; predetermined axial movements of the shaft 1111, gear segment 1110 and fingers 1112*a*, 1112*b* are necessary for proper selection of that gear into which the gearbox can be shifted by the finger 1112*a* or 1112*b* in response to angular displacement of the central shaft 1111 by way of the worm gearing 1120, 1121 and spur gear 1123.

The recess or socket 1125 can be obtained by removing material from the central shaft 1111 in a milling machine or in any other suitable way.

Figure 24:
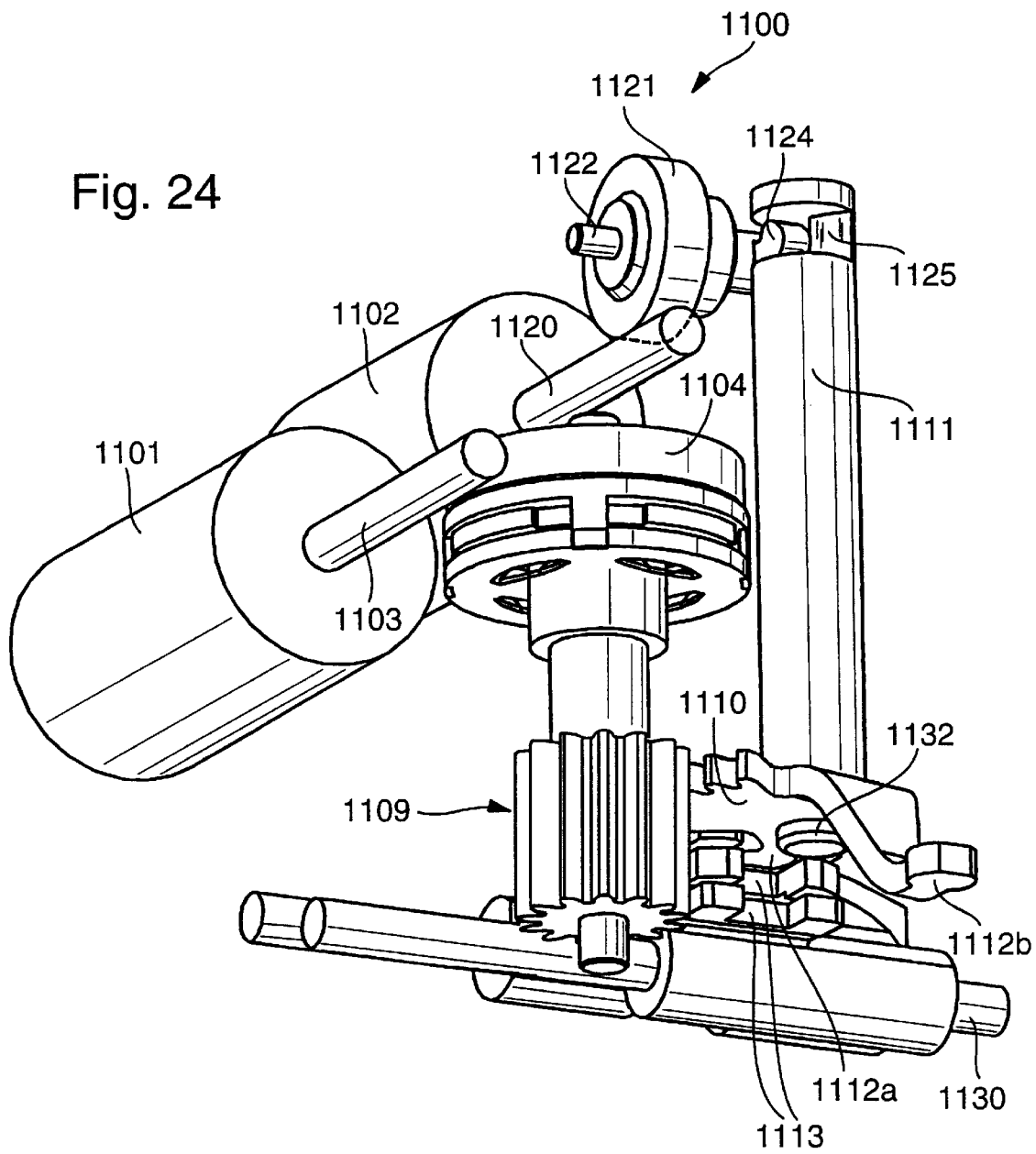
FIG. 24 is an enlarged different perspective view of the structure which is shown in FIG. 23.

As can be readily seen in FIG. 24, the axial dimensions of the gear 1109 and gear segment 1110 are selected in such a way that their teeth remain in mesh in each required axial position of the central shaft 1111. The latter is non-rotatably connected with the gear segment 1110 by one or more rivets or threaded fasteners 1132 or in any other suitable manner, e.g., by welding, spot welding, friction welding, laser welding or soldering. The fingers 1112*a*, 1112*b* may but need not be of one piece with the gear segment 1110 which latter can be a mass-produced sheet metal stamping. For example, the basic form of the gear segment 1110 can be arrived at by separating a blank from a sheet metal panel, and such blank is thereupon treated in a stamping or any other suitable upsetting or shaping machine.

Figure 25:
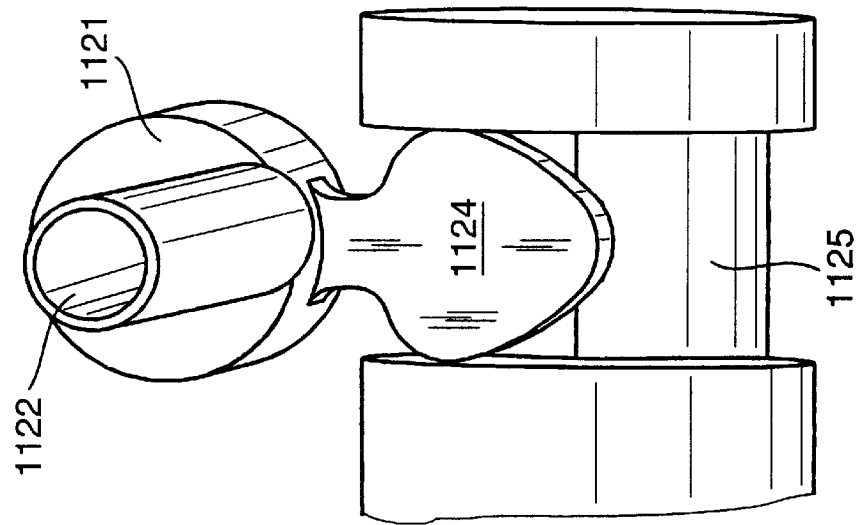
FIG. 25 is a greatly enlarged perspective view of certain elements of a transmission between the actuator and the control shaft of the gearbox shown in FIGS. 23 and 24.
Figure 26:
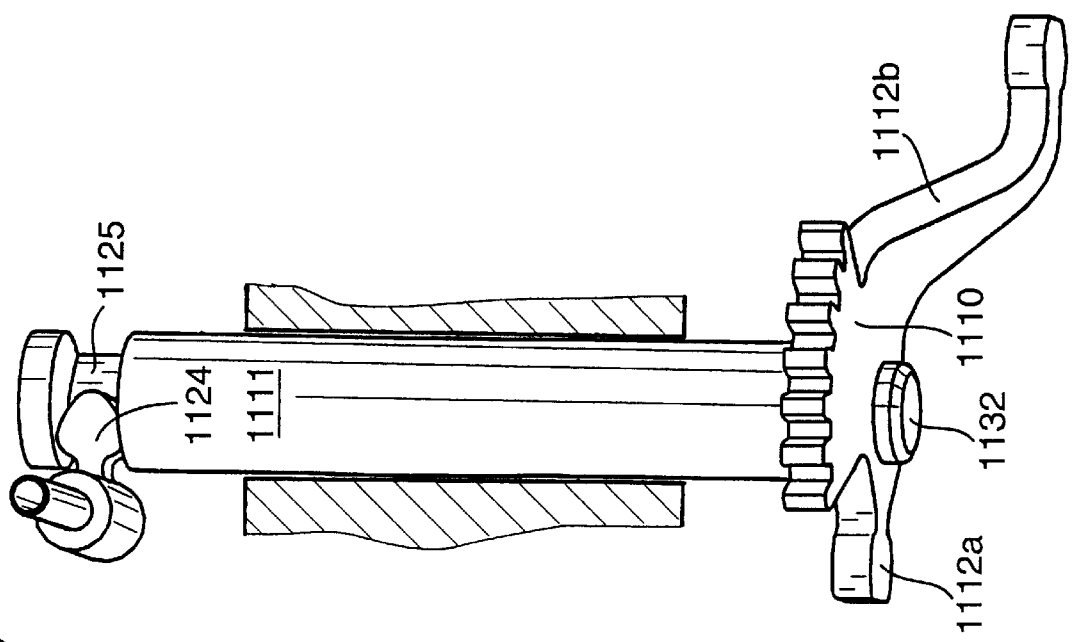
FIG. 26 is an enlarged view of a detail in the power train of FIGS. 23 and 24.

FIG. 25 shows that the finger 1124 can be of one piece with the worm wheel 1121 which is rotatable on the shaft 1122. FIG. 26 shows a module including the central shaft 1111 and the gear segment 1110 (secured to one end portion of the shaft 1111 by the fastener means 1132). The central shaft 1111 is rotatably and axially movably mounted in the case of the gearbox and its socket or recess 1125 receives the shifting finger 1124 of the worm wheel 1121 or of a part which can be rotated by this wormwheel.

Figure 23:
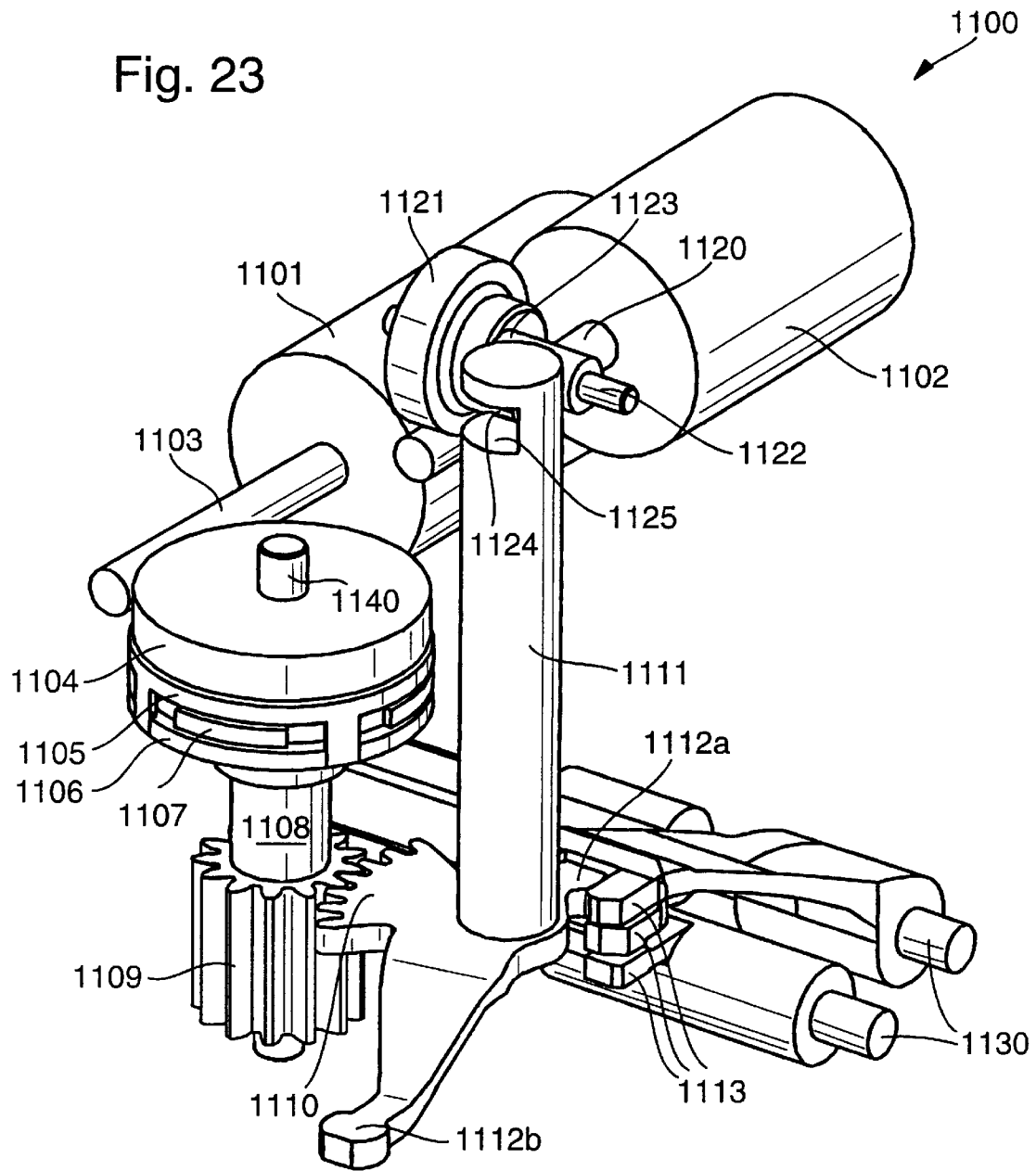
FIG. 23 is a fragmentary perspective view of a power train embodying another combination of an actuator and an automated gearbox.

FIG. 23 shows that the arm 1112a of the gear segment 1110 extends into one of the sockets 1113 as a result of a predetermined axial positioning of the central shaft 1111 by the finger 1124. If the central shaft 1111 is thereupon turned by the gear segment 1110, the arm 1112a displaces the selected shifting member (e.g., a rod) 1130 so that the gearbox is shifted into a selected gear. In other words, and referring again to FIG. 2a, axial movements of the central shaft 1111 along the gear ratio selecting path 192 result in the placing of the finger 1112b into register with the reverse path 191 (R) or with the path 193, or in the placing of the finger 1112a into register with one of the forward paths 191 (1 to 5). The gear segment 1110 is thereupon caused to move the fingers 1112a, 1112b about the axis of the shaft 1111 to thus shift the gearbox into reverse (via finger 1112b) or into one of the forward gears (via finger 1112a).

The shaft 1140 rotatably supports the worm wheel 1104 as well as the elements 1105–1106 and 1107 of the damper, and this shaft is mounted in the housing of the actuator including the driving units 1101, 1102 and the corresponding transmissions. The manner in which the worm wheel 1104 and the gear 1109 are connected with the elements 1105–1106 and 1107 of the damper between the worm wheel 1104 and the gear 1109 is or can be the same as described with reference to FIGS. 20 to 22.

If desired, the gear 1109 can be replaced with a gear segment which must be dimensioned in such a way that it remains in mesh with the gear segment 1110 (or with a gear replacing the gear segment 1110) in each axial position of the central shaft 1111. Analogously, the axial length of the toothed part 1110 can exceed that of the toothed part 1109, as long as these parts continue to remain in mesh with each other in each axial position of the central shaft 1111.

It is further clear that one of the fingers 1112a, 1112b (e.g., the finger 1112b) can be omitted if the gearbox is designed in such a way that a single finger (e.g., the finger 1112a) suffices to shift the gearbox into neutral, into reverse as well as into any desired forward gear (such as 1-3, 1-4, 1-5 or 1-6). It is clear that the case of the gearbox contains a suitable guide (such as a bearing sleeve) which confines the central shaft 1111 to required and permissible axial and angular movements. The shaft 1122 can be mounted in the stator of the driving unit 1102 and in the housing of the actuator including the driving units 1101 and 1102.

The shifting finger 1124 can include or constitute a cylinder which is located laterally of the axis of the shaft 1122 for the worm wheel 1121 and gear 1123 and extends into the recess 1125 in each axial position of the central shaft 1111. Alternatively, and as shown in FIG. 25, the configuration of the finger 1124 can depart from that of a cylinder, i.e., this finger can constitute a relatively thin plate-like body having a configuration such that identical angular displacements of the gear 1123 and worm wheel 1121 entail identical axial movements of the central shaft 1111. Thus, the effective radius or throw of the finger 1124 (in response to movement from a central or neutral position) can remain at least substantially constant so that the relationship of the angular displacement of the finger (eccentric) 1124 to the axial displacement of the central shaft 1111 remains at least substantially linear which is highly desirable because the clearance between the periphery of the finger 1124 and the surface bounding the recess 1125 remains at least substantially constant in each axial position of the central shaft 1111.

Figure 27:
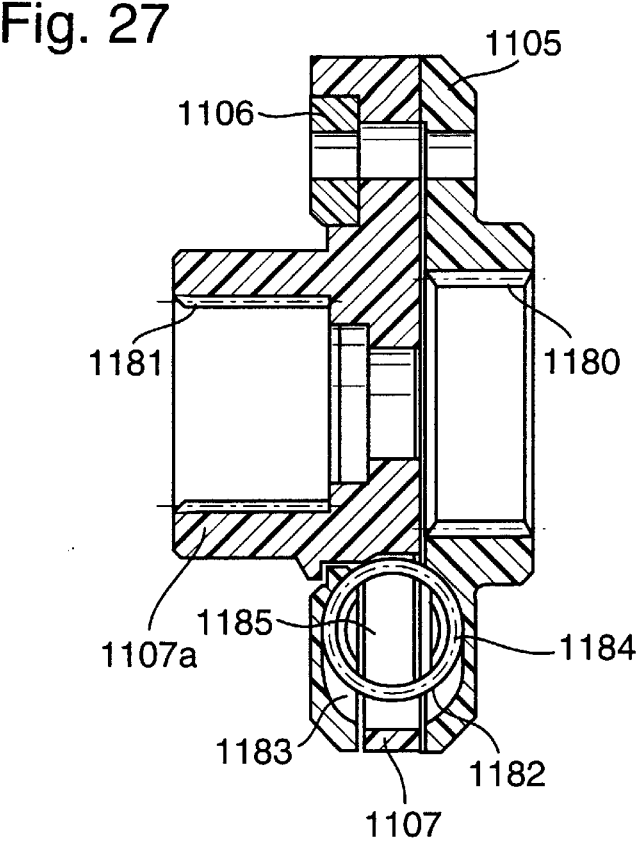
FIG. 27 is an axial sectional view of a damper in the actuator of the power train which is illustrated in FIGS. 23 and 24.
Figure 28:
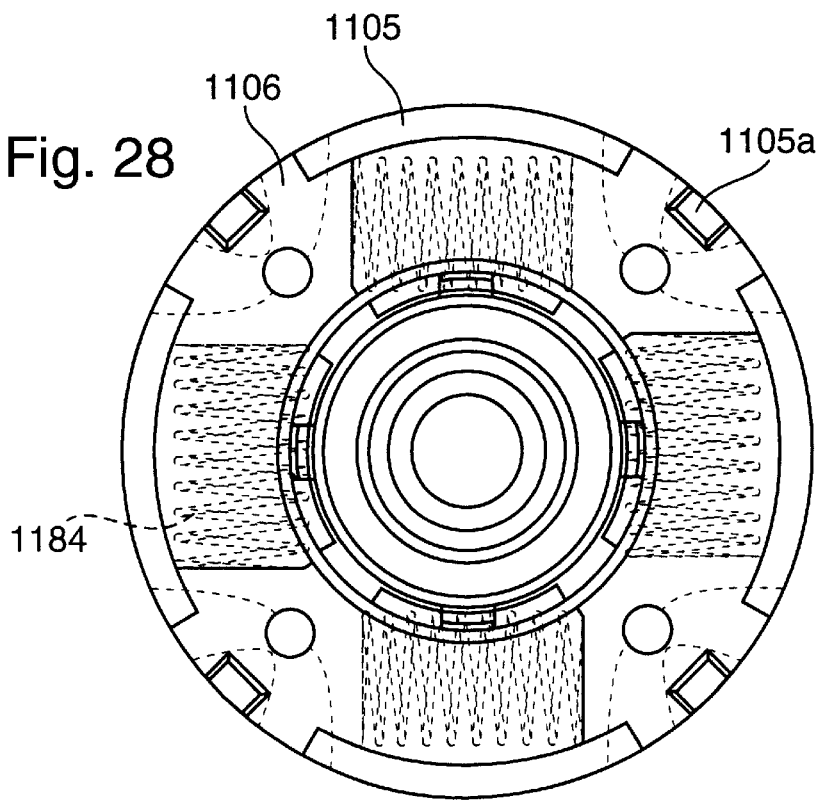
FIG. 28 is an elevational view of the damper which is illustrated in FIG. 27.
Figure 29:
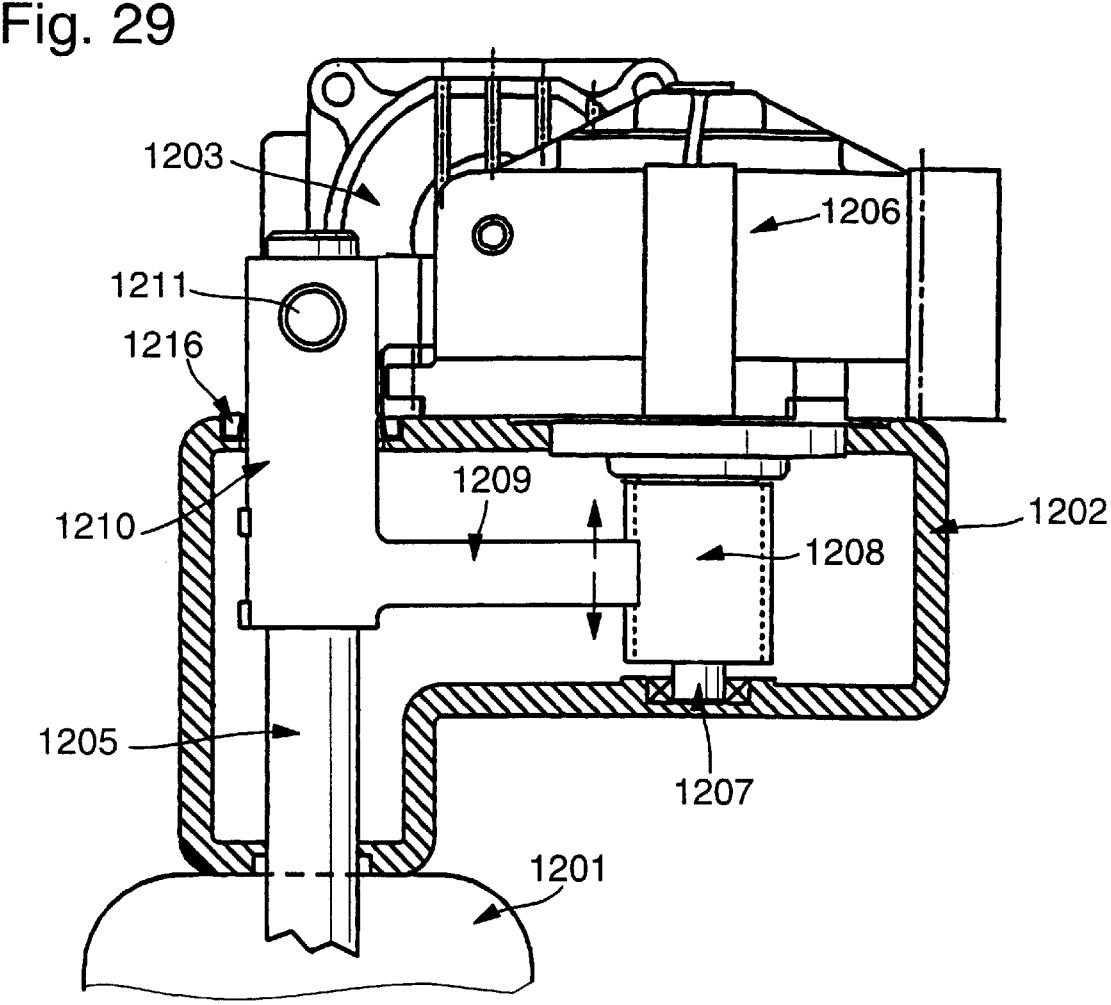
FIG. 29 is a fragmentary partly elevational and partly sectional view of a power train which employs a further novel combination of an actuator and an automated gearbox.
Figure 30:
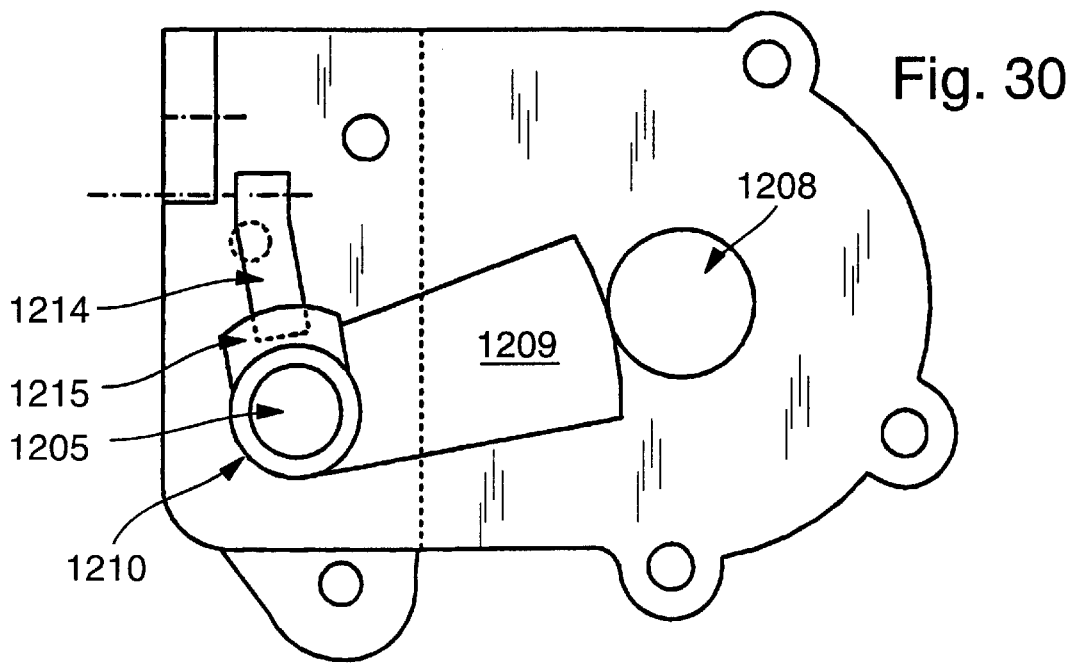
FIG. 30 is a plan view of certain constituents of the actuator-gearbox combination which is illustrated in FIG. 29.
Figure 31:
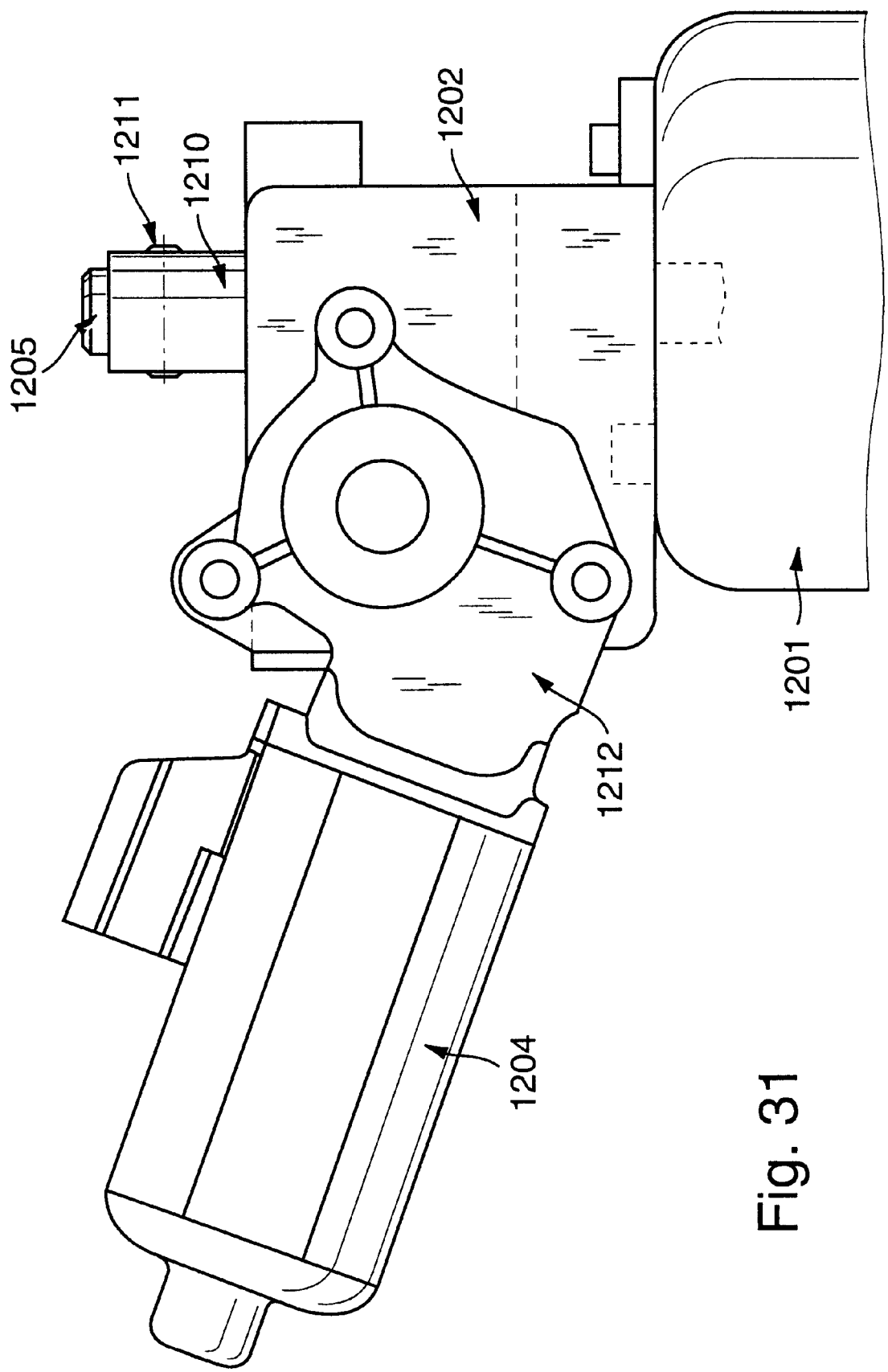
FIG. 31 is an elevational view of the actuator and a fragmentary elevational view of the gearbox utilized in the power train of FIGS. 29 and 30.

FIGS. 27 and 28 show an example of power flow through an elastic arrangement between an electric motor (such as that of the driving unit 1101 or 1102) and a shaft (such as 1111). A disc-shaped element 1105 (see also FIG. 23) is form-lockingly connected with a disc-shaped element 1106, e.g., by snap action or by projections 1105a in the form of lugs, tongues, stubs or the like. A further disc-shaped element 1107 is installed between the elements 1105, 1106. The element 1105 has an internal gear 1180 which can mate with the external teeth of a worm wheel such as the worm wheel 1104 of FIG. 23. The element 1107 comprises a coaxial collar 1107a having an internal gear 1181 which can form-lockingly engage the shaft 1108 of FIG. 23.

The elements 1105 and 1106 further comprise cupped portions or sections 1182 and 1183, respectively, for energy storing elements 1184 in the form of coil springs. The element 1107 is provided with windows 1185 for the central portions of the resilient elements 1184. The length of the cupped portions 1182 and 1183 (as seen in the circumferential direction of the elements 1105 to 1107) equals or approximates the axial length of the resilient elements 1184 when these resilient elements are installed in an at least slightly prestressed condition.

When the elements 1105, 1106 and the element 1107 are caused to turn relative to each other, the resilient elements 1184 are caused to store additional energy and to transmit torque from the element 1105 to the element 1107. For example, the initial stressing of the resilient elements 1184 can be selected in such a way that a further shortening (compression) of such resilient elements takes place only when the torque to be transmitted exceeds the initial stressing of the elements 1184. If the torque continues to increase, the resilient elements 1184 undergo deformation which is at least substantially proportional to the increased torque and, when the increased torque reaches a threshold value, the convolutions of each of the resilient elements 1184 abut each other so that, from there on, the elements 1184 act as non-compressible solid bodies. This takes place when the force being applied by a driving unit (1101) reaches a predetermined value. If the torque which is being transmitted by the worm wheel 1104 to the element 1105 continues to increase, the parts 1105–1107 and 1184 no longer act as a damper but rather as a simple form-locking connection between the worm wheel 1106 and the shaft 1108.

In accordance with a further feature of the invention, a power train which includes an automated gearing is constructed and assembled in such a way that it comprises a relatively small number of simple, compact and inexpensive parts and that it can be rapidly and predictably assembled in the manufacturing plant as well as rapidly and predictably installed in a motor vehicle. In addition, the power train is to occupy a relatively small amount of space and, if possible, employ a gearbox which constitutes a rather simple and inexpensive modification or further development of existing or available gearboxes.

Referring now to FIGS. 29 to 32, there is shown an actuator 1202 which is secured to a gearbox 1201. The actuator 1202 comprises two driving units (such as electric motors) 1203, 1204 and transmissions serving to connect the output elements of the driving units with the corresponding (gear ratio selecting and gear shifting) components of the gearbox 1201. The arrangement is such that a central shaft 1205 of the gearbox 1201 must change its angular position in order to shift into or from a selected gear, and such movement is initiated by the driving unit 1203 which operates a worm gearing 1206 serving to rotate a shaft 1207 carrying and transmitting torque to a spur gear 1208 in mesh with a gear segment 1209 which can change the angular position of a sleeve 1210 rotatable with the central shaft 1205. The non-rotatable connection between the sleeve 1210 and the shaft 1205 comprises a diametrically extending pin 1211.

The central shaft 1205 must be moved axially in order to select a desired gear ratio of the gearbox 1201. Such movements are initiated by the output element of the driving unit 1204 which drives a worm gearing 1212 serving to rotate a shaft 1213. The latter is fixedly connected to a relatively short lever or finger 1214 the free end portion of which extends into the space between the prongs of a fork 1215 affixed to the sleeve 1210. Thus, when the worm gearing 1212 changes the angular position of the shaft 1213, the lever 1214 is caused to pivot about the axis of the shaft 1213 to thus shift the central shaft 1205 axially by way of the sleeve 1210 and pin 1211.

When the driving unit 1204 is in the process of selecting a gear ratio for the gearbox 1201, i.e., when the central shaft 1205 is caused to move axially with the sleeve 1210 in response to pivoting of the lever 1214, the gear segment 1209 slides relative to but remains in mesh with the gear 1208 so that the angular position of the central shaft 1205 remains unchanged. The arrangement can be such that, when the gearbox 1201 is to be shifted into the forward ratio 3 or 4 (see FIG. 2a), the central shaft 1205 assumes an intermediate axial position; this shaft is moved axially to a first end position (e.g., an upper end position if the axis of the shaft 1205 is substantially vertical) in order to shift into the forward gear 1 or 2, and the shaft 1205 is moved axially to the other (such as lower) end position prior to shifting into reverse (R) or into forward gear 5.

The driving units 1203, 1204 can be connected to an energy source (such as the battery of a motor vehicle) by way of a cable and a plug insertable into a socket (not shown) in the housing of the actuator 1202.

An important advantage of the sleeve 1210 is that this sleeve renders it possible to assemble the actuator 1202 into a module at one end of the central shaft 1205 of the gearbox 1201. This is highly desirable in those makes of power trains wherein the gearbox is assembled and installed in such a way that a portion of the central shaft (1205) extends from the case of the properly installed gearbox and is ready to be non-rotatably connected with the sleeve 1210 by a pin 1211 or in any other suitable way which ensures that the sleeve 1210 shares the angular movements of the shaft 1205 and the latter shares the axial movements of the sleeve. Such gearboxes differ from those wherein the central shaft is not a part of the shifting dome or an integrated module.

Figure 32:
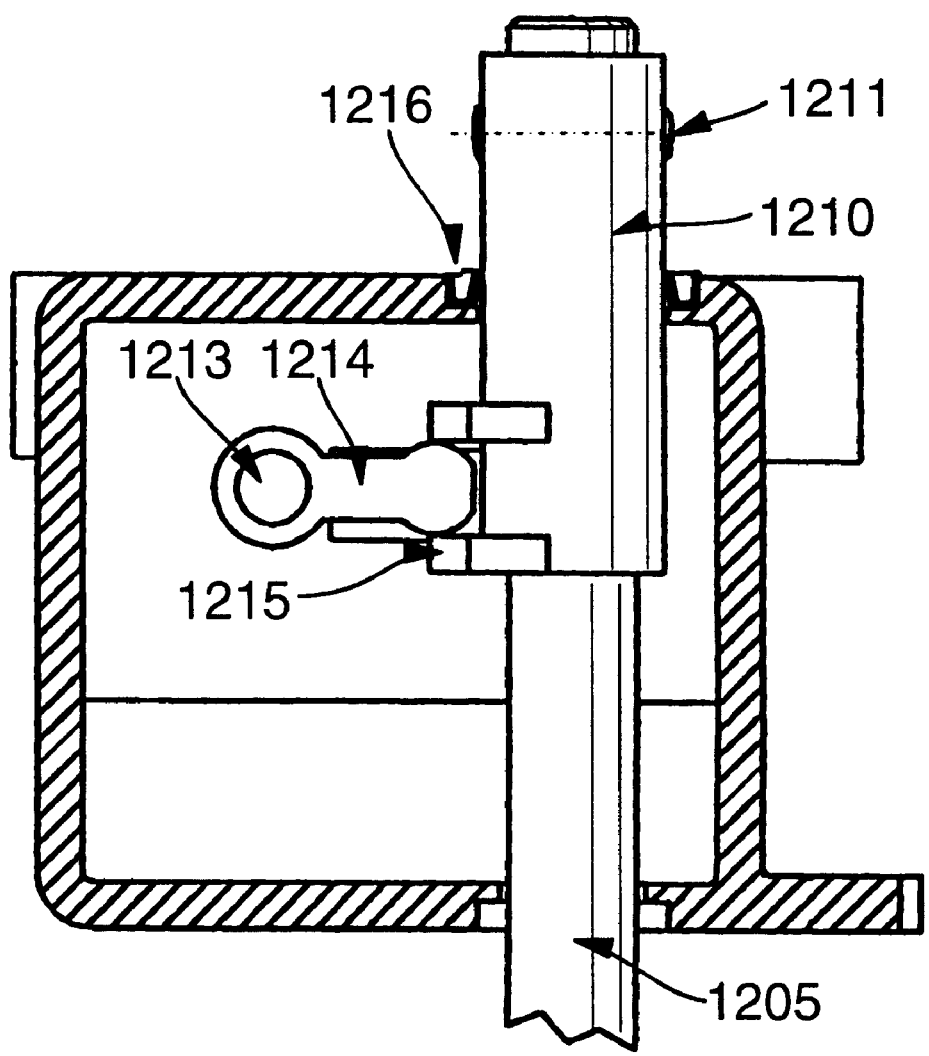
FIG. 32 is a different view of a detail in the structure of FIG. 29.

The actuator 1202 can be furnished as a first preassembled module which is connectable to a second preassembled module constituted by the gearbox 1201. All that is necessary to complete the assembly of the power train including the prime mover (such as 1), a torque transmitting system (such as 2), and a gearbox (1201) is to slip the sleeve 1210 onto the central shaft 1205 and to fixedly secure these parts to each other by the pin 1211 or in another suitable way. The last step involves bolting or otherwise securing the housing of the actuator 1202 to the case of the gearbox 1201. FIG. 32 further shows an annular sealing element 1216 which is preferably placed around the sleeve 1210 to prevent penetration of foreign matter into the housing of the actuator 1202.

FIGS. 33 through 38 show a further power train which embodies the present invention. The gearbox has a case 1301 and comprises a first shaft 1303 which must be moved axially (arrow 1307) to shift the gearbox into a selected gear, and a second shaft 1305 which must perform an angular movement (arrow 1306) in order to select a desired gear ratio. Portions of the shafts 1303 and 1305 extend from the case 1301 of the gearbox. The housing portion 1311a of the actuator can be considered as an add-on solution in that it can be secured to the case 1301 of the fully assembled (or at least practically fully assembled) gearbox with the shafts 1303 and 1305 and their bearings already installed in the case 1301. In other words, the fasteners which secure the housing 1311a, 1311b of the actuator to the case 1301 of the gearbox need not be mounted on that part (1301) which confines the bearings for the shafts 1303, 1305; this simplifies the power train because the actuator can constitute a genuine add-on component or assembly which is attachable to the case 1301 of a fully assembled gearbox.

The following are certain additional features of the power train embodying the structure which is shown in FIGS. 33 to 38:

The actuation of the gear shifting shaft through a second transmission stage and an additional entraining element to compensate for axial tolerances.

Direct actuation of the gear shifting shaft by way of the second transmission stage by resorting to a type of gearing which is not unduly affected by relatively small fluctuations of axial distances.

Actuation of the gear ratio selecting shaft by resorting to a so-called crank loop.

Figure 33:
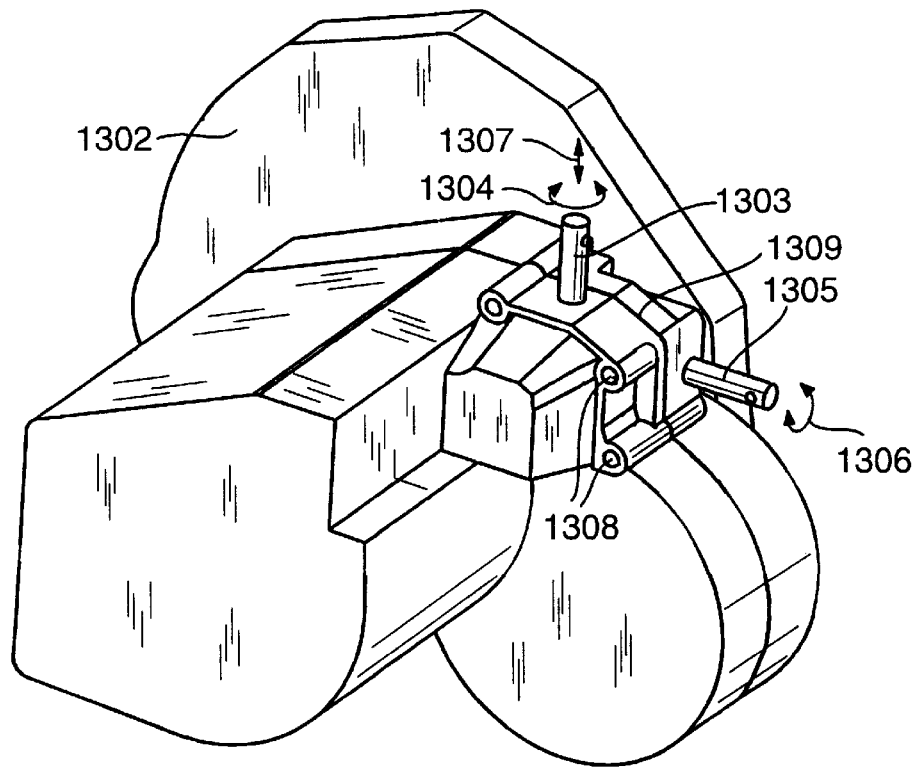
FIG. 33 is a perspective view of certain constituents of a power train which constitutes a further modification of the various power trains illustrated in FIGS. 1 to 32.
Figure 34:
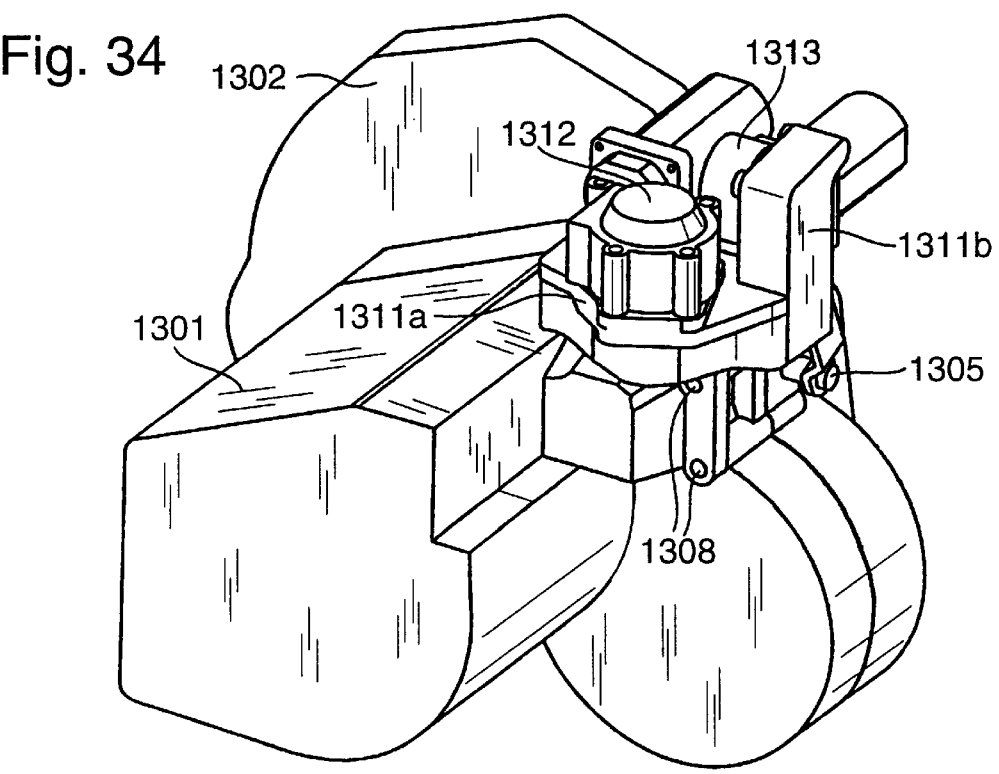
FIG. 34 shows the structure of FIG. 33 and certain additional constituents of the power train.

FIGS. 33 and 34 show that the case 1301 of the gearbox is connected with a housing or bell 1302 of a torque transmitting system (such as a friction clutch) of the power train. As already mentioned above, a portion of the gear shifting shaft 1303 of the gearbox extends from the casing 1301 and is mounted for axial (arrow 1307) and angular (arrow 1304) movement. Axial shifting into selected gears takes place in response to angular displacement (arrow 1304) of the shaft 1303. The shaft 1305 must be turned (arrow 1306) in order to select a desired gear ratio. Such turning brings about an axial movement (arrow 1307) of the shaft 1303.

The gearbox including the case 1301 can be modified in that the two discrete shafts 1303, 1305 can be replaced with a single (central) shaft which can be caused to turn about its axis as well as to move axially; one of these movements is utilized to effect a selection of a desired gear ratio and the other movement is utilized to shift into and from a selected gear.

The means for securing the bell 1302 to the case 1301 of the gearbox can employ threaded fasteners 1308. The character 1309 denotes the locus of abutment between the parts 1301 and 1302; these parts can be of standard design so that no alterations (or appreciable alterations) are necessary to assemble the parts 1301, 1302 in a manner as shown in the drawings.

An internal intermediate part (not specifically shown) can be employed to mount portions of the shafts 1303 and 1305 in the bell 1302 of the torque transmitting system.

In many instances, the distance between the fasteners 1308 and the shaft 1303 and/or 1305 is apt to fluctuate within a rather wide range from power train to power train. For example, FIG. 34 shows one presently preferred distribution (relative positioning) of various parts of the power train. The case 1301 is secured to the bell 1302 by the fasteners 1308, and the parts 1301, 1302 are further connected to the housing 1311a, 1311b of the actuator. Such housing includes a first portion 1311a for the driving unit (see the gear motor 1312) which effects the shifting of the gearbox into a desired gear, and a second portion 1311b for the driving unit (gear motor 1313) which effects the selection of the gear ratios.

It is advisable, in certain power trains, to resort to a second gearbox stage with a step-down ratio in the range of between 2 and 5, especially in the range of gear shifting actuator means. In such instances, it is often desirable to select a spur gearing because its step-down ratio is constant. However, the utilization of such gearings renders it necessary to avoid excessive tolerances regarding the exact mutual spacing of the axes of various component parts as well as the inclinations of such axes relative to each other.

Figure 35:
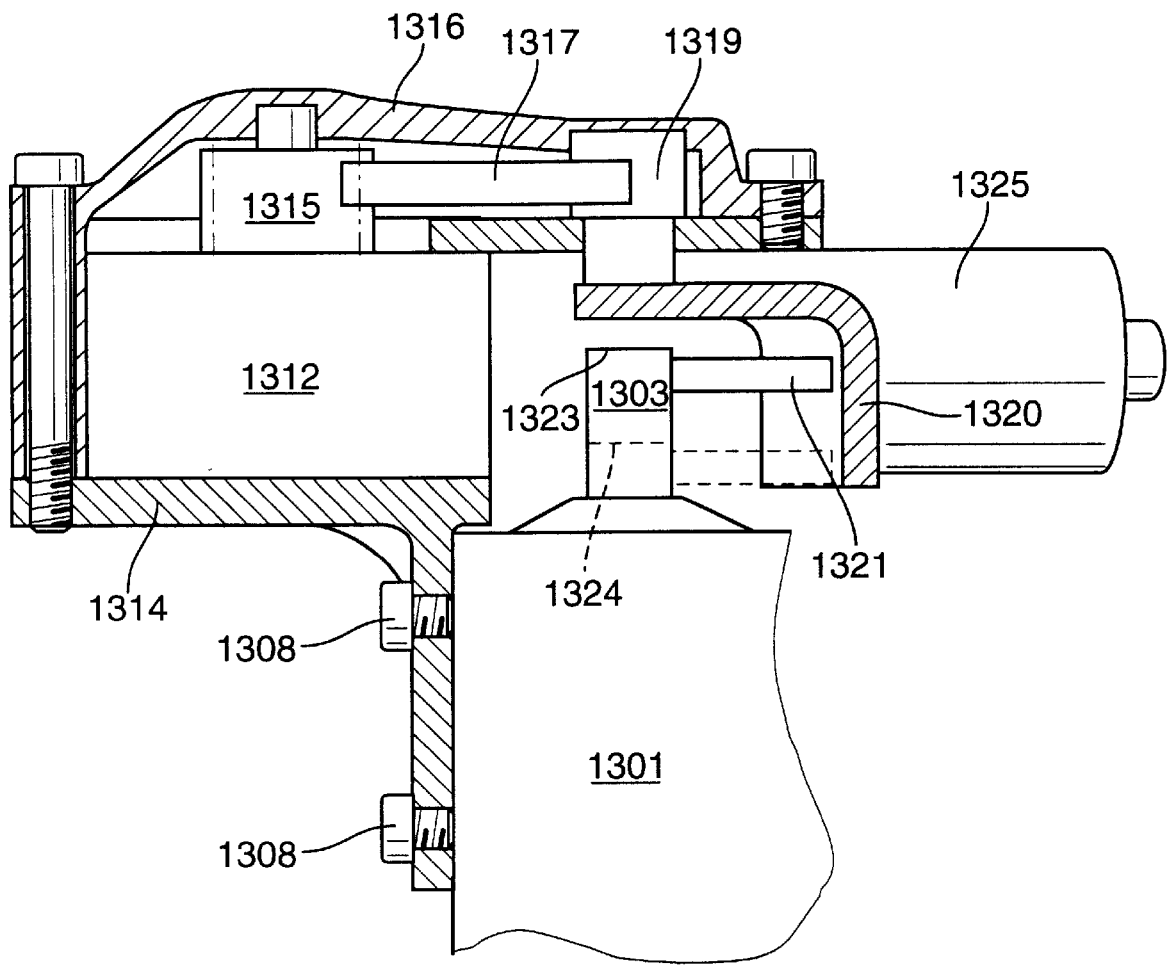
FIG. 35 is a fragmentary partly elevational and partly sectional view of the power train which is shown in FIGS. 33 and 34.
Figure 36:
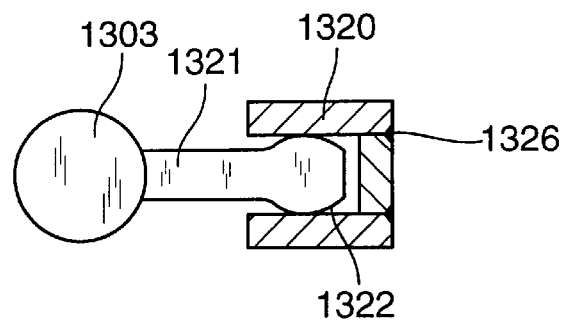
FIG. 36 is a partial plan view and a partial sectional view of a detail in the structure of FIG. 35.

FIG. 35 shows the actuator which effects a shifting of the gearbox into and from a selected gear. The case 1301 of the gearbox carries an adapter 1314 (which is secured to the case 1301 by the aforementioned fasteners 1308) for an actuator. The latter includes the aforementioned gear motor 1312 which is designed in such a way that it closely conforms to the adjacent portion of the case 1301. Furthermore, save for unavoidable tolerances, the axis of the output shaft or gear of the gear motor 1312 is parallel to the axis of the shaft 1303.

The gear motor 1312 carries a housing or casing 1316 for a gear train or gearing including a gear 1315 and a gear segment 1317. Basically, the spacing between the axes of the parts 1315, 1317 is devoid of excessive tolerances. The casing 1316 for the second gearing and the driving unit (gear motor) 1312 are secured to the adapter by threaded fasteners 1318.

The gear segment 1317 transmits torque from a shaft 1319 in the casing 1316 to a forked entraining member 1320 which defines a recess (see FIG. 36) for a portion of a lever 1321 secured to and extending substantially radially from the shaft 1303 of the gearbox. That portion (1322) of the lever 1321 which engages the entraining member 1320 is preferably convex to reduce the play and to render the connection of FIG. 36 less sensitive to tolerances. It is also desirable to select a lever 1321 having a constant thickness (reference may be had to the part 1124 shown in FIG. 24).

The entraining member 1320 is preferably designed in such a way that it is properly contacted by the lever 1321 in the two (e.g., upper and lower) axial end positions 1323 and 1324 (see FIG. 35) of the shaft 1303. The stator 1325 of the gear motor 1312 is located outside of the range of pivotal movements of the lever 1321 and entraining member 1320.

An advantage of the power train of FIGS. 33 to 38 is that it can be produced and assembled at a relatively low cost. Thus, the casing 1316 can be mass-produced from sheet metal, e.g., as a diecast aluminum part, or as an injection molded plastic part. The gear segment 1317 can be mass-produced in a precision blanking or precision cutting machine. The entraining member 1320 can be made of a metallic sheet material and the stability of its annular portion can be enhanced by welding or upsetting (as at 1326).

It is often desirable and advantageous to make the adapter 1314 of one piece with the casing 1316 and to install the gear motor 1312 in the upper region of such composite part. Still further, it is possible to mount the forked member 1320 of FIGS. 35 and 36 on the shaft 1303 of the gearbox in the case 1301 and to mount the lever 1321 on the output element of the gear motor 1312. Still further, it can be of advantage if the axes of the gearing 1315, 1317 which is confined in the casing 1316 are properly positioned relative to each other simply as a result of accurate assembling in the housing of the actuator s; eventual tolerances (or excessive tolerances) can be compensated for in the region of the parts 1319, 1320 and 1321. The compactness of the power train can be enhanced by making the adapter 1314 and the casing 1316 as two discrete parts. Additional savings in space and/or cost can be achieved by employing a simple gearing including a spur gear and a mating gear segment with internal gear non-rotatably and (if necessary) axially movably engaging an external gear on a shaft or the like.

Figure 37:
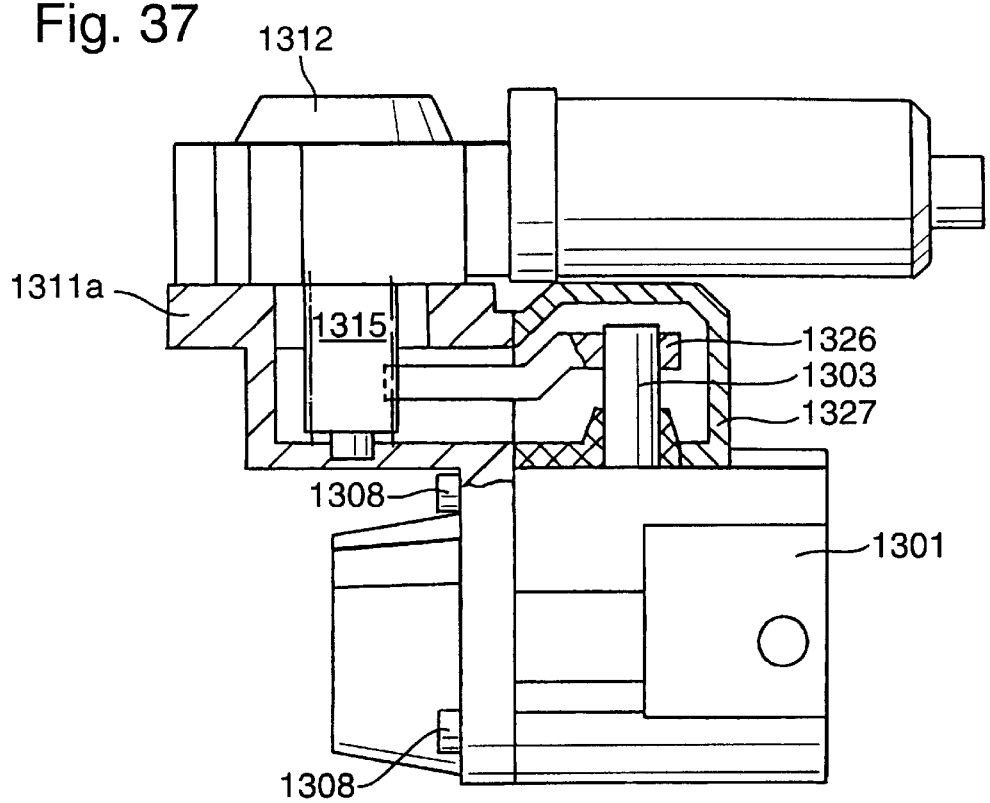
FIG. 37 is another partly elevational and partly sectional view of the power train which is illustrated in FIGS. 33 and 34.

FIG. 37 shows that part of the actuator which initiates the shifting of the gearbox into selected gears. The portion 1311a of the actuator housing is secured to the case 1301 of the gearbox by the aforementioned threaded fasteners 1308. The gear motor 1312 is installed in such a way that its center of gravity is located vertically above the fasteners 1308. The axis of the driven gear 1315 is preferably parallel to the shaft 1303 of the gearbox.

The gear 1315 causes the shaft 1303 to turn (arrow 1304 in FIG. 33) by way of the gear segment 1326 which is directly affixed to the shaft 1303. Since the driving unit 1312 and the gear 1315 are secured to the case 1301 by way of the portion 1311a of the actuator housing, and since the shaft 1303 is secured to the bell 1302 by way of an internal component, the distances between the axes of such parts are likely or bound to fluctuate within a rather wide range. In order to reduce or minimize the undesirable consequences of such tolerances, it is often advisable to select a gearing which is not sensitive or less sensitive to tolerances within the range of one or more tenths of one millimeter. Examples of such gearings are involute gearings with a small pressure angle and a negative profile correction. Furthermore, it is often preferred to employ a cranked or offset gear segment 1326 (see FIG. 37) in order to ensure that the driving unit 1312 can be placed closer to the case 1301 of the gearbox, i.e., to further enhance the compactness of the actuator.

The portion 1311a of the actuator housing can be provided with a plastic cover 1327 (FIG. 37) upon completed attachment to the case 1301. Such cover serves to prevent the escape of lubricant as well as to prevent the penetration of dust and/or moisture into contact with gear teeth. It is clear that the configuration of the cover 1327 is to be selected with a view to avoid any interference with movements of the shaft 1303.

At least the portion 1311a of the actuator housing can be made as a diecast aluminum part or as an injection molded synthetic plastic part. If a plastic material is used, it can be reinforced by filaments or in any other suitable way. The cover 1327, too, can be made in an injection molding machine. As already mentioned hereinbefore, the gear segment 1326 is or can be produced in a precision cutting machine with an integrated converting step.

Figure 38:
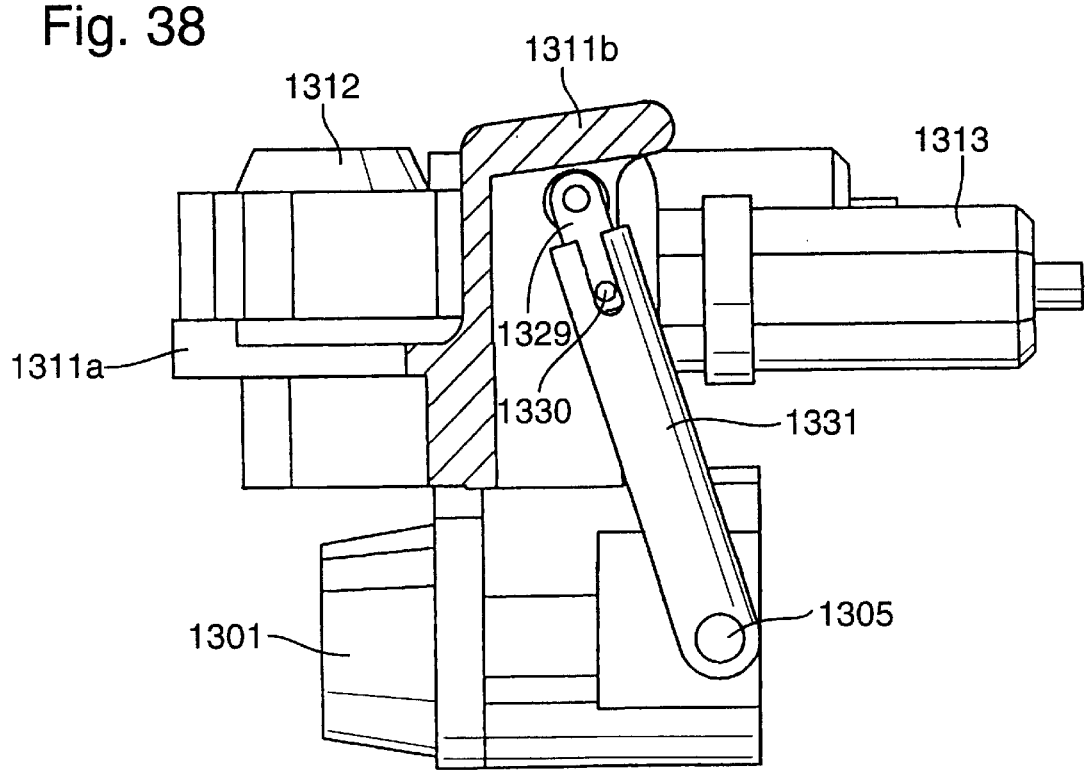
FIG. 38 is another partly elevational view and partly sectional view of certain combinations of component parts in the power train embodying the structure which is shown in FIGS. 33 and 34.

Referring to FIG. 38, there is shown another portion 1311b of the actuator housing. The driving unit 1313 which selects the desired gear ratios is fastened (e.g., bolted or screwed) at the open underside of the housing portion 1311b in such a way that its output shaft, which is connected with the motor lever 1329, is at least substantially parallel to the shaft 1305. The gear ratio selecting movements of the lever 1329 are transmitted, by way of a selector pin 1330, to a selector lever 1331 which is connected with the gear ratio selecting shaft 1305 of the gearbox. To this end, the lever 1331 has a slot for the selector pin 1330 of the lever 1329. The width of the slot preferably closely approaches the diameter of the selector pin 1330 in order to reduce tolerances between the output element of the driving unit 1313 and the shaft 1305.

The lever 1329 and/or 1331 can be a stamping which is subjected to a precision finishing treatment, e.g., of the surface bounding the slot in the selector lever 1331. Alternatively, such lever or levers can be turned out by a suitable precision cutting or severing machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and, therefore, such adaptations should and are intended to be comprehended within the meaning and range of equivalence of the appended claims.

What is claimed is:

1. In a motor vehicle, a power train comprising a prime mover, an automatically operable gearbox having a plurality of gear ratios, means for transmitting torque between said prime mover and said gearbox, and means for operating said gearbox including a signal receiving and signal transmitting control unit, monitoring means including at least one sensor arranged to transmit signals to said control unit, and actuating means including at least one actuator responsive to signals from said control unit to select gear ratios and to shift the gearbox into selected gear ratios, said at least one actuator including first and second driving units, a first transmission arranged to transmit motion from said first driving unit to a gear ratio selecting first component of said gearbox, and a second transmission interposed between said second driving unit and a second component forming part of and arranged to shift said gearbox into the gear ratio selected by said first component, at least one of said transmissions comprising at least two substantially disc-shaped rotary elements movable relative to each other and torque-transmitting energy storing means disposed in windows provided in said substantially disc-shaped rotary elements.

2. The power train of claim 1, wherein said monitoring means further comprises at least one circuit arranged to transmit signals to said control unit.

3. The power train of claim 1, wherein at least one of said transmissions is a single-stage transmission.

4. The power train of claim 1, wherein at least one of said transmissions is a multi-stage transmission.

5. The power train of claim 1, wherein at least one of said transmissions includes at least one of (a) a worm gearing, (b) a spur gearing, (c) a bevel gearing, and (d) a hypoid gearing.

6. The power train of claim 1, wherein said at least one actuator further includes a housing, at least a portion of at least one of said driving units and at least a portion of the transmission transmitting motion from said at least one driving unit being confined in said housing.

7. The power train of claim 1, wherein said at least one actuator further comprises a housing and at least a portion of said monitoring means is disposed in said housing.

8. The power train of claim 1, wherein at least one of said driving units includes an electric motor.

9. The power train of claim 8, wherein said electric motor is one of (a) a d-c motor, (b) an a-c motor, (c) a travelling-wave motor, (d) a switched reluctance motor, and (e) a stepping motor.

10. The power train of claim 1, wherein said first and second driving units include shafts which are at least substantially parallel to each other.

11. The power train of claim 1, wherein said first and second driving units include shafts which are inclined relative to each other.

12. The power train of claim 1, wherein said first and second driving units respectively include first and second members rotatable about first and second axes, each of said transmissions including a worm gearing having a worm wheel, said worm wheels and said axes being located in a common plane.

13. The power train of claim 1, wherein said first and second driving units respectively include first and second members rotatable about first and second axes, said first and second transmissions respectively including first and second worm gearings having first and second worm wheels, said first axis and said first worm wheel being disposed in a first plane, said second axis and said second worm wheel being disposed in a second plane and said planes being at least substantially parallel to each other.

14. The power train of claim 1, wherein said first and second driving units respectively include first and second members rotatable about first and second axes, said first and second transmissions respectively including first and second worm gearings having first and second worm wheels, said first axis and said first worm wheel being disposed in a first plane, said second axis and said second worm wheel being disposed in a second plane and said second plane being inclined at a predetermined angle relative to said first plane.

15. In a motor vehicle, a power train comprising a prime mover, an automatically operable gearbox having a plurality of gear ratios, means for transmitting torque between said prime mover and said gearbox, and means for operating said gearbox including a signal receiving and signal transmitting control unit, monitoring means including at least one sensor arranged to transmit signals to said control unit, and actuating means including at least one actuator responsive to signals from said control unit to select gear ratios and to shift the gearbox into selected gear ratios, said at least one actuator including first and second driving units, a first transmission including a first worm gearing and arranged to transmit axial motion from said first driving unit to a gear ratio selecting axially movable first shaft of said gearbox, and a second transmission including a second worm gearing and interposed between said second driving unit and a rotary second shaft forming part of and arranged to shift said gearbox into the gear ratio selected by said axially movable first shaft.

16. In a motor vehicle, a power train comprising a prime mover, a gearbox device operable to furnish a plurality of gear ratios, a torque transmitting device operable to transmit a variable torque between said prime mover and said gearbox device, and means for operating at least one of said devices including a signal receiving and signal transmitting control unit, monitoring means for transmitting signals to said control unit, and actuating means including at least one actuator responsive to signals from said control unit to operate at least one component of said at least one device, a driving unit, and a transmission between said driving unit and said at least one component, said transmission comprising at least two substantially disc-shaped rotary elements movable relative to each other, torque-transmitting energy storing means interposed between said elements, substantially tooth-shaped projections provided on at least one of said elements, and at least one velocity sensor arranged to monitor the movements of said projections.

17. The power train of claim 16, wherein each of said elements is provided with peripheral projections and said at least one sensor forms part of said monitoring means and is arranged to ascertain the extent of rotary movements of said elements relative to each other.

18. In a motor vehicle, a power train comprising a signal receiving and signal transmitting control unit, an actuator responsive to signals from said control unit and including at least one driving unit and a transmission between said at least one driving unit and at least one mobile component of the power train, said transmission comprising at least two substantially disc-shaped elements disposed in a power flow from said at least one driving unit to said at least one component and being rotatable with and relative to each other, said elements having peripheral zones provided with magnetized portions providing a plurality of magnetic poles spaced apart from each other in a circumferential direction of said at least two elements and establishing a magnetic field, resilient torque transmitting means arranged to oppose rotation of said at least two elements relative to each other, and at least one sensor arranged to monitor said magnetic field and to generate signals denoting at least one of a plurality of variable parameters including the rotational speed of at least one of said at least two elements and the extent of rotation of said at least two elements relative to each other.

19. The power train of claim 18, wherein said at least one sensor transmits said signals to said control unit.

20. The power train of claim 18, wherein said at least two elements are disposed in predetermined planes and said magnetic poles include south and north poles alternating with each other in said circumferential direction of said at least two elements, said at least two elements having predetermined starting angular positions relative to each other in which the south and north poles of one of said at least two elements assume predetermined positions relative to the south and north poles of the other of said at least two elements to establish a magnetic field having magnetic force lines extending in one of two directions including in and substantially at right angles to said planes, said magnetic force lines extending also in the other of said two directions in response to rotation of said at least two elements relative to each other from said starting angular positions against the opposition of said resilient torque transmitting means.

21. The power train of claim 20, wherein said magnetic field includes a component which disappears in said starting angular positions of said at least two elements relative to each other and develops in response to rotation of said at least two elements away from said starting angular positions, said at least one sensor being arranged to generate signals denoting the extent of rotation of said at least two elements relative to each other away from said starting angular positions by monitoring said component of said magnetic field.

22. The power train of claim 18, wherein the peripheral zone of one of said at least two elements provides a plurality of alternating south and north poles and the peripheral zone of the other of said at least two elements includes an annulus of neighboring projections having different polarities, the poles of said one element being adjacent oppositely polarized projections of said other element in predetermined starting angular positions of said at least two elements relative to each other, said at least one sensor being arranged to generate signals denoting variations of said magnetic field in response to rotation of said at least two elements away from said predetermined starting angular positions relative to each other.

23. The power train of claim 22, wherein said annulus of projections has a portion disposed between said at least one sensor and the peripheral zone of said one element.

24. The power train of claim 22, wherein said projections of said other element and said poles of said one element are located in a common plane.

25. The power train of claim 18, wherein said at least one sensor transmits said signals to said control unit and said signals denote the extent of rotation of said at least two elements relative to each other as a function of the amount of energy stored by said resilient torque transmitting means in opposing said rotation.

* * * * *